(12) United States Patent
Miyazaki et al.

(10) Patent No.: US 9,004,613 B2
(45) Date of Patent: Apr. 14, 2015

(54) HYDRAULIC BRAKE SYSTEM

(75) Inventors: Tetsuya Miyazaki, Toyota (JP);
Takayuki Yamamoto, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 54 days.

(21) Appl. No.: 13/989,846

(22) PCT Filed: Dec. 1, 2010

(86) PCT No.: PCT/JP2010/071470
§ 371 (c)(1),
(2), (4) Date: May 28, 2013

(87) PCT Pub. No.: WO2012/073352
PCT Pub. Date: Jun. 7, 2012

(65) Prior Publication Data
US 2013/0249274 A1 Sep. 26, 2013

(51) Int. Cl.
*B60T 13/16* (2006.01)
*B60T 7/04* (2006.01)
*B60T 8/36* (2006.01)
*B60T 8/40* (2006.01)
*B60T 11/224* (2006.01)
*B60T 13/66* (2006.01)
*B60T 13/68* (2006.01)

(52) U.S. Cl.
CPC ............. *B60T 13/168* (2013.01); *B60T 7/042* (2013.01); *B60T 8/3615* (2013.01); *B60T 8/4081* (2013.01); *B60T 11/224* (2013.01); *B60T 13/662* (2013.01); *B60T 13/686* (2013.01)

(58) Field of Classification Search
CPC ......... B60T 8/885; B60T 8/94; B60T 8/4081; B60T 8/40; B60T 8/4013; B60T 13/165; B60T 13/168; B60T 13/142; B60T 13/148; B60T 2270/402

USPC ........... 303/6.01, 3, 5, 10, 189, 116.1, 116.2, 303/122.09, 122.1, 122.12, 122.04, 9.61
See application file for complete search history.

(56) References Cited

U.S. PATENT DOCUMENTS

| | | | | |
|---|---|---|---|---|
| 4,955,674 A | * | 9/1990 | Hayn et al. | 303/113.3 |
| 5,568,962 A | * | 10/1996 | Enomoto et al. | 303/3 |
| 6,027,178 A | * | 2/2000 | Oka | 303/11 |
| 6,247,762 B1 | * | 6/2001 | Kusano et al. | 303/3 |
| 2004/0061376 A1 | * | 4/2004 | Yoshino et al. | 303/113.1 |
| 2010/0259096 A1 | | 10/2010 | Rieth et al. | |

FOREIGN PATENT DOCUMENTS

| | | |
|---|---|---|
| JP | A-10-287227 | 10/1998 |
| JP | A-2009-502645 | 1/2009 |
| WO | WO 2011/096039 A1 | 8/2011 |

* cited by examiner

*Primary Examiner* — Anna Momper
*Assistant Examiner* — San Aung
(74) *Attorney, Agent, or Firm* — Oliff PLC

(57) ABSTRACT

Two pressure chambers of the master cylinder and brake cylinders provided respectively for front left and right wheels are respectively connected directly to each other by master passages. Provided respectively in the master passages are master cut-off valves each as a normally-closed electromagnetic open/close valve. As a result, when the brake pedal is not operated and when no current is supplied to solenoids of the respective master cut-off valves, the pressure chambers and the brake cylinders are respectively disconnected to each other, preventing an outflow of the working fluid from the pressure chambers, i.e., fluid chambers of a master reservoir to the brake cylinders.

15 Claims, 34 Drawing Sheets

FIRST CHECK VALVE 99
SECOND CHECK VALVE 130 } OUTFLOW PREVENTING DEVICE 260

CASE WHERE SYSTEM WORKS NORMALLY

SECOND CASE WHERE CONTROL SYSTEM IS ABNORMAL

CASE OF POSSIBLE FLUID LEAKAGE

FIG.13
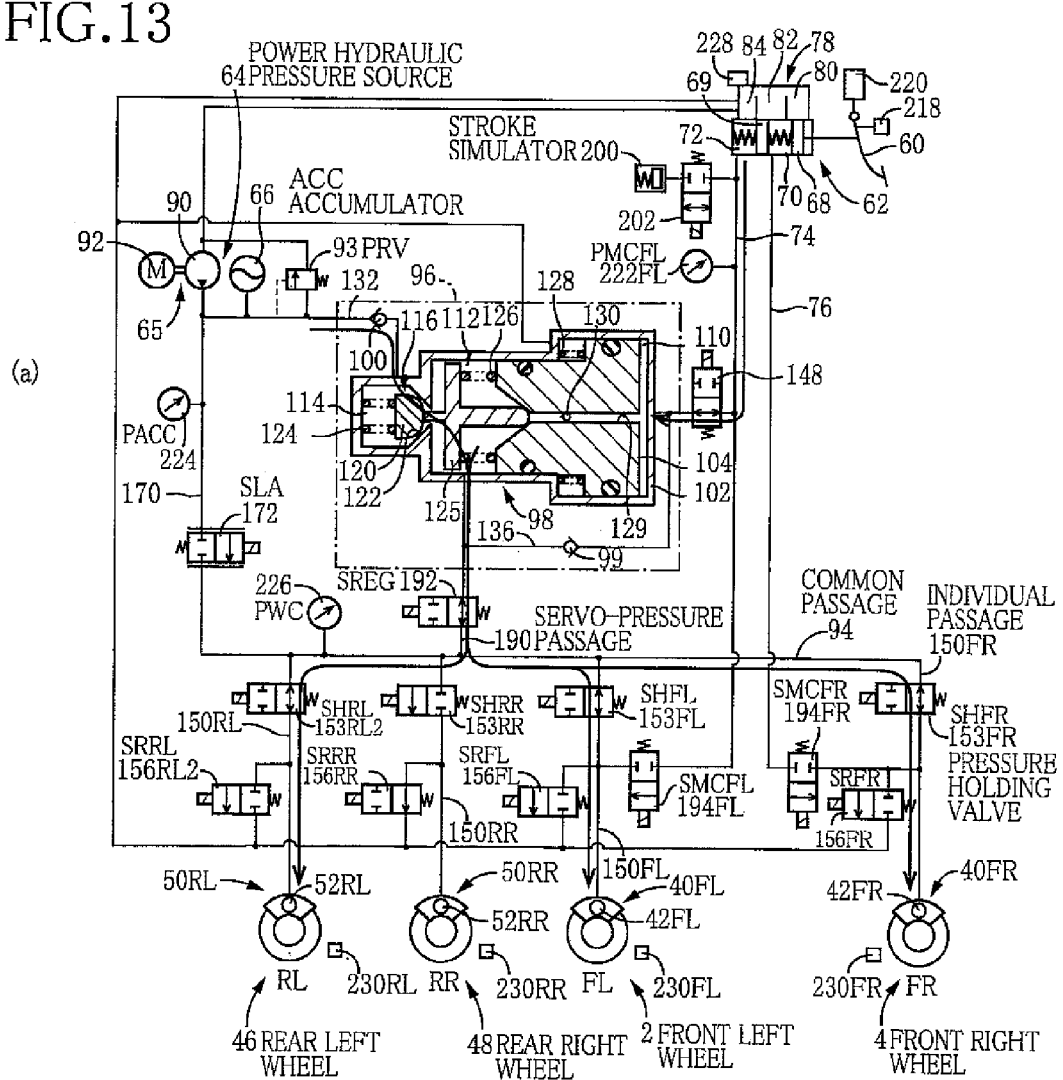
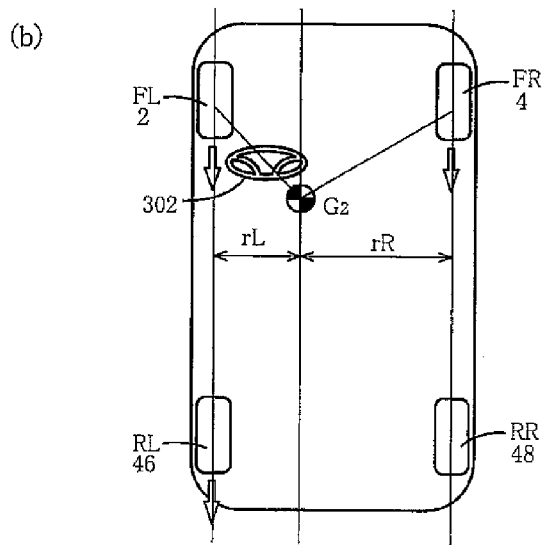

FIG.14
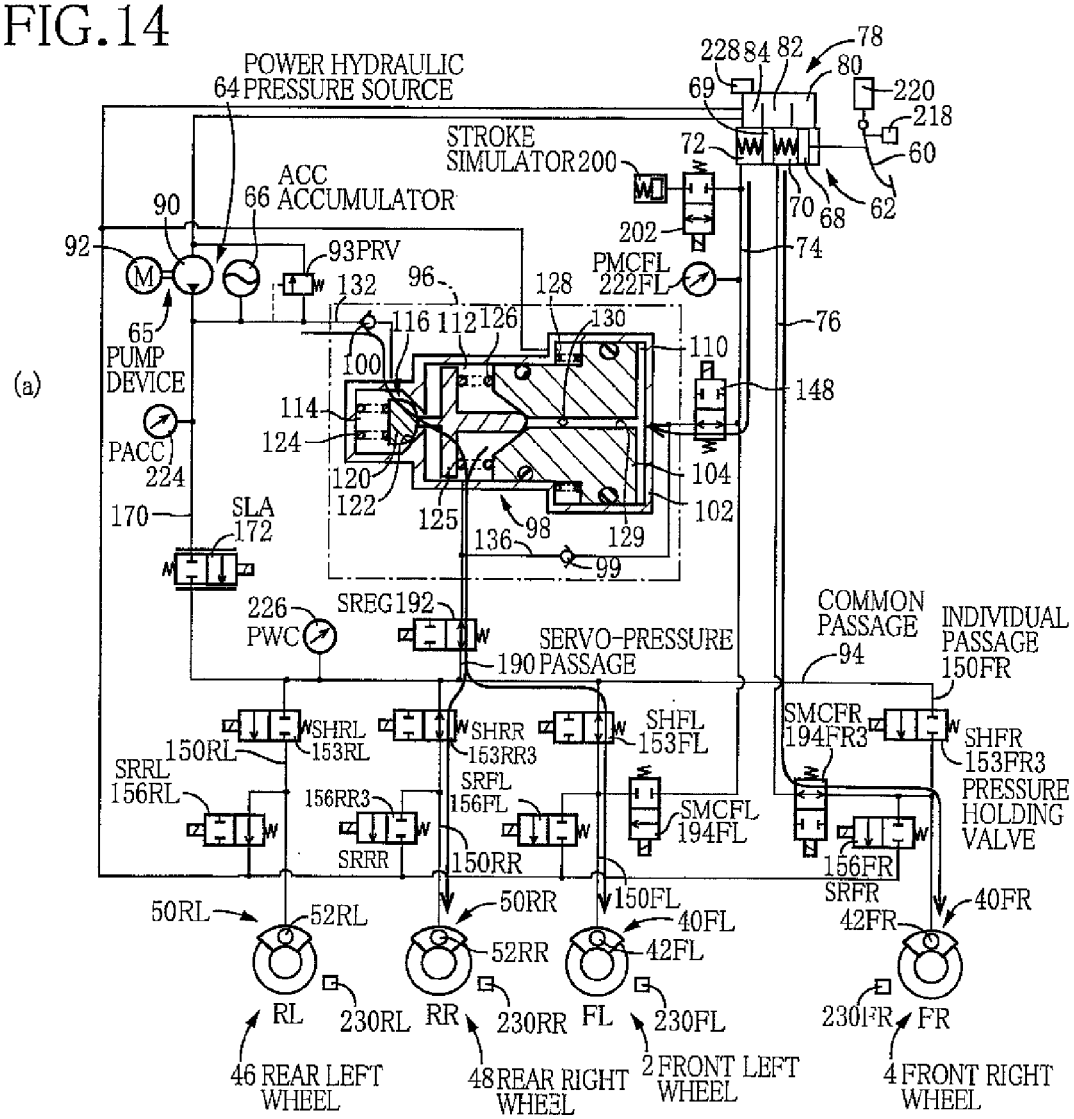
(a)
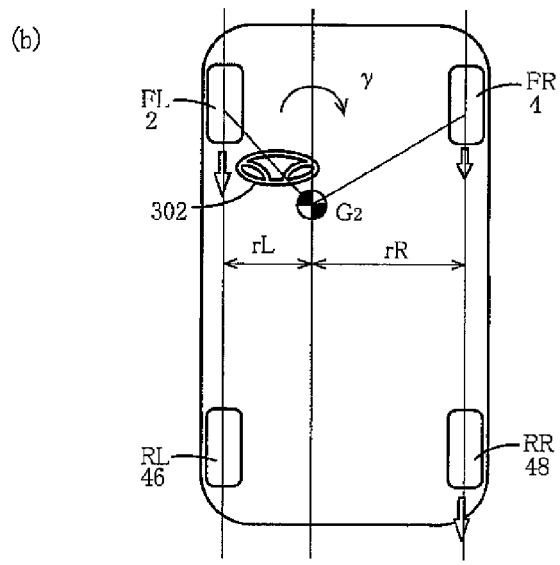
(b)

FIRST CHECK VALVE 99  
SECOND CHECK VALVE 130 } OUTFLOW PREVENTING DEVICE 260

CASE WHERE SYSTEM WORKS NORMALLY

FIRST CASE WHERE CONTROL SYSTEM IS ABNORMAL

SECOND CASE WHERE CONTROL SYSTEM IS ABNORMAL

CASE OF POSSIBLE FLUID LEAKAGE

FIG.22
CHECK 1
(a)
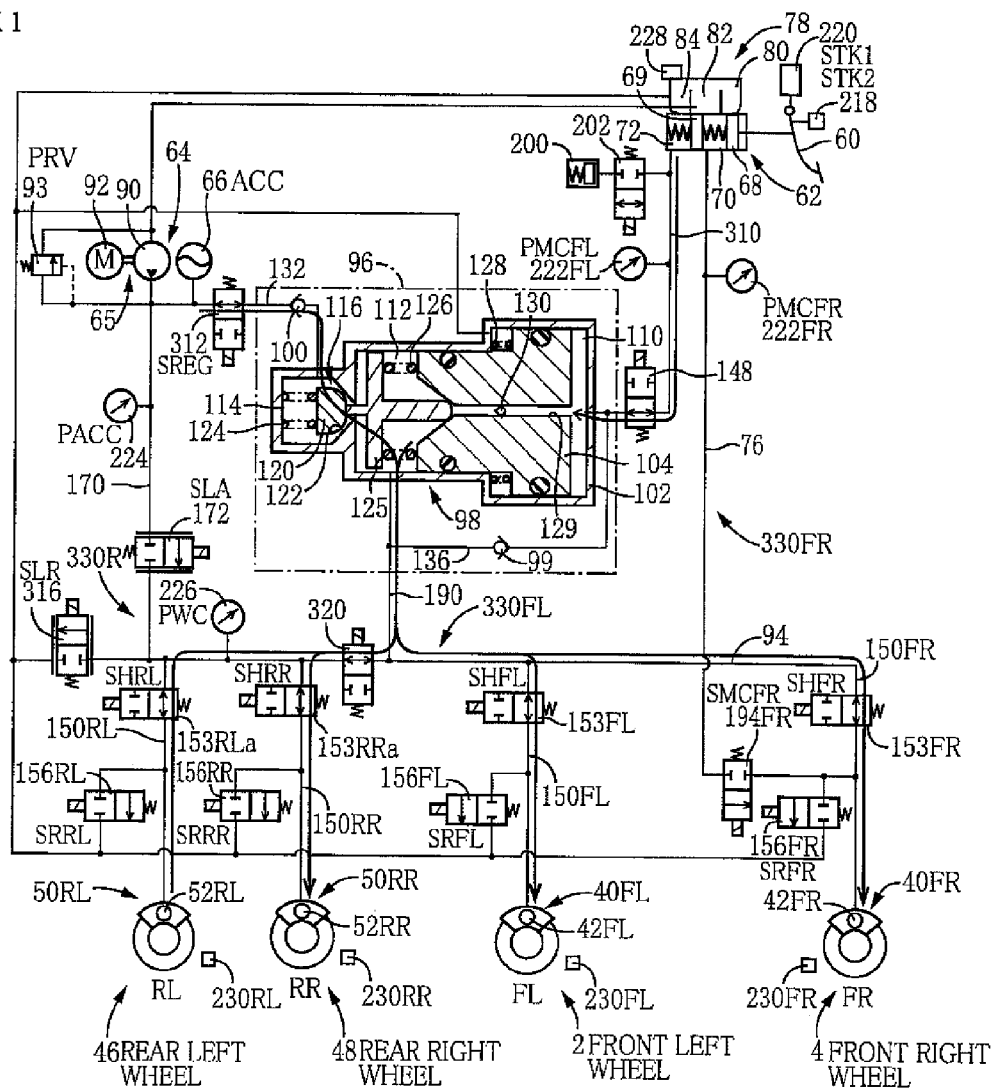
(b)
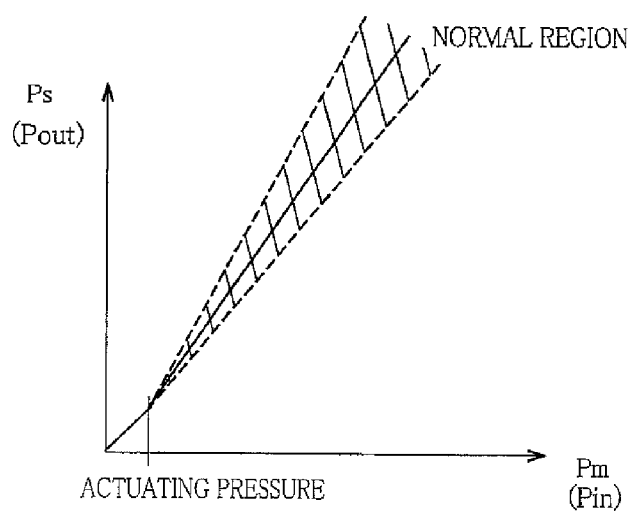

CHECK 2-1

CHECK 2-2

FIG. 25
(a) 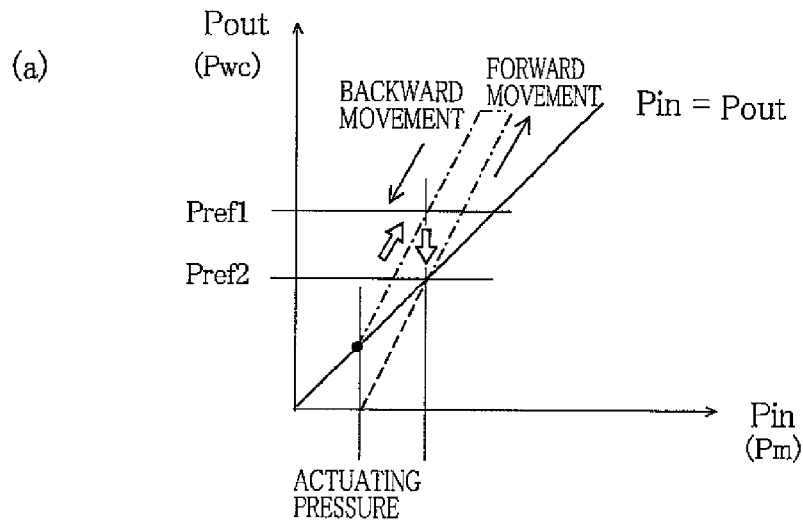
(b) 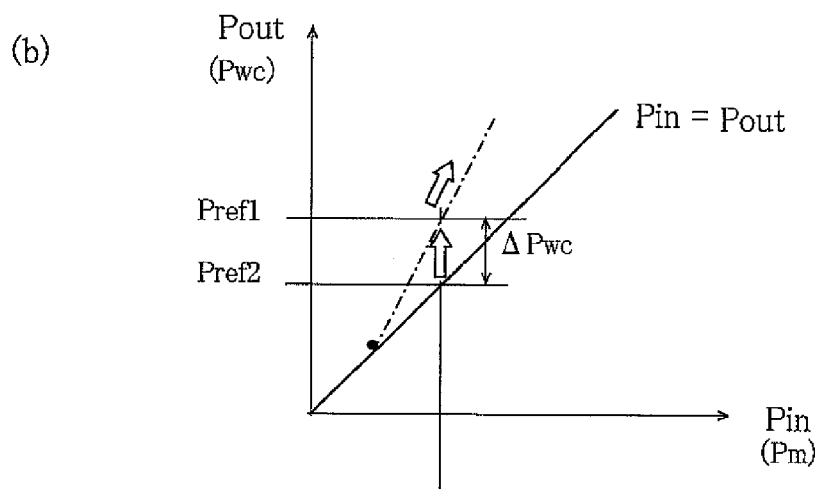
(c) 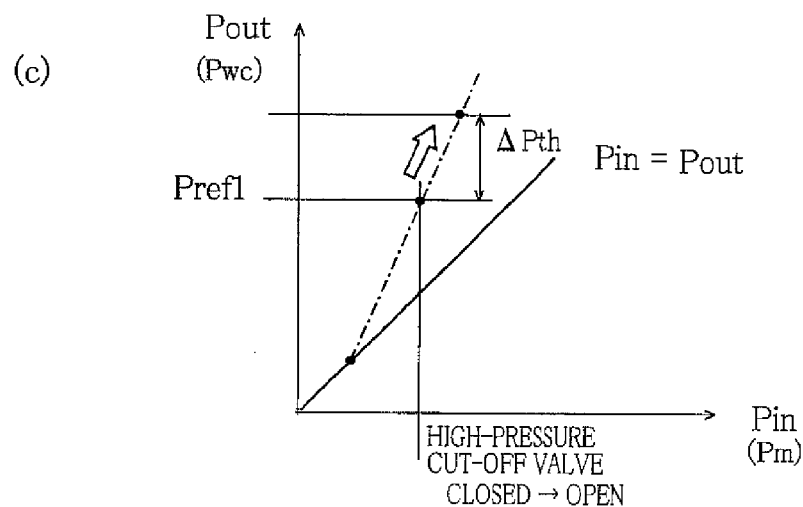

FIG.34
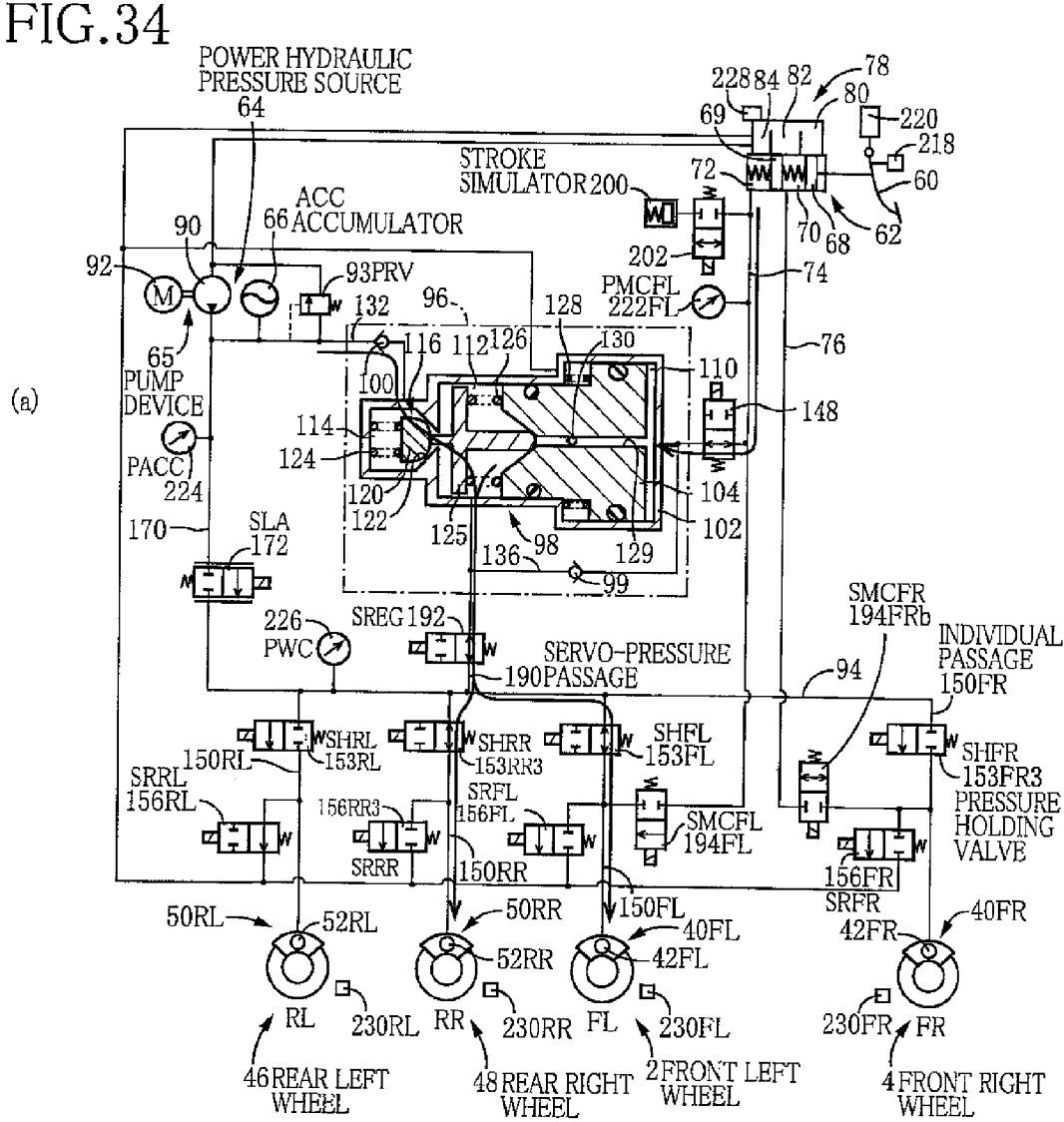
(a)
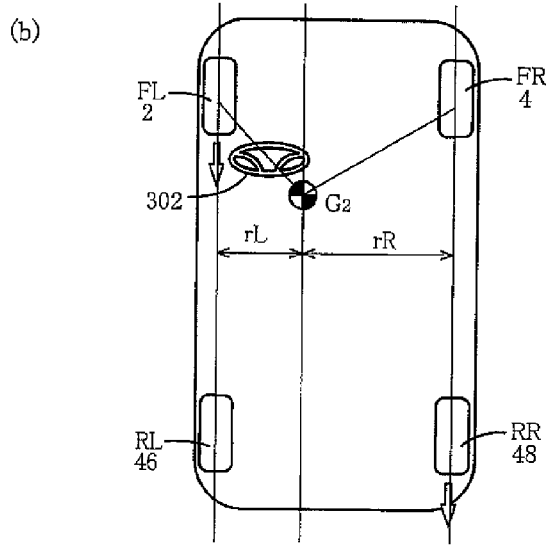
(b)

FIG.35
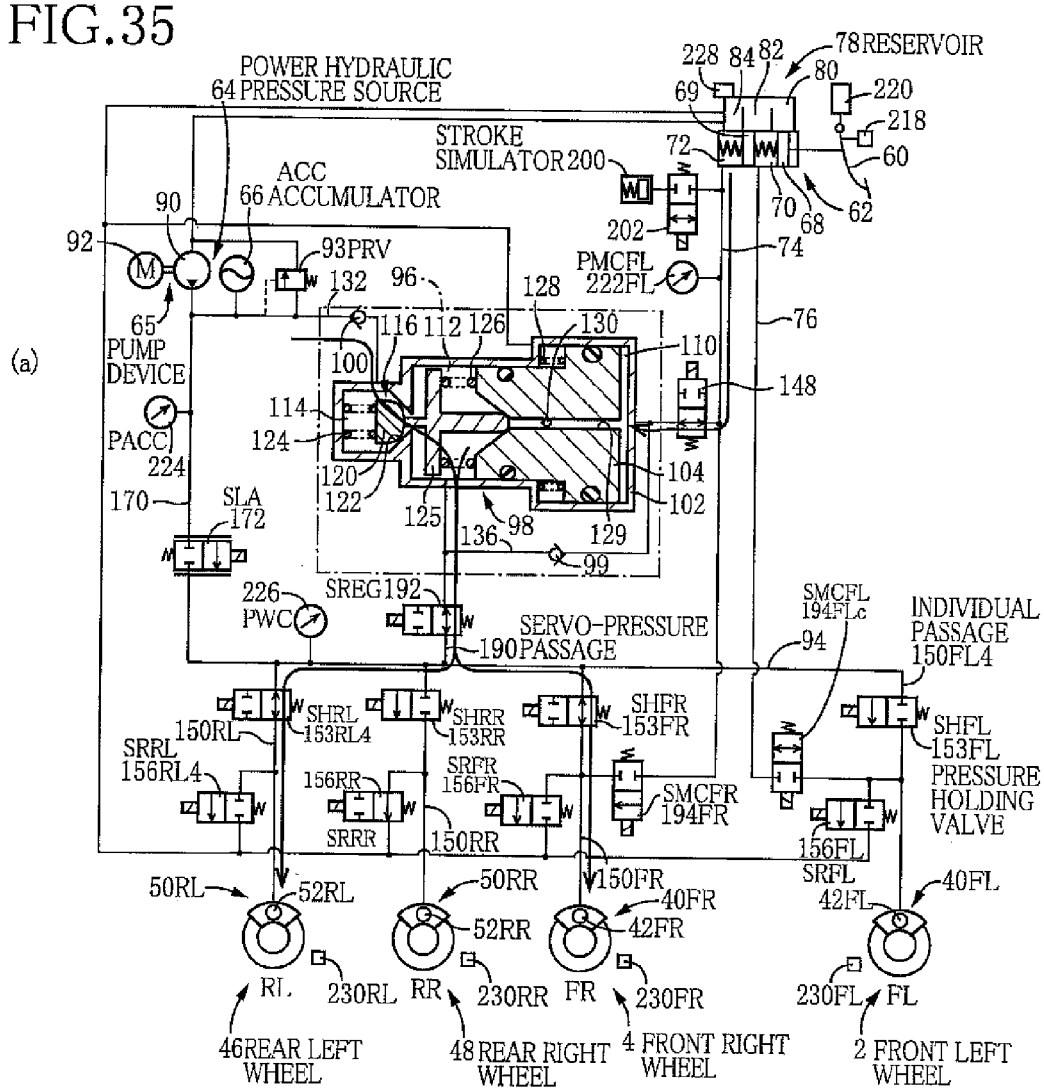
(a)
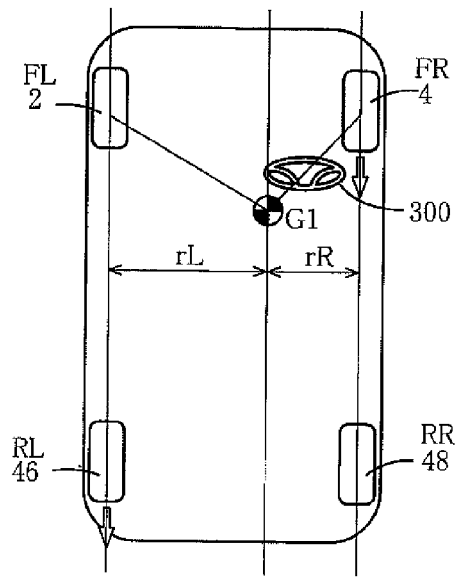
(b)

US 9,004,613 B2

HYDRAULIC BRAKE SYSTEM

TECHNICAL FIELD

The present invention relates to a hydraulic brake system including a hydraulic brake configured to restrain rotation of a wheel.

BACKGROUND ART

Patent Document 1 discloses a hydraulic brake system including (a) a hydraulic brake designed to restrain rotation of a wheel, (b) a master cylinder, (c) an accumulator, (d) a pressurization mechanism utilizing a hydraulic pressure in the accumulator and activatable by activation of an electric actuator, and (e) a selective valve designed to select a higher one of a hydraulic pressure in the pressurization mechanism and a hydraulic pressure in the master cylinder to supply the selected hydraulic pressure to a brake cylinder of the hydraulic brake.

Patent Document 2 discloses a hydraulic brake system including (a) hydraulic brakes provided for front right, front left, rear right and rear left wheels of a vehicle and designed to restrain rotations of the wheels, (b) a master cylinder, (c) a mechanical booster provided between the master cylinder and brake cylinders of ones of the hydraulic brakes which are provided for the front right and front left wheels, (d) a high pressure source and an electromagnetic valve that is configured to control a hydraulic pressure produced by the high pressure source.

PRIOR ART DOCUMENTS

Patent Documents

[Patent Document 1] JP-T-2009-502645
[Patent Document 2] JP-A-10-287227

DISCLOSURE OF THE INVENTION

Problem to be Solved by the Invention

An object of the present invention is to improve a hydraulic brake system.

Means for Solving Problem and Effects

A hydraulic brake system according to the present invention is configured such that a pressurization device and a plurality of brake cylinders are connected to a common passage, a manual hydraulic pressure source(s) is connected to at least one brake cylinder via a manual passage(s), and a normally-closed manual cut-off valve is provided in the manual passage(s).

For example, in a hydraulic brake system including: a power hydraulic pressure source capable of supplying a high hydraulic pressure by supply of electric energy; and a power hydraulic-pressure control device capable of utilizing a hydraulic pressure produced by the power hydraulic pressure source to electrically control a hydraulic pressure in a common passage, when the hydraulic brake system works normally, the hydraulic pressure controlled by the power hydraulic-pressure control device (which is a controlled hydraulic pressure in the common passage and may be hereinafter referred to as "power control pressure") is supplied to a plurality of brake cylinders, and in the event of an abnormality in the control system, a hydraulic pressure produced by a manual hydraulic pressure source (may be hereinafter referred to as "manual hydraulic pressure") is supplied to at least one brake cylinder. In such a hydraulic brake system, a normally-closed electromagnetic open/close valve is not usually provided in a passage connecting between the manual hydraulic pressure source and the at least one brake cylinder.

In the hydraulic brake system according to the present invention, however, the pressurization device and the plurality of brake cylinders are connected to the common passage. Thus, in the event of an abnormality in the control system, an output hydraulic pressure provided by the pressurization device (hereinafter may be referred to as "servo pressure") can be supplied to at least one of the plurality of brake cylinders (i.e., brake cylinder(s) to be fluidically coupled with the common passage in the event of the abnormality in the control system). Accordingly, a normally-closed electromagnetic open/close valve in the form of a manual cut-off valve can be provided in the manual passage.

As a result, for example, in a case where the hydraulic brake system works normally, when at least one brake cylinder of the plurality of brake cylinders which is connected to the manual passage is isolated from the manual hydraulic pressure source, and the power control pressure is supplied to the at least one brake cylinder, there is no need to supply a current to a coil of a solenoid of the manual cut-off valve (hereinafter may be simply referred to as "supply a current to a solenoid). Accordingly, power consumption can be reduced when compared with a case where the manual cut-off valve is a normally-open electromagnetic open/close valve.

Also, the manual hydraulic pressure source and the at least one brake cylinder can be isolated from each other in a state in which no electric power is supplied to, e.g., a master cut-off valve (for example, in an OFF state of an ignition switch and in a state in which a braking operation is not being performed). As a result, it is possible to prevent an outflow of working fluid from the manual hydraulic pressure source through the manual passage. Even in the event of a leakage in a position near the at least one brake cylinder, it is possible to prevent the outflow of the working fluid from the manual hydraulic pressure source through the manual passage.

Patent Documents 1, 2 contain no description about a configuration in which a normally closed valve is used for a manual cut-off valve provided in the manual passage.

FORMS OF THE INVENTION

There will be described by way of examples forms of inventions recognized to be claimable by the present applicant. The inventions may be hereinafter referred to as "claimable inventions" and include at least the inventions as defined in the appended claims. Nevertheless, the inventions may further include an invention of a concept subordinate or superordinate to the concept of the invention defined in the appended claims, and/or an invention of a concept different from the concept of the invention defined in the appended claims. The forms are numbered like the appended claims. Features of the claimable inventions may be implemented as features contained respectively in the following forms or as features contained respectively in combinations of two or more of the following forms. Any one of the following forms may be implemented with one or more features added, or one or more of a plurality of features included in any one of the following forms are not necessarily provided all together.

(1) A hydraulic brake system comprising:

a plurality of hydraulic brakes provided respectively for a plurality of wheels of a vehicle and each configured to be operated by a hydraulic pressure in a corresponding one of a plurality of brake cylinders to restrain rotation of a corresponding one of the plurality of wheels;

at least one manual hydraulic pressure source configured to produce a hydraulic pressure by a braking operation of a driver;

a pressurization device comprising a movable unit configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source; and a common passage to which the pressurization device is connected and to which the plurality of brake cylinders are connected, the hydraulic brake system further comprising:

at least one manual passage that bypasses the pressurization device and connects between each of at least one of the at least one manual hydraulic pressure source and a corresponding one of at least one of the plurality of brake cylinders; and a normally-closed manual cut-off valve provided in each of the at least one manual passage.

The manual hydraulic pressure source may be a pressure chamber of the master cylinder or a hydraulic booster. The hydraulic brake system may include one manual hydraulic pressure source or two or more manual hydraulic pressure sources.

The hydraulic brake system may include, for example, two manual hydraulic pressure sources. Examples of this configuration include: a case where the hydraulic brake system includes a tandem master cylinder having two pressure chambers; and a case where the hydraulic brake system includes a hydraulic booster and a master cylinder having one pressure chamber. In addition, it is possible to consider that each of the manual hydraulic pressure sources also has a master reservoir. This is because the pressure chamber and the master reservoir are in communication with each other in a case where a brake operating member is not being operated. The hydraulic brake system may further include a vacuum booster.

The at least one manual passage is configured to bypass the pressurization device to connect between each of the at least one of the at least one manual hydraulic pressure source and a corresponding one of the at least one of the plurality of brake cylinders.

For example, in the case where the hydraulic brake system includes two manual hydraulic pressure sources, manual passages may be connected to the respective two manual hydraulic pressure sources, and alternatively a manual passage may be connected to one of the two manual hydraulic pressure sources.

Also, one brake cylinder may be connected to one manual hydraulic pressure source via the manual passage, and at least two brake cylinders may be connected to one manual hydraulic pressure source via the manual passage(s).

Also, examples of a passage connecting between the manual hydraulic pressure source and at least one brake cylinder include a direct manual passage (that bypasses the pressurization device) and an indirect manual passage (that extends through the pressurization device). In the hydraulic brake system in the present form, there are (i) a case where manual passages (i.e., direct manual passages) are connected to the respective two manual hydraulic pressure sources and (ii) a case where a direct manual passage is connected to one of two manual hydraulic pressure sources, and an indirect manual passage is connected to the other of the two manual hydraulic pressure sources. Specifically, there are: a case where both the direct manual passage and the indirect manual passage are connected to the pressurization-device-coupled manual hydraulic pressure source, and a case where the indirect manual passage is connected to the pressurization-device-coupled manual hydraulic pressure source, and the direct manual passage is not connected to the pressurization-device-coupled manual hydraulic pressure source, for example.

In any case, a normally closed manual cut-off valve is provided in each of all the direct manual passages in the hydraulic brake system in the present form.

The manual cut-off valve is an electromagnetic open/close valve controllable to be placed in at least an open state and a closed state. The electromagnetic open/close valve may be either a linear control valve or a simple open/close valve. In the linear control valve, a high-low pressure differential (and/or an opening degree) of the valve is continuously controllable by continuously controlling an amount of a current supplied to a solenoid of the valve. In the simple open/close valve, the open and closed states can be selectively established by selectively turning ON/OFF supply of a current to a solenoid of the valve. In the following description, the term "valve" as used in an electromagnetic open/close valve, an electromagnetic control valve, and a hydraulic-pressure control valve may be interpreted as either a linear control valve or a simple open/close valve, unless otherwise specified.

(2) The hydraulic brake system may comprise: a power hydraulic pressure source configured to produce a hydraulic pressure by supply of electric energy; and a power hydraulic-pressure control device configured to control a hydraulic pressure in the common passage by utilizing the hydraulic pressure produced by the power hydraulic pressure source.

While the power hydraulic pressure source comprises a pump device configured to produce the hydraulic pressure by the supply of the electric energy, the power hydraulic pressure source may comprise an accumulator configured to store working fluid ejected from the pump device in a state in which the working fluid is pressurized. Even in a case where electric energy cannot be supplied to the power hydraulic pressure source, when a hydraulic pressure of the working fluid accumulated in the accumulator is equal to or higher than a set pressure, high-pressure working fluid can be output.

The power hydraulic-pressure control device may comprise a hydraulic-pressure control valve provided between the power hydraulic pressure source and the common passage and configured to control the hydraulic-pressure control valve to control a hydraulic pressure to be supplied to the common passage (i.e., a power control pressure) (noted that the power hydraulic-pressure control device may further comprise a hydraulic-pressure control valve provided between the common passage and a low pressure source). Also, the power hydraulic-pressure control device may be configured to control the power hydraulic pressure source (e.g., a pump motor) to control the hydraulic pressure to be supplied to the common passage (i.e., the power control pressure), for example. The hydraulic-pressure control valve provided between the common passage and the power hydraulic pressure source can serve as a power-hydraulic-pressure-source cut-off valve configured to fluidically couple and decouple the power hydraulic pressure source to and from the common passage.

(3) The pressurization device may be configured to be capable of outputting a hydraulic pressure that is greater than the hydraulic pressure produced by the pressurization-device-coupled manual hydraulic pressure source, by utilizing the hydraulic pressure produced by the power hydraulic pressure source.

It is noted that the movable unit may be configured to be operated by only the hydraulic pressure produced by the pressurization-device-coupled manual hydraulic pressure source and may be configured to be operated by both of the hydraulic pressure produced by the pressurization-device-coupled manual hydraulic pressure source and an electromagnetic driving force of a solenoid. In the latter configuration, the movable unit may be configured to control and output the hydraulic pressure produced by the power hydraulic pressure source, by control of a current to be supplied to the solenoid. For example, the movable unit may be configured to be capable of outputting a hydraulic pressure that is lower than a hydraulic pressure produced by a manual hydraulic pressure source included in the hydraulic brake system and may be configured to be capable of outputting a hydraulic pressure even when no hydraulic pressure is produced by the manual hydraulic pressure source.

(4) The pressurization device may comprise an intra-pressurization-device communication passage capable of connecting the pressurization-device-coupled manual hydraulic pressure source and the common passage to each other, and the hydraulic brake system may comprise an outflow preventing device configured to allow a flow of the working fluid between the pressurization-device-coupled manual hydraulic pressure source and at least one of the plurality of brake cylinders through the intra-pressurization-device communication passage within at least a period in the braking operation and prevent an outflow of the working fluid from the pressurization-device-coupled manual hydraulic pressure source to the at least one brake cylinder through the intra-pressurization-device communication passage when the braking operation is not being performed.

The intra-pressurization-device communication passage is a passage capable of connecting the pressurization-device-coupled manual hydraulic pressure source and the common passage to each other. The term "passage capable of connecting" means a passage that allows a flow of the working fluid between connected components. The intra-pressurization-device communication passage may be a passage formed in the movable unit or outside the movable unit (in this configuration, the passage bypasses the movable unit).

In the hydraulic brake system in the present form, for example, when the brake operating member is operated in such a direction that places the hydraulic brake in a working state (hereinafter may be referred to as "brake actuating operation"), the hydraulic pressure produced by the pressurization-device-coupled manual hydraulic pressure source may be supplied to the at least one brake cylinder via the intra-pressurization-device communication passage (i.e., a passage bypassing the movable unit) before the actuation of the movable unit at a start of the brake actuating operation (that is, before an actuating pressure of the movable unit is reached). Also, when the brake operating member is operated in such a direction that places the hydraulic brake in a non-working state (hereinafter may be referred to as "brake releasing operation"), the working fluid may be returned from the at least one brake cylinder to the pressurization-device-coupled manual hydraulic pressure source via the intra-pre ssurization-device communication passage.

Incidentally, in a case where the system is configured such that the servo pressure provided by the pressurization device is supplied to the common passage and then to the at least one brake cylinder of the plurality of brake cylinders in the event of an abnormality or failure in the control system, a normally-closed electromagnetic control valve is not usually provided in a passage passing through the pressurization device and fluidically coupling the pressurization-device-coupled manual hydraulic pressure source with the at least one brake cylinder. Thus, when no current is supplied to a solenoid of the electromagnetic control valve, the pressurization-device-coupled manual hydraulic pressure source and the at least one brake cylinder are in communication with each other via the intra-pressurization-device communication passage.

In contrast, the present hydraulic brake system comprises the outflow preventing device, and when the braking operation (noted that the term "braking operation" is used in a case where the brake actuating operation and the brake releasing operation do not need to be distinguished or in a case where the braking operation can apply to both the brake actuating operation and the brake releasing operation) is not being performed, a flow of the working fluid from the pressurization-device-coupled manual hydraulic pressure source to the at least one brake cylinder via the intra-pressurization-device communication passage is prevented. Thus, even in the event of fluid leakage in at least one of the at least one brake cylinder, it is possible to prevent the outflow of the working fluid from the pressurization-device-coupled manual hydraulic pressure source via the intra-pressurization-device communication passage.

It is noted that the abnormality in the control system is an abnormality or failure in which the system cannot electrically control the hydraulic pressure in the brake cylinder (or the hydraulic pressure in the common passage) by utilizing the hydraulic pressure produced by the power hydraulic pressure source. For example, the abnormality in the control system include: an abnormality in at least one constituent element of the control system; an abnormality in which the high-pressure working fluid cannot be supplied from the power hydraulic pressure source; an abnormality in which the power hydraulic pressure source cannot be controlled; and an abnormality in which the electromagnetic control valve or other similar devices cannot be operated as commanded, and the abnormality in the control system may be one due to the abnormality in the electrical system. In the event of the abnormality in the control system, no current (i.e., electric power or electric energy) is supplied to, e.g., solenoids of all the electromagnetic open/close valves contained in the hydraulic brake system.

Also, the case where the braking operation is not being performed is a case where the brake operating member is located at its back end position, i.e., a case where neither the brake actuating operation nor the brake releasing operation is performed by the driver. The main switch may be an ON state or an OFF state.

Also, the number of intra-pressurization-device communication passages may be one or more. The number of intra-pressurization-device communication passages means the number of communication passages formed independently of one another and not intersecting one another though at least one of a starting point and an end point may be the same.

Also, the "at least one of the plurality of brake cylinders" in the present form (referred to as "brake cylinder X" in the present form to which an indirect manual passage is connected) may be the same as or different from the "at least one of the plurality of brake cylinders" in the preceding form (referred to as "brake cylinder Y" in the present form to which a direct manual passage is connected). Also, the brake cylinders X and Y may be identical to each other only partly, and one of the brake cylinders X and Y may include the other.

For example, in a case where the hydraulic brake system includes two manual hydraulic pressure sources, and (a) where direct manual passages are connected to the respective two manual hydraulic pressure sources, and normally-closed manual cut-off valves are provided in the respective two direct manual passages or (b) where an indirect manual passage is connected to the pressurization-device-coupled manual hydraulic pressure source, and the outflow preventing device is provided in the indirect manual passage, it is possible to reliably prevent an outflow of the working fluid from the two manual hydraulic pressure sources in the case where the braking operation is not being performed.

(5) The outflow preventing device may be provided for at least one of (a) a manual-hydraulic-pressure input passage configured to fluidically couple the pressurization device and the pressurization-device-coupled manual hydraulic pressure source with each other, (b) the intra-pressurization-device communication passage, (c) a servo-pressure passage configured to connect the pressurization device and the common passage to each other, (d) the common passage, and (e) at least one brake-side passage configured to connect the common passage and the at least one brake cylinder to each other.

For example, in a case where the pressurization-device-coupled manual hydraulic pressure source and the at least one brake cylinder are fluidically coupled with each other via a liquid passage (i.e., the indirect manual passage) including the intra-pressurization-device communication passage, the outflow preventing device can be provided in a portion of the indirect manual passage. In particular, the outflow preventing device can be provided in the intra-pressurization-device communication passage, or in the indirect manual passage at a position located downstream of the intra-pressurization-device communication passage.

It is noted that the brake-side passage may be a passage (may be referred to as "individual brake-side passage" and "individual passage") that connects the one brake cylinder and the common passage to each other and may be a passage that connects the at least two brake cylinders and the common passage to each other.

(6) The outflow preventing device may comprise a first check valve configured to: inhibit a flow of the working fluid from the at least one brake cylinder to the pressurization-device-coupled manual hydraulic pressure source through the intra-pressurization-device communication passage; inhibit the flow of the working fluid from the pressurization-device-coupled manual hydraulic pressure source to the at least one brake cylinder through the intra-pressurization-device communication passage when a subtraction value obtained by subtracting a hydraulic pressure in the at least one brake cylinder from the hydraulic pressure produced by the manual hydraulic pressure source is equal to or less than a set value; and allow the flow of the working fluid from the pressurization-device-coupled manual hydraulic pressure source to the at least one brake cylinder through the intra-pressurization-device communication passage when the subtraction value is greater than the set value.

An excessively high valve opening pressure of the first check valve is not preferable because the excessively high valve opening pressure may cause a delay in actuation of the brake. An excessively low valve opening pressure of the first check valve is not preferable because the excessively low valve opening pressure cannot inhibit an outflow of the working fluid from the manual hydraulic pressure source due to a height difference. To solve these problems, the set value as the valve opening pressure is set at a value that is determined on the basis of a hydraulic pressure difference due to a height difference between the pressurization-device-coupled manual hydraulic pressure source and the at least one brake cylinder.

In the case where the braking operation is not being performed, the manual hydraulic pressure source does not produce a hydraulic pressure, the pressure chamber of the master cylinder is in communication with the master reservoir, and the hydraulic pressure produced by the manual hydraulic pressure source is nearly an atmospheric pressure. Also, the hydraulic pressure in the brake cylinder is nearly the atmospheric pressure, but there is a hydraulic pressure difference due to a height difference between the manual hydraulic pressure source and the brake cylinder. Thus, in the configuration in which the set value is the value determined on the basis of the hydraulic pressure difference due to the height difference, even if there is a leakage of the working fluid in the at least one brake cylinder in the case where the braking operation is not being performed, it is possible to reliably prevent the outflow of the working fluid from the pressurization-device-coupled manual hydraulic pressure source. The valve opening pressure may be equal to or less than the hydraulic pressure due to the height difference.

Also, when the brake actuating operation is performed, the manual hydraulic pressure can be supplied from the pressurization-device-coupled manual hydraulic pressure source to the at least one brake cylinder through the intra-pressurization-device communication passage, thereby speedily actuating the hydraulic brake.

(7) The first check valve may be a seating valve that comprises a valve element and a valve seat and be provided in an orientation in which a gravity acting on the valve element comprises a component that is opposed to the direction of the flow of the working fluid from the pressurization-device-coupled manual hydraulic pressure source to the at least one brake cylinder.

No springs are provided for the first check valve in the present form. Also, the valve element is spherical in shape (the valve element can be referred to as "ball"). Thus, a value obtained by subtracting a hydraulic pressure on a side nearer to the at least one brake cylinder from a hydraulic pressure on a side nearer to the pressurization-device-coupled manual hydraulic pressure source becomes greater than a valve opening pressure (i.e., the component of the gravity acting on the valve element) in a state in which the valve element is seated on the valve seat. The valve element is moved off the valve seat, so that the first check valve becomes its open state. Also, when the flow of the working fluid from the at least one brake cylinder to the pressurization-device-coupled manual hydraulic pressure source is generated in the open state of the first check valve, and thus a suction force is generated, the valve element is seated on the valve seat and becomes the closed state. The first check valve is preferably provided with a valve element retaining mechanism for limiting movement of the valve element.

In the first check valve in the present form, the component (i.e., a component in an axial direction of the first check valve) of the gravity acting on the valve element is set so as to correspond to the set value (i.e., the height-difference-based set value). That is, the component is set such that the weight of the ball, an orientation of the check valve (e.g., an inclination angle thereof with respect to a horizontal line, noted that this check valve may be parallel to a vertical line), and so on satisfy the above-described conditions.

(8) The first check valve may be a cup seal check valve and provided in an orientation in which a direction in which a seal member of the first check valve is easily bent coincides with the direction of the flow of the working fluid from the pressurization-device-coupled manual hydraulic pressure source to the at least one brake cylinder.

The seal member is bent and switched to its open state by the flow of the working fluid from the pressurization-device-coupled manual hydraulic pressure source to the at least one brake cylinder. The seal member is hard to be bent in an opposite direction, thereby preventing the flow of the working fluid from the at least one brake cylinder to the pressurization-device-coupled manual hydraulic pressure source.

A material, shape, size, and so on of the seal member are designed such that a force required to bend the seal member in the direction in which the seal member is easily bent (elastically deformed) is the set value (i.e., a height-difference-based set value).

(9) The first check valve may be a seating valve that includes a valve element and a valve seat, and the valve element is seated on the valve seat by a magnetic force that may be the set value (i.e., the height-difference-based set value).

At least one of the valve element and the valve seat is formed of a ferromagnetic material.

(10) The first check valve may be a relief valve, and a spring may have an urging force set at the set value.

(11) The outflow preventing device may comprise a second check valve provided parallel to the first check valve and configured to allow the flow of the working fluid from the at least one brake cylinder to the pressurization-device-coupled manual hydraulic pressure source and inhibit the flow of the working fluid from the pressurization-device-coupled manual hydraulic pressure source to the at least one brake cylinder.

The flow of the working fluid from the pressurization-device-coupled manual hydraulic pressure source to the at least one brake cylinder is inhibited in the case where the braking operation is not being performed.

When the brake actuating operation is performed, the flow of the working fluid from the pressurization-device-coupled manual hydraulic pressure source to the at least one brake cylinder is allowed, and when the brake releasing operation is performed, the flow of the working fluid from the at least one brake cylinder to the pressurization-device-coupled manual hydraulic pressure source is allowed.

(12) The movable unit may comprise a piston operable by the hydraulic pressure produced by the pressurization-device-coupled manual hydraulic pressure source, and the pressurization device may comprise (a) a movable-unit bypass passage that bypasses the movable unit to connect between the pressurization-device-coupled manual hydraulic pressure source and the common passage, (b) an input-side check valve provided in the movable-unit bypass passage and configured to: inhibit a flow of the working fluid from the common passage to the pressurization-device-coupled manual hydraulic pressure source; allow the flow of the working fluid from the pressurization-device-coupled manual hydraulic pressure source to the at least one brake cylinder when a subtraction value obtained by subtracting the hydraulic pressure in the at least one brake cylinder from the hydraulic pressure produced by the pressurization-device-coupled manual hydraulic pressure source is greater than the set value; and inhibit the flow of the working fluid from the manual hydraulic pressure source to the at least one brake cylinder when the subtraction value is equal to or less than the set value.

The movable-unit bypass passage corresponds to the intra-pressurization-device communication passage, and the input-side check valve is a constituent element of the outflow preventing device. The input-side check valve corresponds to the first check valve.

It is noted that the piston may be a stepped piston comprising: a large diameter portion to which the hydraulic pressure produced by the pressurization-device-coupled manual hydraulic pressure source is applied; and a small diameter portion that is communicates with the common passage.

(13) The piston may be a stepped piston comprising a large diameter portion and a small diameter portion, and the movable unit may comprise (i) a housing in which the stepped piston is fluid-tightly and slidably fitted, (ii) a larger-diameter-side chamber provided in a vicinity of the large diameter portion of the stepped piston and coupled with the pressurization-device-coupled manual hydraulic pressure source, (iii) a smaller-diameter-side chamber provided in a vicinity of the small diameter portion of the stepped piston and coupled with the at least one brake cylinder, (iv) a high pressure chamber coupled with the power hydraulic pressure source, (v) a high-pressure supply valve disposed between the high pressure chamber and the smaller diameter-side chamber and switchable from a closed state to an open state by forward movement of the stepped piston, (vi) an intra-piston communication passage provided in the stepped piston and configured to couple the larger-diameter-side chamber and the smaller-diameter-side chamber with each other, and (vii) an intra-piston check valve provided in the intra-piston communication passage and configured to allow a flow of the working fluid from the smaller-diameter-side chamber to the larger-diameter-side chamber and inhibit a flow of the working fluid from the larger-diameter-side chamber to the smaller-diameter-side chamber.

The intra-piston communication passage corresponds to the intra-pressurization-device communication passage, and the intra-piston check valve is a constituent element of the outflow preventing device. The intra-piston check valve corresponds to the second check valve.

The intra-piston communication passage provided in the stepped piston is located at a position where the intra-piston communication passage fluidically couples the smaller-diameter-side chamber and the larger-diameter-side chamber, in a state in which the stepped piston is spaced apart from the high-pressure supply valve. However, in the intra-piston communication passage is provided the intra-piston check valve configured to allow the flow of the working fluid from the smaller-diameter-side chamber to the larger-diameter-side chamber and inhibit the flow of the working fluid from the larger-diameter-side chamber to the smaller-diameter-side chamber. Thus, even in the state in which the stepped piston is spaced apart from the high-pressure supply valve, it is possible to inhibit the flow of the working fluid from the pressurization-device-coupled manual hydraulic pressure source to the at least one brake cylinder. Also, in the state in which the stepped piston is spaced apart from the high-pressure supply valve, a flow of the working fluid from at least one brake cylinder to the pressurization-device-coupled manual hydraulic pressure source is allowed, which prevents brake drag.

(14) The pressurization device may comprise a high-pressure-side check valve provided between the high pressure chamber and the power hydraulic pressure source and configured to allow a flow of the working fluid from the power hydraulic pressure source to the high pressure chamber and inhibit a flow of the working fluid from the high pressure chamber to the power hydraulic pressure source.

In a configuration in which the high-pressure-side check valve is provided, for example, even when a problem such as the abnormality in the electrical system causes the electric energy not to be supplied to the power hydraulic pressure source, and accordingly an output hydraulic pressure produced by the power hydraulic pressure source is lowered, it is possible to prevent a low hydraulic pressure from being supplied from the power hydraulic pressure source to the smaller-diameter-side chamber, which can prevent lowering of the hydraulic pressure in the smaller-diameter-side chamber.

(15) The hydraulic brake system may further comprise a normally-open output-side cut-off valve provided between the pressurization device and the common passage.

In a case where the system works normally, the output-side cut-off valve is in a closed state, so that the pressurization device is isolated from the common passage. The power hydraulic-pressure control device controls the hydraulic pressure in the common passage by utilizing the hydraulic pressure produced by the power hydraulic pressure source.

In a case of an abnormality in the control system, for example, the output-side cut-off valve is in an open state, so that the pressurization device is in communication with the common passage. A servo pressure provided by the pressurization device is supplied to the at least one brake cylinder via the common passage.

Since the output-side cut-off valve is the normally-open electromagnetic open/close valve, the output-side cut-off valve is in the open state in the event of the abnormality in the control system.

(16) The hydraulic brake system may further comprise an operation control valve switchable between a state in which the operation control valve allows an operation of the movable unit and a state in which the operation control valve inhibits the operation of the movable unit.

For example, the operation control valve may be provided between the high pressure chamber of the movable unit and the power hydraulic pressure source (a high-pressure cut-off valve), may be provided between the larger-diameter-side chamber and the pressurization-device-coupled manual hydraulic pressure source (a movable-unit input-side cut-off valve), may be provided between the smaller-diameter-side chamber and the common passage (a movable-unit output-side cut-off valve), and may be provided between the reservoir and a ring-shaped chamber provided between the stepped piston and the housing (a reservoir cut-off valve). When transfer and receipt of the working fluid are inhibited, the operation of the movable unit (i.e., an operation causing a pressurizing operation of the pressurization device) is inhibited, resulting in that the movable unit is not movable.

The operation control valve is preferably configured to establish the state allowing the operation (i.e., the open state) in a case where no current is supplied to a solenoid of the valve.

Also, the operation of the pressurization device is not always inhibited by inhibiting the operation of the movable unit.

(17) The hydraulic brake system further comprises: an input-side cut-off valve provided between the pressurization device and the pressurization-device-coupled manual hydraulic pressure source; and a high-pressure cut-off valve provided between the pressurization device and the power hydraulic pressure source.

When the high-pressure cut-off valve is switched to its closed state, the actuation of the movable unit can be suppressed. Also, when the input-side cut-off valve is switched to its closed state, a flow of the working fluid between the pressurization device and the pressurization-device-coupled manual hydraulic pressure source can be inhibited. Thus, the pressurization device can be kept in a non-operating state without providing the output-side cut-off valve between the pressurization device and the common passage, whereby the hydraulic pressure in the common passage can be controlled at a hydraulic pressure that is higher than that of the pressurization-device-coupled manual hydraulic pressure source. That is, the pressurization device can be directly connected to the common passage (without the electromagnetic open/close valve therebetween).

(18) The hydraulic brake system may further comprise a separate valve provided in the common passage between (i) positions where the common passage is connected to brake-side passages for the brake cylinders provided for the respective front left and right wheels and (ii) positions where the common passage is connected to brake-side passages for the brake cylinders provided for the respective rear left and right wheels.

The separate valve can separate a brake line including the brake cylinders provided for the respective front left and right wheels and a brake line including the brake cylinders provided for the respective rear left and right wheels from each other on a brake-cylinder side in a state in which the hydraulic pressure is supplied to the brake cylinders provided for the respective four wheels.

Also, the above-described high-pressure-side cut-off valve can separate a line including the brake cylinders operated by the pressurization device and a line including the brake cylinders operated by the hydraulic pressure produced by the power hydraulic pressure source from each other on a high-pressure side.

It is noted that the separate valve is not essential.

(19) The pressurization device is connected to the common passage, and an individual control valve corresponding to a brake cylinder that is coupled to the separate valve on an opposite side of the separate valve from a position at which the pressurization device is coupled to the separate valve is a normally open valve.

In the event of the abnormality in the control system, the working fluid is never supplied to the brake cylinders coupled to the separate valve on an opposite side of the separate valve from the pressurization device. Thus, each of the individual control valves provided respectively for these brake cylinders may be a normally-open electromagnetic open/close valve. Each of a pressure holding valve provided between the brake cylinder and the common passage and a pressure reduction valve provided between the brake cylinder and the reservoir may also be a normally-open electromagnetic open/close valve.

(20) The hydraulic brakes are provided respectively for the front left and right and rear left and right wheels of the vehicle, and the hydraulic brake system further comprises an abnormal-case servo-pressure supply device configured to supply a servo pressure to at least two brake cylinders of the plurality of brake cylinders in the event of the abnormality in the control system, wherein the servo pressure is an output hydraulic pressure provided by the pressurization device.

The abnormal-case servo-pressure supply device may be configured to one of: (i) supply the servo pressure to the brake cylinders provided for the respective front left and right wheels; (ii) supply the servo pressure to brake cylinders provided respectively for two wheels located at a pair of diagonal positions; (iii) supply the servo pressure to the brake cylinders provided for the respective front left and right wheels and a brake cylinder provided for one of the rear left and right wheels; (iv) supply the servo pressure to brake cylinders provided respectively for two wheels located at one pair of diagonal positions and a brake cylinder provided for one of two wheels located at the other pair of diagonal positions; and (v) supply the servo pressure to the brake cylinders provided respectively for the front left and right and rear left and right wheels.

The number, positions, and so on of brake cylinders to receive the servo pressure provided by the pressurization device in the event of the abnormality in the control system are determined by capabilities of the pressurization device (and capabilities of the manual hydraulic pressure source in some cases), a state of the vehicle, and other conditions.

For example, in a case where the servo pressure is supplied to the brake cylinders provided respectively for two or three wheels such that a braking force applied to the left wheel(s) and a braking force applied to the right wheel(s) differ from each other and in a case where a center of gravity of the vehicle is not located at a center of the vehicle in a right and left direction, wheels (i.e., positions thereof) to which the servo pressure is to be supplied can be determined so as to suppress generation of a yaw moment. Also, wheels (i.e., positions thereof) to which the servo pressure is to be supplied can be determined so as to generate a yaw moment in a direction that is desirable in terms of safety of driving. For example, in a region where legal regulations stipulate that a vehicle having a driver's seat provided in its right portion in a forward direction (namely, right-hand drive vehicle) must run on the left side of the road, wheels to which the servo pressure is to be supplied can be determined such that a yaw moment in a left-turning direction is applied to the vehicle, and in a region where legal regulations stipulate that a vehicle having a driver's seat provided in its left portion in the forward direction (namely, left-hand drive vehicle) must run on the right side of the road, wheels to which the servo pressure is to be supplied can be determined such that a yaw moment in a right-turning direction is applied to the vehicle.

It is noted that, in a case where the hydraulic brake system includes two manual hydraulic pressure sources, one of which is not connected to the pressurization device and the other of which is connected to the pressurization device, the volume (corresponding to an amount of working fluid that can be supplied) of the pressurization-device-connected manual hydraulic pressure source can be larger than that of the other manual hydraulic pressure source. This larger volume of the pressurization-device-connected manual hydraulic pressure source allows an increase in the number of brake cylinders to which the servo pressure can be supplied from the pressurization device in the event of the abnormality in the control system.

(21) The hydraulic brakes are provided respectively for the front left and right and rear left and right wheels of the vehicle, at least two of the plurality of brake cylinders are connected to the common passage respectively via brake-side passages in which a normally-open electromagnetic open/close valve is provided.

In a case where each of the brake-side passages is the individual brake-side passage for coupling a corresponding one of the brake cylinders and the common passage with each other, and the individual control valves are provided in the respective individual brake-side passages, an individual control valve corresponding to a brake cylinder to which the servo pressure is to be supplied in the event of the abnormality in the control system as described above is a normally-open electromagnetic open/close valve.

(22) Each of the at least one manual hydraulic pressure source may be connected to the at least one manual passage.

(23) The at least one manual passage may be connected to at least one of the at least one manual hydraulic pressure source except the pressurization-device-coupled manual hydraulic pressure source.

(24) A normally-open electromagnetic open/close valve may be provided in at least one of the brake-side passages for coupling the common passage and at least one of the plurality of brake cylinders to which the at least one manual passage is coupled.

(25) The hydraulic brake system comprises a supply-state control device configured to control states of respective hydraulic pressures supplied to the plurality of respective brake cylinders.

(26) The supply-state control device comprises at least one of (a) a power control pressure supplier configured to, when the power hydraulic-pressure control device is in a state in which the power hydraulic-pressure control device is capable of controlling the hydraulic pressure in the common passage, supply a power control pressure to the plurality of brake cylinders, wherein the power control pressure is a hydraulic pressure controlled by the power hydraulic-pressure control device; (b) an abnormal-case servo pressure supplier configured to, when the power hydraulic-pressure control device cannot control the hydraulic pressure in the common passage, supply a servo pressure that is an output hydraulic pressure provided by the pressurization device, to at least two brake cylinders comprising the brake cylinders provided for the respective front left and right wheels of the plurality of brake cylinders; (c) a power-control-pressure and manual-hydraulic-pressure supplier configured to, in case of possible fluid leakage in the hydraulic brake system, supply the power control pressure to the brake cylinders provided for the respective rear left and right wheels and supply the manual hydraulic pressure to the brake cylinders provided for the respective front left and right wheels, and (d) a front-left-and-right-wheel manual hydraulic pressure supplier configured to, when a hydraulic pressure outputtable by the power hydraulic pressure source is equal to or less than a set pressure, supply the manual hydraulic pressure to the brake cylinders provided for the respective front left and right wheels.

(27) The hydraulic brake system further comprises at least one brake-cylinder cut-off valve configured to disconnect the brake cylinders provided for the respective front left and right wheels from the common passage in a state in which the hydraulic pressure is supplied to the plurality of brake cylinders by the power-control-pressure and manual-hydraulic-pressure supplier.

In the case where the hydraulic brake system works normally, the brake cylinders provided for the respective front left and right wheels are isolated from the manual hydraulic pressure sources, and the servo pressure provided by the pressurization device is not supplied to the common passage (where the operation of the pressurization device is inhibited, the pressurization device may be disconnected from the common passage). The power control pressure is supplied to the brake cylinders provided for the respective four wheels.

In the event of an abnormality in a control system of the hydraulic brake system, the power hydraulic pressure source is isolated from the common passage, the manual hydraulic pressure sources are isolated from the brake cylinders provided for the respective front left and right wheels, the operation of the pressurization device is allowed, and the pressurization device is connected to the common passage. The servo pressure is applied to the brake cylinders that are in communication with the common passage.

In case of possible fluid leakage, the brake cylinders provided for the respective front left and right wheels are isolated from the common passage and coupled with the manual hydraulic pressure sources, and the brake cylinders provided for the respective rear left and right wheels are connected to the common passage. Also, the operation of the pressurization device is inhibited. Three lines are made independent of one another, so that the power control pressure is supplied to the brake cylinders provided for the respective rear left and right wheels, and the manual hydraulic pressures are respectively supplied to the brake cylinders provided for the respective front left and right wheels.

Even in a case where the pressurization device cannot perform enough pressure increase because the hydraulic pressure outputtable by the power hydraulic pressure source is lower than the set pressure, a power-control-pressure and manual-hydraulic-pressure supply state can be established. In this case, the brake cylinders provided for the respective front left and right wheels are respectively coupled with the manual hydraulic pressure sources, resulting in lower possibility of shortage of the hydraulic pressure. It is noted that the power hydraulic-pressure control device may be configured not to be controlled in a case where hydraulic pressures in the brake cylinders provided for the respective rear left and right wheels cannot be effectively controlled because the output hydraulic pressure produced by the power hydraulic pressure source is lower than the set pressure. This state may be referred to as "front-left-and-right-wheel manual hydraulic pressure supply state".

It is noted that the above-described individual control valves may be brake cut-off valves.

(28) The hydraulic brake system further comprises a brake circuit configured to, when a main switch of the vehicle is an OFF state, establish a state in which the brake cylinders provided for the respective front left and right wheels are decoupled from the manual hydraulic pressure source and connected to the common passage, the pressurization device is coupled and connected to the manual hydraulic pressure source and the common passage, the brake cylinders provided for the respective rear left and right wheels are disconnected to the common passage, and the power hydraulic pressure source is disconnected from the common passage.

As described above, when the hydraulic pressure outputtable by the power hydraulic pressure source is lower than the set pressure, the state in the present form can be established.

(29) A hydraulic brake system comprising:
a plurality of hydraulic brakes provided respectively for a plurality of wheels of a vehicle and each configured to be operated by a hydraulic pressure in a corresponding one of a plurality of brake cylinders to restrain rotation of a corresponding one of the plurality of wheels;
at least one manual hydraulic pressure source configured to produce a hydraulic pressure by a braking operation of a driver; and
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source,
the pressurization device comprising an intra-pressurization-device communication passage capable of fluidically coupling a pressurization-device-coupled manual hydraulic pressure source as the one manual hydraulic pressure source and at least one of the plurality of brake cylinders with each other, the hydraulic brake system further comprising an outflow preventing device configured to allow a flow of the working fluid between the pressurization-device-coupled manual hydraulic pressure source and the at least one brake cylinder within at least a period in the braking operation and prevent an outflow of the working fluid from the pressurization-device-coupled manual hydraulic pressure source to the at least one brake cylinder when the braking operation is not being performed.

The hydraulic brake system in the present form can adapt any of the technical features in the forms (1) through (27).

(30) A hydraulic brake system comprising:
a plurality of hydraulic brakes provided respectively for a plurality of wheels of a vehicle and each configured to be operated by a hydraulic pressure in a corresponding one of a plurality of brake cylinders to restrain rotation of a corresponding one of the plurality of wheels;
at least one manual hydraulic pressure source configured to produce a hydraulic pressure by a braking operation of a driver;
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source;
a common passage to which the pressurization device and the plurality of brake cylinders are connected; and
a power hydraulic device comprising a power hydraulic pressure source configured to produce a hydraulic pressure by supply of electric energy, the power hydraulic device being capable of utilizing the hydraulic pressure produced by the power hydraulic pressure source to control a hydraulic pressure in the common passage,
the hydraulic brake system further comprising an outflow preventing device configured to prevent an outflow of the working fluid from the one manual hydraulic pressure source in a case where no electric energy is supplied to the hydraulic brake system, and the braking operation is not being performed.

For example, the outflow preventing device may be configured to prevent the outflow of the working fluid from the one manual hydraulic pressure source in a case where the main switch of the vehicle is in an OFF state, and the braking operation is not being performed.

The hydraulic brake system in the present form can adapt any of the technical features in the forms (1) through (28).

(31) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;
a hydraulic-pressure producing device configured to produce a hydraulic pressure;
a low pressure source;
a plurality of pressurization-side individual control valves provided between the plurality of respective brake cylinders and the hydraulic-pressure producing device; and
a plurality of pressure-reduction-side individual control valves provided between the plurality of respective brake cylinders and the low pressure source,
wherein each of both of the plurality of pressurization-side individual control valves and the plurality of pressure-reduction-side individual control valves is a normally-open electromagnetic open/close valve.

The hydraulic brake system in the present form can adapt any of the technical features in the forms (1) through (30). It is noted that each of the plurality of pressurization-side individual control valve can be referred to as "pressure holding valve", and each of the plurality of pressure-reduction-side individual control valves as "pressure reduction valve".

(32) The hydraulic brake system may further comprise a manual hydraulic pressure source configured to produce a hydraulic pressure by an operation of a driver,
wherein the hydraulic-pressure producing device comprises at least a pressurization device configured to be operated by the hydraulic pressure produced by the manual hydraulic pressure source, wherein the hydraulic brake system further comprises (a) a common passage to which the plurality of brake cylinders are connected and to which the pressurization device is connected and (b) a separate valve that is a normally-closed electromagnetic open/close valve provided in the common passage, and wherein the plurality of pressurization-side individual control valves are provided between the common passage and ones of the plurality of brake cylinders which are coupled to the common passage on an opposite side of the separate valve from a position where the pressurization device is coupled to the common passage, and the plurality of pressure-reduction-side individual control valves are provided between the low pressure source and the ones of the plurality of brake cylinders.

In the event of an abnormality in the control system, the working fluid is never supplied to the brake cylinders that are coupled to the common passage on an opposite side of the separate valve from a position where the pressurization device is coupled to the common passage. Thus, each of the plurality of pressure-reduction-side individual control valves may be a normally open valve. Also, the plurality of pressure-reduction-side individual control valves as the normally open valves can prevent brake drag upon brake releasing. On the other hand, upon application of the hydraulic brake, the pressurization-side individual control valves are usually in open states. Thus, where the plurality of pressurization-side individual control valves are provided as normally-open electromagnetic open/close valves, power consumption can be reduced accordingly.

As described above, where each of both of the plurality of pressurization-side individual control valves and the plurality of pressure-reduction-side individual control valves is provided as a normally-open electromagnetic open/close valve, it is possible to reduce the power consumption upon brake application and prevent the brake drag upon brake releasing when compared with a case where each of the pressurization-side individual control valves is a normally-closed electromagnetic open/close valve.

(33) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;
a power hydraulic pressure source configured to produce a hydraulic pressure by supply of electric energy;
at least one manual hydraulic pressure source configured to produce a hydraulic pressure by a braking operation of a driver;
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source;
a common passage to which the pressurization device and the power hydraulic pressure source are connected and to which the plurality of brake cylinders are connected;
a power hydraulic-pressure control device configured to control a hydraulic pressure in the common passage by utilizing the hydraulic pressure produced by the power hydraulic pressure source; and
an abnormal-case servo-pressure supply device configured to, when the power hydraulic-pressure control device cannot control the hydraulic pressure in the common passage, supply a servo pressure to brake cylinders provided respectively for at least two wheels comprising front left and right wheels of the four wheels, wherein the servo pressure is an output hydraulic pressure provided by the pressurization device.

Where the servo pressure is supplied to the brake cylinders provided respectively for the at least two wheels including the front left and right wheels, a large braking force can be applied to the entire vehicle when compared with a configuration in which a manual hydraulic pressure is supplied to the cylinders.

Also, in a case where the servo pressure is supplied to the brake cylinders provided for the respective front left and right wheels in the event of an abnormality in which the power hydraulic-pressure control device cannot control the hydraulic pressure in the common passage and where the center of gravity of the entire vehicle is located at generally a center of the vehicle in the right and left direction, the generation of the yaw moment can be suppressed in the event of the abnormality.

The hydraulic brake system in the present form can adapt any of the technical features in the forms (1) through (29).

It is noted that, while the plurality of brake cylinders are connected to the common passage, the plurality of brake cylinders may be connected to the common passage by the respective individual brake-side passages or may be connected to the common passage such that at least two of the brake cylinders are connected to the common passage in common by the brake-side passage.

(34) The abnormal-case servo-pressure supply device may comprise a three-wheel supplier configured to supply the servo pressure to brake cylinders provided respectively for three wheels comprising the front left and right wheels.

For example, the servo pressure may be supplied to brake cylinders provided respectively for the front left and right wheels and one of the rear left and right wheels.

(35) The abnormal-case servo-pressure supply device may comprise a four-wheel supplier configured to supply the servo pressure to the brake cylinders provided respectively for the front left and right and rear left and right wheels.

(36) The pressurization device comprises (a) an outer-circumferential-side cylindrical portion and an inner-circumferential-side cylindrical portion arranged one inside another; and (b) a hydraulic-pressure control valve configured to couple and decouple an output port connected to the common passage and a high pressure port coupled to the power hydraulic pressure source to and from each other by relative movement of the outer-circumferential-side cylindrical portion and the inner-circumferential-side cylindrical portion in an axial direction thereof, one of the outer-circumferential-side cylindrical portion and the inner-circumferential-side cylindrical portion is movable in the axial direction by a hydraulic pressure produced by a pressurization-device-coupled manual hydraulic pressure source as the one manual hydraulic pressure source, and another of the outer-circumferential-side cylindrical portion and the inner-circumferential-side cylindrical portion is movable by a motive force a solenoid.

A portion of the pressurization device which is operable by the motive force of the solenoid can be considered as a constituent element of the power hydraulic-pressure control device.

The pressurization device is operable also by the motive force of the solenoid, and a current to be supplied to the solenoid is controlled to control a hydraulic pressure in the output port. The hydraulic pressure in the output port may be controlled to be lower than the hydraulic pressure produced by the manual hydraulic pressure source. Thus, the pressurization device in the present form can be referred to as "mechanical/power hydraulic-pressure control device having a pressurization-device function".

It is noted that in the event of an abnormality in which a current cannot be supplied to the solenoid, the pressurization device can be operated by the hydraulic pressure produced by the manual hydraulic pressure source to produce a hydraulic pressure that is higher than the hydraulic pressure produced by the manual hydraulic pressure source. Also, the inner-circumferential-side cylindrical portion may be any of a solid cylindrical portion and a hollow cylindrical portion.

(37) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;
at least one manual hydraulic pressure source configured to produce a hydraulic pressure by a braking operation of a driver;
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source;
a common passage to which the pressurization device is connected and to which the four brake cylinders are connected respectively via four individual brake-side passages; and
four individual control valves provided respectively in the four individual brake-side passages,
wherein each of individual control valves respectively provided for at least two brake cylinders comprising the brake cylinders provided for the respective front left and right wheels among the four individual control valves is a normally open valve.

Where the pressurization device is connected to the common passage, and the brake cylinders provided for the respective front left and right wheels are connected to the common passage respectively via the normally open valves, the servo pressure provided by the pressurization device can be supplied to the brake cylinders provided for the respective front left and right wheels in the event of the abnormality in the electrical system.

The hydraulic brake system in the present form can adapt any of the technical features in the forms (1) through (29).

(38) At least one of individual control valves provided corresponding to the brake cylinders provided for the respective rear left and right wheels among the four individual control valves is a normally closed valve.

(39) Each of all the four individual control valves is a normally open valve.

(40) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;
a power hydraulic pressure source configured to produce a hydraulic pressure by supply of electric energy;
at least one manual hydraulic pressure source configured to produce a hydraulic pressure by a braking operation of a driver;
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source;
a common passage to which the pressurization device is connected and to which the four brake cylinders are connected;
a power hydraulic-pressure control device capable of electrically controlling hydraulic pressures in the four brake cylinders by utilizing the hydraulic pressure produced by the power hydraulic pressure source; and
an abnormal-case mechanical-pressure supply device capable of supplying the output hydraulic pressure provided by the pressurization device, at least to at least two brake cylinders comprising the brake cylinders provided for the respective front left and right wheels, when the power hydraulic-pressure control device cannot control a hydraulic pressure in at least one of the four brake cylinders.

The hydraulic brake system in the present form can adapt any of the technical features in the forms (1) through (36).

(41) A hydraulic brake system comprising:
a brake operating member provided in a vehicle and operable by a driver;
at least one manual hydraulic pressure source configured to produce a hydraulic pressure by an operation for the brake operating member;
a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source; and
an input-side cut-off valve that is an electromagnetic open/close valve provided between the pressurization device and the one manual hydraulic pressure source.

The hydraulic brake system in the present form can adapt any of the technical features in the forms (1) through (37).

(42) The hydraulic brake system may further comprise: a plurality of hydraulic brakes provided respectively for a plurality of wheels provided on the vehicle and each configured to be operated by a hydraulic pressure in a corresponding one of a plurality of brake cylinders to restrain rotation of a corresponding one of the plurality of wheels; and two manual hydraulic pressure sources each as the manual hydraulic pressure source,
wherein one of the two manual hydraulic pressure sources bypasses the pressurization device to be coupled to a first brake cylinder as at least one of the plurality of brake cylinders via a first manual passage,
wherein another of the two manual hydraulic pressure sources is coupled to a second brake cylinder as at least one of the plurality of brake cylinders via the pressurization device, and
wherein the input-side cut-off valve is a normally open valve provided between said another of the two manual hydraulic pressure sources and the pressurization device.

In the hydraulic brake system in the present form, said another of the two manual hydraulic pressure sources corresponds to the one manual hydraulic pressure source.

Each of the first brake cylinder and the second brake cylinder may be constituted by one cylinder or two or more cylinders. Also, the first brake cylinder and the second brake cylinder may be identical to each other, differ from each other, partly identical to each other, or have a relationship in which one of the first brake cylinder and the second brake cylinder includes the other.

For example, the first brake cylinder may be a brake cylinder provided for one of the front left and right wheels, and the second brake cylinder may include two brake cylinders provided respectively for the front left and right wheels.

(43) The hydraulic brake system may further comprise:
a stroke simulator coupled to said another of the two manual hydraulic pressure sources; and
a first input-side cut-off valve control device configured to: place the input-side cut-off valve in a closed state when the stroke simulator is allowed to be operated; and place the input-side cut-off valve in an open state when the stroke simulator is inhibited from being operated.

(44) The hydraulic brake system may further comprise:
a plurality of hydraulic brakes provided respectively for a plurality of wheels of the vehicle and each configured to be operated by a hydraulic pressure in a corresponding one of a plurality of brake cylinders to restrain rotation of a corresponding one of the plurality of wheels;
a power hydraulic pressure source configured to produce a hydraulic pressure by supply of electric energy;
a power hydraulic-pressure control device capable of utilizing the hydraulic pressure produced by the power hydraulic pressure source to electrically control the hydraulic pressures in the plurality of respective brake cylinders; and
a second input-side cut-off valve control device configured to place the input-side cut-off valve in the closed state when the power hydraulic-pressure control device is in a normal state in which the power hydraulic-pressure control device is capable of controlling the hydraulic pressures in the plurality of respective brake cylinders.

It is noted that the input-side cut-off valve can also be configured to be placed in the closed state when the braking operation is performed, with the power hydraulic-pressure control device being in the normal state.

(45) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;
a power hydraulic system configured to: produce a hydraulic pressure by supply of electric energy; control the produced hydraulic pressure; and supply the controlled hydraulic pressure to the plurality of brake cylinders provided respectively for the front left and right and rear left and right wheels; and
a manual hydraulic system configured to, in case of an abnormality in the power hydraulic system, supply a manual hydraulic pressure produced in response to a braking operation of a driver, to brake cylinders provided respectively for three wheels of the four wheels.

The hydraulic brake system in the present form can adapt any of the technical features in the forms (1) through (41).

(46) The manual hydraulic system may comprise: (a) two first manual hydraulic pressure sources each configured to produce a hydraulic pressure that is related to an operating force of a driver for a brake operating member; (b) a second manual hydraulic pressure source operable by a hydraulic pressure produced by one of the two first manual hydraulic pressure sources and configured to produce a hydraulic pressure that is greater than the hydraulic pressure produced by the one of the two first manual hydraulic pressure sources; and (c) a mixed-type hydraulic pressure distributor capable of supplying a hydraulic pressure produced by another of the two first manual hydraulic pressure sources to one or ones of the brake cylinders provided respectively for three wheels and supplying the hydraulic pressure produced by the second manual hydraulic pressure source to the other of the brake cylinders provided respectively for three wheels.

For example, the system may be configured such that the first manual hydraulic pressure source is a tandem master cylinder, and the second manual hydraulic pressure source is a pressurization device.

In a case where the hydraulic pressure produced by the other of the two first manual hydraulic pressure sources is supplied to one or two of the three brake cylinders, and the hydraulic pressure produced by the second manual hydraulic pressure source is supplied to remaining two or one of the brake cylinders, for example, in a case where the hydraulic pressure produced by the other of the two first manual hydraulic pressure sources is supplied to the brake cylinder provided for one of the front left and right wheels, e.g., the front left wheel, the hydraulic pressure produced by the second manual hydraulic pressure source is supplied to the brake cylinder provided for the other of the front left and right wheels, e.g., the front right wheel (that is, a braking force $F_{FR}$ applied to the front right wheel is larger than a braking force $F_{FL}$ applied to the front left wheel ($F_{FR} > F_{FL}$)), and the hydraulic pressure produced by the second manual hydraulic pressure source is supplied to the brake cylinder provided for the rear left wheel, the sum of braking forces applied to left wheels is generally equal to the sum of braking forces applied to right wheels ($F_{FR}+0 \approx F_{FL} F_{RL}$).

Thus, the system may be configured such that the hydraulic pressure produced by the second manual hydraulic pressure source is supplied to the diagonal wheels, and the hydraulic pressure produced by the first manual hydraulic pressure source is supplied to the other wheel.

(47) The manual hydraulic system may comprise: (a) at least one first manual hydraulic pressure source each configured to a hydraulic pressure that is related to an operating force of a driver for a brake operating member; (b) a second manual hydraulic pressure source operable by a hydraulic pressure produced by one of the at least one first manual hydraulic pressure source and configured to produce a hydraulic pressure that is greater than the hydraulic pressure produced by the one first manual hydraulic pressure source; and (c) a single-type hydraulic-pressure distributor capable of supplying the hydraulic pressure produced by one of the second manual hydraulic pressure source and the at least one first manual hydraulic pressure source, to the brake cylinders provided respectively for three wheels.

There are a case where the hydraulic pressure produced by the second manual hydraulic pressure source is supplied to all the brake cylinders provided respectively for three wheels and a case where the hydraulic pressure produced by the at least one first manual hydraulic pressure source is supplied to all the brake cylinders. In the latter case, the hydraulic pressure may be supplied to all the brake cylinders from the first manual hydraulic pressure source coupled to the second manual hydraulic pressure source, may be supplied to all the brake cylinders from the first manual hydraulic pressure source not coupled to the second manual hydraulic pressure source, and may be supplied to one or two of the three brake cylinders from the first manual hydraulic pressure source coupled to the second manual hydraulic pressure source and to the other two or one of the three brake cylinders from the first manual hydraulic pressure source not coupled to the second manual hydraulic pressure source.

(48) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels; and a manual hydraulic system configured to, in case of an abnormality in the power hydraulic system, compare a length of an arm extending from a center of gravity of the vehicle to a position where right wheels contact a road surface and a length of an arm extending from the center of gravity of the vehicle to a position where left wheels contact a road surface with each other to supply a manual hydraulic pressure produced in response to a braking operation of a driver, to brake cylinders provided respectively for three wheels of the four wheels such that a sum of braking forces applied to front and rear wheels located on a side nearer to a longer one of the arms is less than a sum of braking forces applied to front and rear wheels located on a side nearer to a shorter one of the arms.

The hydraulic brake system in the present form can adapt any of the technical features in the forms (1) through (44).

(49) A hydraulic brake system comprising:
a plurality of hydraulic brakes provided respectively for front left and right and rear left and right wheels of a vehicle comprising a driver's seat provided in a right portion of the vehicle in a forward direction, the plurality of hydraulic brakes each being configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels, and a manual hydraulic system configured to, in case of an abnormality in the power hydraulic system, supply a manual hydraulic pressure produced in response to a braking operation of a driver, to three of the front left and right and rear left and right brake cylinders such that a yaw moment causing the vehicle to turn in a left direction acts on the vehicle.

The hydraulic brake system in the present form can adapt any of the technical features in the forms (1) through (45).

(50) A hydraulic brake system comprising:
a plurality of hydraulic brakes provided respectively for front left and right and rear left and right wheels of a vehicle comprising a driver's seat provided in a right portion of the vehicle in a forward direction, the plurality of hydraulic brakes each being configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels; and a manual hydraulic system configured to, in case of an abnormality in the power hydraulic system, supply a manual hydraulic pressure produced in response to a braking operation of a driver, to the brake cylinders provided respectively for the front right wheel, the front left wheel, and the rear right wheel.

The hydraulic brake system in the present form can adapt any of the technical features in the forms (1) through (45).

(51) A hydraulic brake system comprising:
a plurality of hydraulic brakes provided respectively for front left and right and rear left and right wheels of a vehicle comprising a driver's seat provided in a left portion of the vehicle in a forward direction, the plurality of hydraulic brakes each being configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels; and a manual hydraulic system configured to, in case of an abnormality in the power hydraulic system, supply a manual hydraulic pressure produced in response to a braking operation of a driver, to three of the front left and right and rear left and right brake cylinders such that a yaw moment causing the vehicle to turn in a right direction acts on the vehicle.

The hydraulic brake system in the present form can adapt any of the technical features in the forms (1) through (45).

(52) A hydraulic brake system comprising:
a plurality of hydraulic brakes provided respectively for front left and right and rear left and right wheels of a vehicle comprising a driver's seat provided in a left portion of the vehicle in a forward direction, the plurality of hydraulic brakes each being configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels;

a manual hydraulic system configured to, in case of an abnormality in the power hydraulic system, supply a manual hydraulic pressure produced in response to a braking operation of a driver, to the brake cylinders provided respectively for the front right wheel, the front left wheel, and the rear left wheel.

The hydraulic brake system in the present form can adapt any of the technical features in the forms (1) through (45).

(53) A hydraulic brake system comprising:
a plurality of hydraulic brakes provided respectively for front left and right and rear left and right wheels of a vehicle and each configured to be operated by a hydraulic pressure in a corresponding one of a plurality of brake cylinders to restrain rotation of a corresponding one of the four wheels;

a power hydraulic system configured to: produce a hydraulic pressure by supply of electric energy; control the produced hydraulic pressure; and supply the controlled hydraulic pressure to the brake cylinders provided for the respective four wheels;

a manual hydraulic system configured to, in case of an abnormality in the power hydraulic system, supply a manual hydraulic pressure produced in response to a braking operation of a driver, to two brake cylinders provided respectively for two wheels of the four wheels which are respectively located at diagonal positions diagonal to each other, such that a braking force applied to a right wheel and a braking force applied to a left wheel are different from each other, the manual hydraulic system further comprising: (i) at least one first manual hydraulic pressure source each configured to produce a hydraulic pressure related to an operating force of the driver for a brake operating member; (ii) a second manual hydraulic pressure source operable by at least a hydraulic pressure produced by one of the at least one first manual hydraulic pressure source and configured to produce a hydraulic pressure that is greater than the hydraulic pressure produced by the one first manual hydraulic pressure source; and (iii) a second hydraulic-pressure supplier configured to supply the hydraulic pressure produced by the second manual hydraulic pressure source, to the two brake cylinders provided respectively for the two wheels located at the diagonal positions.

The hydraulic brake system in the present form can adapt any of the technical features in the forms (1) through (49).

(54) A hydraulic brake system comprising:
a power hydraulic pressure source configured to produce a hydraulic pressure by supply of electric energy;
at least one manual hydraulic pressure source configured to produce a hydraulic pressure by a braking operation of a driver;
a pressurization device provided between the power hydraulic pressure source and one of the at least one manual hydraulic pressure source and capable of supplying a hydraulic pressure that is greater than the hydraulic pressure produced by the one manual hydraulic pressure source, to the brake cylinder by utilizing the hydraulic pressure produced by the power hydraulic pressure source; and
a pressurization-device check device configured to execute a check of whether an operation of the pressurization device is normal,
the pressurization-device check device comprising at least one of (i) a first checker configured to execute the check based on a relationship between the input-side hydraulic pressure in the pressurization device and the output-side hydraulic pressure in the pressurization device and (ii) a second checker configured to execute the check based on a change in the output-side hydraulic pressure in the pressurization device.

The hydraulic brake system in the present form can adapt any of the technical features in the forms (1) through (50).

(55) The first checker comprises a first normality determiner configured to determine that the operation of the pressurization device is normal, when a predetermined relationship between the input-side hydraulic pressure in the pressurization device and the output-side hydraulic pressure in the pressurization device is established.

(56) The first checker comprises an input hydraulic pressure obtainer configured to obtain the input-side hydraulic pressure based on at least one of the hydraulic pressure produced by the at least one manual hydraulic pressure source and a state of the braking operation.

(57) The hydraulic brake system further comprises an input-side cut-off valve provided between the pressurization device and a pressurization-device-coupled manual hydraulic pressure source as the one manual hydraulic pressure source, and
the second checker comprises an input-hindered-state check executer configured to execute the check in a state in which the input-side cut-off valve is in a closed state.

(58) The pressurization device comprises: (a) a piston configured to be moved by at least the hydraulic pressure produced by the pressurization-device-coupled manual hydraulic pressure source; (b) a control pressure chamber provided in front of the piston; (c) a high-pressure supply valve provided between the control pressure chamber and a high pressure chamber to which the power hydraulic pressure source is coupled, the hydraulic brake system further comprises a high-pressure cut-off valve provided between the pressurization device and the power hydraulic pressure source, and
the second checker further comprises a second normality determiner configured to determine that the operation of the pressurization device is normal when the hydraulic pressure in the control pressure chamber increases in a case where the high-pressure cut-off valve is switched from a closed state to an open state in a state in which the hydraulic pressure in the control pressure chamber is equal to or greater than a set pressure that is a hydraulic pressure causing the high-pressure supply valve to be switched from the closed state to the open state.

(59) The high-pressure supply valve is configured to be switched from the closed state to the open state by a forward movement of the piston,
the pressurization device further comprises an input-side hydraulic-pressure chamber coupled to the pressurization-device-coupled manual hydraulic pressure source, and
the piston comprises an intra-piston communication passage formed in the piston and coupling the control pressure chamber and the input-side hydraulic-pressure chamber to each other, and the piston is configured to be moved forward by the hydraulic pressure in the input-side hydraulic-pressure chamber and brought into contact with the high-pressure supply valve to close the intra-piston communication passage.

(60) The second checker further comprises a pre-check output-side hydraulic-pressure controller configured to control the hydraulic pressure in the control pressure chamber to move the piston forward to switch the high-pressure supply valve from the closed state to the open state.

(61) The pressurization device exhibits hysteresis, and the second checker further comprises a hysteresis-utilizing hydraulic-pressure controller configured to build up and then reduce the hydraulic pressure in the control pressure chamber to make the hydraulic pressure in the control pressure chamber and the hydraulic pressure in the input-side hydraulic-pressure chamber generally equal to each other.

(62) The second checker further comprises:
(a) a pressurization controller configured to execute pressurization control for building up the hydraulic pressure in the control pressure chamber such that the stepped piston is moved forward to establish a servo state in which the hydraulic pressure in the control pressure chamber is greater than the hydraulic pressure in the input-side hydraulic-pressure chamber;
(b) a pressure-reduction controller configured to, after the hydraulic pressure in the control pressure chamber is built up by the pressurization controller, execute pressure-reduction control for reducing the hydraulic pressure in the control pressure chamber to establish a non-servo state in which the hydraulic pressure in the control pressure chamber is equal to the hydraulic pressure in the input-side hydraulic-pressure chamber; and (c) a servo-state-transition normality determiner configured to determine that the operation of the pressurization device is normal, in a case where when the non-servo state is established by the pressure-reduction controller, and thereafter the high-pressure cut-off valve is controlled to be switched from the closed state to the open state, the non-servo state is switched to the servo state.

(63) The second checker further comprises:
(a) a pressureization controller configured to execute pressurization control for building up the hydraulic pressure in the control pressure chamber such that the stepped piston is moved forward to establish a servo state in which the hydraulic pressure in the control pressure chamber is greater than the hydraulic pressure in the input-side hydraulic-pressure chamber; and
(b) a servo-state-pressurization normality determiner configured to determine that the operation of the pressurization device is normal, in a case where when the servo state is established by the pressurization controller, and thereafter the high-pressure cut-off valve is switched from the closed state to the open state, the hydraulic pressure in the control pressure chamber increases in the servo state.

(64) The pressurization device further comprises an input-side hydraulic-pressure chamber coupled to the pressurization-device-coupled manual hydraulic pressure source, the high-pressure supply valve is configured to be switched from the closed state to the open state by a forward movement of the piston, the piston is configured to be moved forward by the hydraulic pressure in the input-side hydraulic-pressure chamber, and the second checker comprises a pre-check input-side hydraulic-pressure pressurization controller configured to execute the pressurization control for the hydraulic pressure in the input-side hydraulic-pressure chamber such that the high-pressure supply valve is switched from the closed state to the open state.

(65) The hydraulic brake system further comprises: an extra-piston communication passage that bypasses the piston to couple the input-side hydraulic-pressure chamber and the control pressure chamber to each other; and an extra-piston communication cut-off valve provided in the communication passage.

Since the control pressure chamber and the input-side hydraulic-pressure chamber are coupled with each other by the extra-piston communication passage, the power hydraulic-pressure control device can be utilized in an open state of the communication cut-off valve to control the hydraulic pressure in the input-side hydraulic-pressure chamber.

(66) The second checker comprises: (a) a pressurization controller configured to, in a state in which the communication cut-off valve is controlled to be in the open state, control the power hydraulic-pressure control device to execute the pressurization control such that the hydraulic pressure in the input-side hydraulic-pressure chamber is built up to a hydraulic pressure that moves the piston forward to switch the high-pressure supply valve from the closed state to the open state; (b) a communication-cut-off-valve controller configured to control the communication cut-off valve to be switched to a closed state in a state in which the hydraulic pressure in the input-side hydraulic-pressure chamber is controlled by the pressurization controller; and (c) an input-hydraulic-pressure-control normality determiner configured to determine that the operation of the pressurization device is normal, when the hydraulic pressure in the control pressure chamber increases in a case where the high-pressure cut-off valve is controlled to be switched from the closed state to the open state after the communication cut-off valve is controlled by the communication-cut-off-valve controller.

(67) One of the at least one manual hydraulic pressure source comprises an assisting device configured to add an assisting force to a braking operation force of the driver and output a total force of the assisting force and the braking operation force, and the hydraulic pressure in the control pressure chamber of the pressurization device is supplied to the assisting device and functions as the assisting force.

The output-side hydraulic pressure in the pressurization device is supplied to the brake cylinder via the manual hydraulic pressure source (specifically, the manual hydraulic pressure source with the assisting device). A predetermined relationship is established between the output-side hydraulic pressure in the pressurization device and the output-side hydraulic pressure produced by the manual hydraulic pressure source with the assisting device.

In this case, the output-side hydraulic pressure produced by the manual hydraulic pressure source with the assisting device can be employed as the output-side hydraulic pressure in the pressurization device. For example, in a case where the control pressure chamber of the pressurization device is coupled to a rear hydraulic-pressure chamber formed at a rear of the pressurizing piston of the master cylinder with the assisting device as the manual hydraulic pressure source with the assisting device, a hydraulic pressure in a pressure chamber in front of the pressurizing piston is related to a hydraulic pressure in the rear hydraulic-pressure chamber. Thus, the hydraulic pressure in the pressure chamber formed in front of the pressurizing piston of the master cylinder with the assisting device can be used as the output-side hydraulic pressure in the pressurization device, or alternatively the output-side hydraulic pressure in the pressurization device can be estimated on the basis of the hydraulic pressure in the pressure chamber formed in front of the pressurizing piston.

(68) The second checker further comprises a closed-space former configured to, when the check is executed, cause a portion comprising the control pressure chamber to be a closed space.

(69) The hydraulic brake system further comprises a power hydraulic-pressure control device configured to control the hydraulic pressure in the control pressure chamber by utilizing the hydraulic pressure produced by the power hydraulic pressure source.

The second checker may be configured to control the power hydraulic-pressure control device to control the hydraulic pressure in the control pressure chamber. The power hydraulic-pressure control device may comprise the pressurization linear control valve, the pressure-reduction linear control valve, and other similar devices.

It is noted that the power hydraulic-pressure control device can also be controlled by the first checker, allowing checking in various modes.

(70) The hydraulic brake system may further comprise: a plurality of brake cylinders of a plurality of respective hydraulic brakes provided respectively for a plurality of wheels of the vehicle to restrain rotations of the plurality of respective wheels; a common passage to which the plurality of brake cylinders are connected and to which the pressurization device is connected; and a power hydraulic-pressure control device capable of controlling a hydraulic pressure in the common passage by utilizing the hydraulic pressure produced by the power hydraulic pressure source, wherein the second checker is configured to execute the check in a state in which the control pressure chamber communicates with the common passage.

(71) The pressurization-device check device further comprising an operating checker configured to check whether the operation of the pressurization device is normal, when each of the plurality of hydraulic brakes is in the working state.

(72) A hydraulic-pressure supply system comprising:
an external hydraulic pressure source;
a power hydraulic pressure source configured to produce a hydraulic pressure by supply of electric energy;
a pressurization device configured to be operated by the hydraulic pressure produced by the external hydraulic pressure source and capable of outputting a hydraulic pressure that is greater than the hydraulic pressure produced by the external hydraulic pressure source, by utilizing the hydraulic pressure produced by the power hydraulic pressure source;
a high-pressure cut-off valve provided between the pressurization device and the power hydraulic pressure source; and
a pressurization-device check device configured to execute a check of whether an operation of the pressurization device is normal, the pressurization device comprising: (a) a piston configured to be moved by the hydraulic pressure produced by the external hydraulic pressure source; (b) a control pressure chamber provided in front of the piston; and (c) a high-pressure supply valve provided between the control pressure chamber and a high pressure chamber to which the power hydraulic pressure source is coupled, the pressurization-device check device comprising a pressurization-device normality determiner configured to determine that the operation of the pressurization device is normal when the hydraulic pressure in the control pressure chamber increases in a case where the high-pressure cut-off valve is switched from a closed state to an open state in a state in which the hydraulic pressure in the control pressure chamber is equal to or greater than a set pressure that is a hydraulic pressure causing the high-pressure supply valve to be switched from the closed state to the open state.

The hydraulic-pressure supply system in the present form can adapt any of the technical features in the forms (1) through (68).

BRIEF DESCRIPTION OF THE DRAWINGS

FIG. 4(a) is a cross-sectional view illustrating a cup seal check valve, FIG. 4(b-i) is a cross-sectional view illustrating a ball check valve, FIG. 4(b-ii) is a cross-sectional view taken along line A-A in FIG. 4(b-i), and FIG. 4(c) is a view conceptually illustrating a magnetic check valve.

FIG. 13(a) is a hydraulic-brake circuit diagram of a hydraulic brake system according to embodiment 5 of the present invention, and FIG. 13(b) is a view illustrating a left-hand drive vehicle on which the hydraulic brake system is mounted.

FIG. 14(a) is a hydraulic-brake circuit diagram of a hydraulic brake system according to embodiment 6 of the present invention, and FIG. 14(b) is a view illustrating a left-hand drive vehicle on which the hydraulic brake system is mounted.

FIG. 22(a) is a view illustrating a state where the check program is executed in the hydraulic brake system (check 1), and FIG. 22(b) is a diagram representative of a relationship between an input-side hydraulic pressure and an output-side hydraulic pressure in the pressurization device.

FIG. 25 is a diagram representative of change in a hydraulic pressure in a smaller-diameter-side chamber upon check 2.

FIG. 25(a) is a diagram representative of change in hydraulic pressure in a case where the hydraulic pressure in the smaller-diameter-side chamber becomes a target hydraulic pressure.

FIG. 25(b) is a diagram representative of change in hydraulic pressure in a case where a high-pressure cut-off valve is switched from a closed state to an open state.

FIG. 25(c) is a diagram representative of change in the hydraulic pressure in the smaller-diameter-side chamber upon a check different from checks 1 and 2.

FIG. 34(a) is a hydraulic-brake circuit diagram of a hydraulic brake system according to embodiment 11 of the present invention, and FIG. 34(b) is a view illustrating a left-hand drive vehicle on which the hydraulic brake system is mounted.

FIG. 35(a) is a hydraulic-brake circuit diagram of a hydraulic brake system according to embodiment 12 of the present invention, and FIG. 35(b) is a view illustrating a right-hand drive vehicle on which the hydraulic brake system is mounted.

MODES FOR CARRYING OUT THE INVENTION

Figure 1:
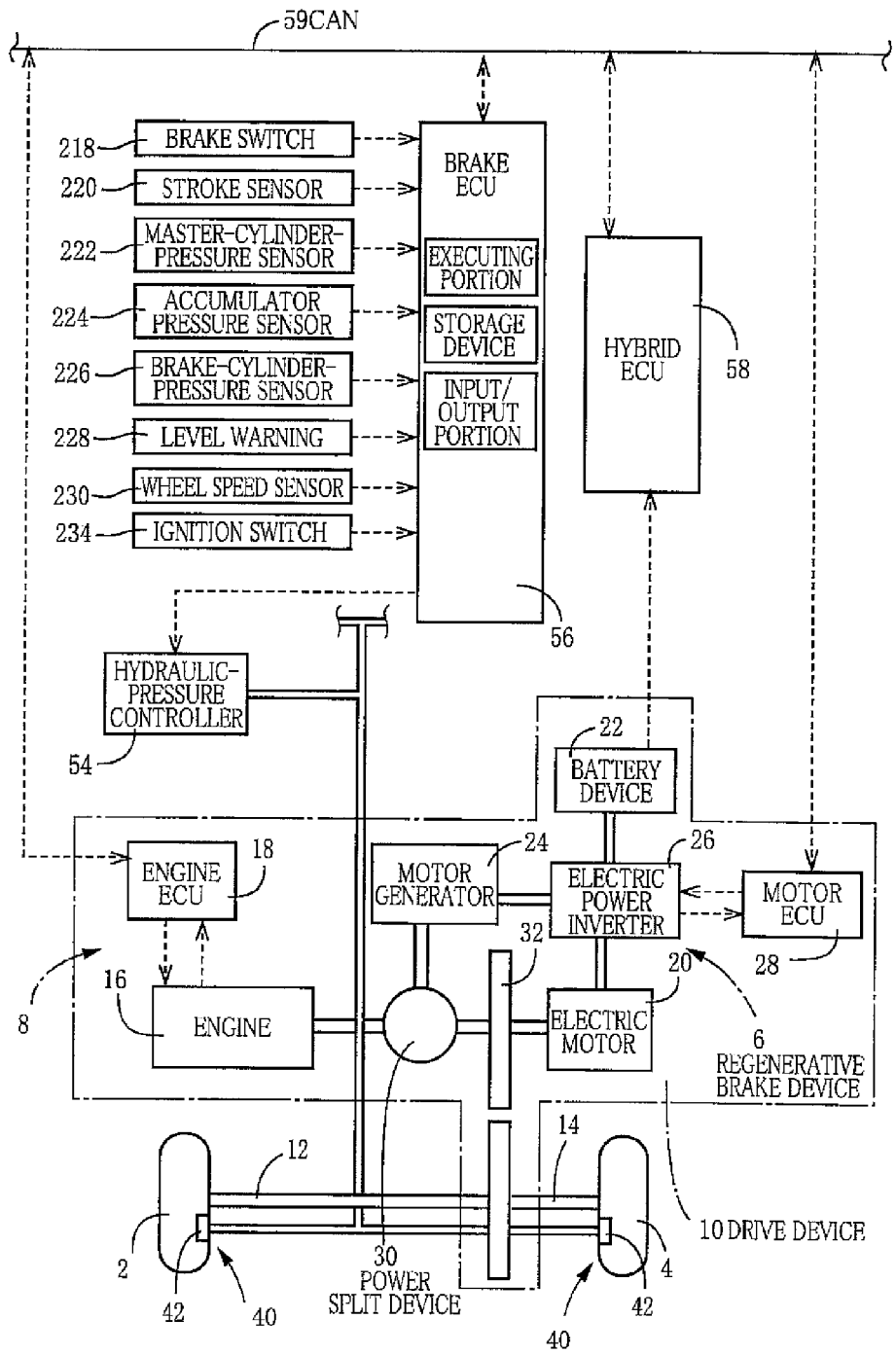
FIG. 1 is a view illustrating an entirety of a vehicle on which is mounted a hydraulic brake system that is common to embodiments of the present invention.

Hereinafter, there will be explained a hydraulic brake system according to embodiments of the present invention by reference to drawings. First, there will be explained a vehicle on which is mounted a hydraulic brake system as one example of the hydraulic brake system according to embodiments of the present invention. As illustrated in FIG. 1, this vehicle is a hybrid vehicle that includes an electric motor and an engine each as a drive device. In the hybrid vehicle, front left and right wheels 2, 4 as drive wheels are driven by a drive device 10 that includes an electric drive device 6 and an internal-combustion (spark-ignition) drive device 8. A motive force (motive power) or a drive force (drive power) produced by the drive device 10 is transferred or transmitted to the front left and right wheels 2, 4 via drive shafts 12, 14. The internal-combustion drive device 8 includes an engine 16 and an engine ECU 18 for controlling an operating state of the engine 16, and the electric drive device 6 includes an electric motor 20, a battery device 22, a motor generator 24, an electric power inverter 26, a motor ECU 28, and a power split device 30. The electric motor 20, the motor generator 24, and the engine 16 are coupled to the power split device 30, and these devices are controlled to selectively establish one of, e.g., a state in which only a driving torque of the electric motor 20 is transferred to an output member 32, a state in which both of a driving torque of the engine 16 and the driving torque of the electric motor 20 to the output member 32, and a state in which an output of the engine 16 is output to the motor generator 24 and the output member 32. The motive force transferred to the output member 32 is transferred to the drive shafts 12, 14 via a speed reducer and differential gears. The electric power inverter (converter) 26 includes an inverter and is controlled by the motor ECU 28. The control of a current supplied to the inverter switches the electric power inverter 26 between at least a driving state in which the electric motor 20 is rotated by electric energy supplied from the battery device 22 and a charging state in which the electric power inverter 26 serves as a generator during the regenerative braking to charge the battery device 22 with electric energy. In the charging state, a regenerative braking toque is applied to the front left and right wheels 2, 4. In this sense, the electric drive device 6 can be considered as a regenerative braking device.

The hydraulic brake system includes: brake cylinders 42 of hydraulic brakes 40 provided for the respective front left and right wheels 2, 4; brake cylinders 52 of hydraulic brakes 50 provided for respective rear left and right wheels 46, 48 (see FIG. 2, for example); and a hydraulic-pressure controller 54 configured to control hydraulic pressures in the respective brake cylinders 42, 52. The hydraulic-pressure controller 54 is controlled by a brake ECU 56 that is constituted principally by a computer. Also, the vehicle is provided with a hybrid ECU 58. The hybrid ECU 58, the brake ECU 56, the engine ECU 18, and the motor ECU 28 are communicably connected to one another via a CAN (car area network) 59, so that information is transmitted among these devices as needed.

It is noted that the present hydraulic brake system is mountable not only on the hybrid vehicle but also on a plug-in hybrid vehicle, an electric vehicle, and a fuel-cell vehicle. In the case of the electric vehicle, the internal-combustion drive device 8 is not necessary. In the case of the fuel-cell vehicle, a drive motor is driven by a fuel cell stack, for example. Also, the present hydraulic brake system is mountable on an internal-combustion drive vehicle. In such a vehicle not provided with the electric drive device 6, a regenerative braking toque is not applied to the drive wheels 2, 4, so that a regenerative cooperative control is not executed.

The hydraulic brake system will be hereinafter explained. In the following description, each of the brake cylinders, the hydraulic brakes, and electromagnetic open/close valves which will be described below will be referred with a corresponding one of suffixes (FL, FR, RL, RR) indicative of the respective front left, front right, rear left, and rear right wheels where these cylinders, brakes, and valves should be distinguished by their respective wheel positions. On the other hand, where these devices are collectively referred, or the distinction is not required, each of the cylinders, the brakes, and the valves will be referred without such suffixes.

Embodiment 1

Figure 2:
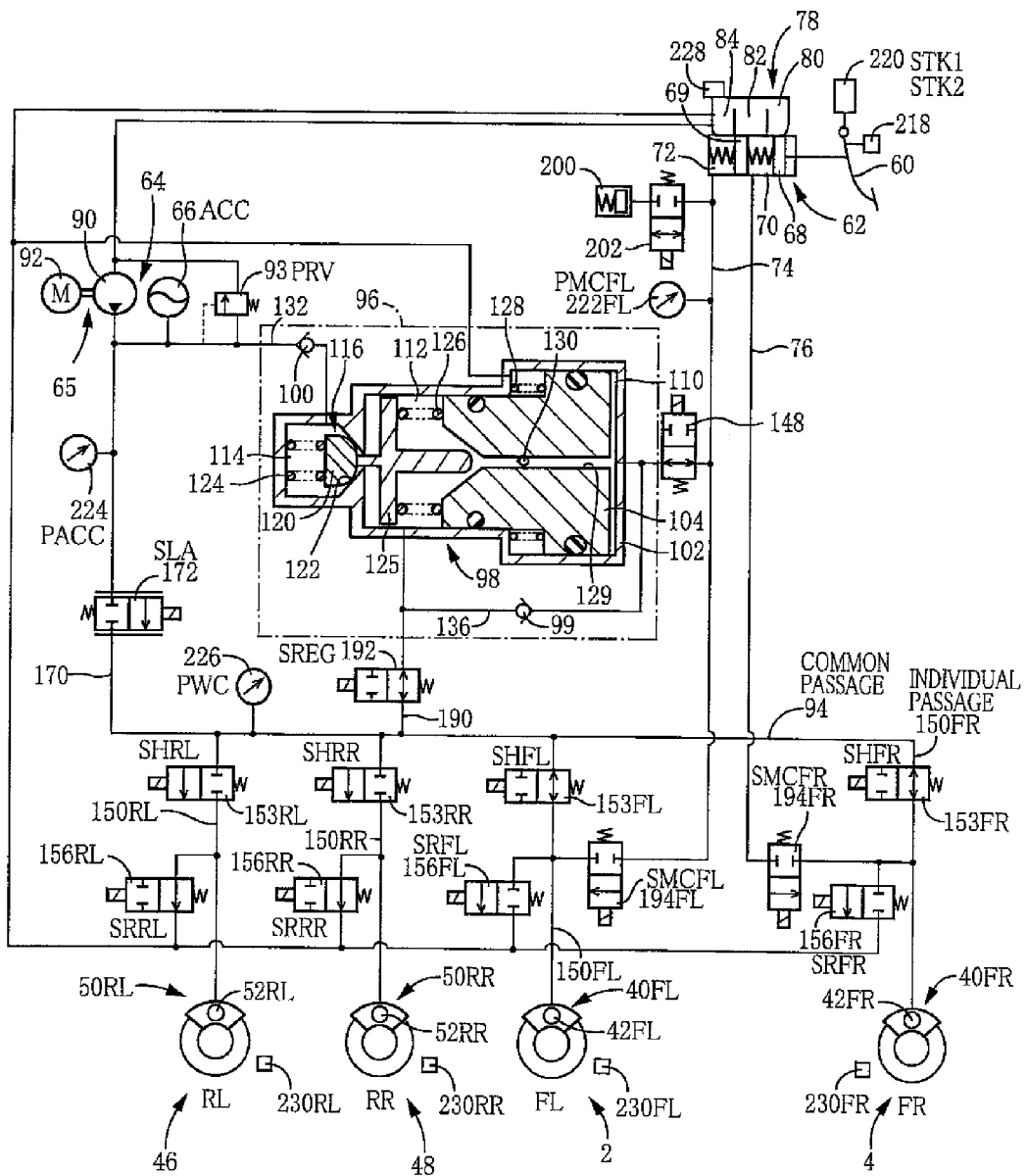
FIG. 2 is a circuit diagram of a hydraulic brake circuit of a hydraulic brake system according to embodiment 1 of the present invention.

A hydraulic brake system according to embodiment 1 includes a brake circuit illustrated in FIG. 2 in which the reference numeral "60" denotes a brake pedal as one example of a brake operating member, and the reference numeral "62" denotes a master cylinder for producing a hydraulic pressure by operation of the brake pedal 60. The reference numeral "64" denotes a power hydraulic pressure source that includes a pump device 65 and an accumulator 66. The hydraulic brakes 40, 50 are actuated by the hydraulic pressures in the respective brake cylinders 42, 52 to reduce rotations of the respective wheels. In the present embodiment, each of the hydraulic brakes 40, 50 is a disc brake. It is noted that each of the hydraulic brakes 40, 50 may be a drum brake. Also, the hydraulic brake system may be configured such that each of the hydraulic brakes 40 for the respective front wheels 2, 4 is a disc brake, and each of the hydraulic brakes 50 for the respective rear wheels 46, 48 is a drum brake.

The master cylinder 62 is a tandem cylinder that includes two pressurizing pistons 68, 69 and has pressure chambers 70, 72 located in front of the respective pressurizing pistons 68, 69. In the present embodiment, each of the pressure chambers 70, 72 is one example of a manual hydraulic pressure source. The brake cylinder 42FL of the hydraulic brake 40FL for the front left wheel 2 is coupled to the pressure chamber 72 via a master passage 74 as one example of a manual passage, and the brake cylinder 42FR of the hydraulic brake 40FR for the front right wheel 4 is coupled to the pressure chamber 70 via a master passage 76 also as one example of the manual passage. Also, each of the pressure chambers 70, 72 is fluidically coupled with a reservoir 78 when a corresponding one of the pressurizing pistons 68, 69 reaches its back end position. An interior of the reservoir 78 is divided into fluid chambers 80, 82, 84 for storing working fluid or brake fluid. The fluid chambers 80, 82 are provided corresponding to the respective pressure chambers 70, 72, and the fluid chamber 84 is provided corresponding to the pump device 65.

In the power hydraulic pressure source 64, the pump device 65 includes a pump 90 and a pump motor 92. The pump 90 brings the working fluid from the fluid chamber 84 of the reservoir 78 and stores it into the accumulator 66. The pump motor 92 is controlled such that a hydraulic pressure of the working fluid accumulated in the accumulator 66 falls within a predetermined range. Also, a relief valve 93 prevents an excessive increase in pressure discharged from the pump 90.

A mechanical pressurization device 96 as one example of a pressurization device is provided among the power hydraulic pressure source 64, the master cylinder 62, and the brake cylinders 42, 52. The mechanical pressurization device 96 includes a mechanical movable unit 98 as one example of a movable unit, an input-side check valve 99, and a high-pressure-side check valve 100. The mechanical movable unit 98 includes a housing 102 and a stepped piston 104 that is fluid-tightly and slidably fitted in the housing 102. The mechanical movable unit 98 has: a larger-diameter-side chamber 110 near a large diameter portion of the stepped piston 104; and a smaller-diameter-side chamber 112 near a small diameter portion of the stepped piston 104. The pressure chamber 72 is fluidically coupled with the larger-diameter-side chamber 110. In the present embodiment, the pressure chamber 72 is one example of a pressurization-device-coupled manual hydraulic pressure source (one manual hydraulic pressure source). A high pressure chamber 114 coupled to the power hydraulic pressure source 64 is fluidically coupled with the smaller-diameter-side chamber 112, and a high-pressure supply valve 116 is disposed between the smaller-diameter-side chamber 112 and the high pressure chamber 114. The high-pressure supply valve 116 includes: a valve seat 122 formed on the housing 102; a valve element 120 movable to and away from the valve seat 122; and a spring 124. The spring 124 urges the valve element 120 against the valve seat 122. The high-pressure supply valve 116 is a normally closed valve. In the smaller-diameter-side chamber 112, a valve opening member 125 is provided opposite the valve element 120, and a spring 126 is disposed between the valve opening member 125 and the stepped piston 104. The spring 126 urges the valve opening member 125 and the stepped piston 104 such that the valve opening member 125 and the stepped piston 104 are moved away from each other. The valve opening member 125 can also be considered as a constituent element of the high-pressure supply valve 116.

Provided between a step of the stepped piston 104 and the housing 102 is a spring 128 (a return spring) that urges the stepped piston 104 in a backward direction. It is noted that a stopper, not shown, is provided between the stepped piston 104 and the housing 102 to limit a forward end position of forward movement of the stepped piston 104. Also, the stepped piston 104 has an intra-piston communication passage 129 that fluidically connects the larger-diameter-side chamber 110 and the smaller-diameter-side chamber 112 to each other. An intra-piston check valve 130 is disposed in a portion of the intra-piston communication passage 129. The intra-piston check valve 130 inhibits a flow of the working fluid from the larger-diameter-side chamber 110 to the smaller-diameter-side chamber 112 and allows a flow of the working fluid from the smaller-diameter-side chamber 112 to the larger-diameter-side chamber 110.

The high-pressure-side check valve 100 is disposed in a portion of a high-pressure supply passage 132 that fluidically connects the high pressure chamber 114 and the power hydraulic pressure source 64 to each other. The high-pressure-side check valve 100 allows a flow of the working fluid from the power hydraulic pressure source 64 to the high pressure chamber 114 when a hydraulic pressure produced by the power hydraulic pressure source 64 is higher than a hydraulic pressure in the high pressure chamber 114, and is closed to inhibit flows in opposite directions when the hydraulic pressure produced by the power hydraulic pressure source 64 is equal to or lower than the hydraulic pressure in the high pressure chamber 114. Thus, even if an abnormality in the electrical system lowers the hydraulic pressure produced by the power hydraulic pressure source 64, lowering of a hydraulic pressure in the smaller-diameter-side chamber 112 can be prevented.

The input-side check valve 99 is disposed in a portion of a bypass passage 136 as one example of a movable-unit bypass passage that bypasses the mechanical movable unit 98 to fluidically connect the master passage 74 and an output side of the mechanical movable unit 98 to each other (noted that the bypass passage 136 may connect the master passage 74 and the smaller-diameter-side chamber 112 to each other). The bypass passage 136 can be considered as a passage that bypasses the mechanical movable unit 98 to fluidically connect the master passage 74 and a common passage 94 to each other. The input-side check valve 99 allows a flow of the working fluid from the master passage 74 to the output side of the mechanical movable unit 98 and inhibits a flow of the working fluid from the output side of the mechanical movable unit 98 to the master passage 74. A valve opening pressure of the input-side check valve 99 is a set pressure. The set pressure is a value that is determined on the basis of a hydraulic pressure difference due to a height difference between the master reservoir 78 and the brake cylinders 42 (noted that the master reservoir 78 is located on an upper side of the brake cylinders 42 in a vertical direction). The set pressure may be referred to as "height-difference-based set pressure".

In the non-operated state of the brake pedal 60, the pressure chamber 72 of the master cylinder 62 communicates with the master reservoir 78, so that a hydraulic pressure in the pressure chamber 72 is nearly an atmospheric pressure. Also, a hydraulic pressure in each of the brake cylinders 42 is nearly the atmospheric pressure, but there is a hydraulic pressure difference between these components due to a height difference therebetween. Thus, where a valve opening pressure of the input-side check valve 99 is set at a value that is determined on the basis of the hydraulic pressure difference due to the height difference, it is possible to prevent an outflow of the working fluid from the master reservoir 78 in the non-operated state of the brake pedal 60. Even if there is a leakage of the working fluid in the brake cylinders 42 or components near the brake cylinders 42, it is possible to prevent a flow of the working fluid from the master reservoir 78 to the brake cylinders 42. Also, when a brake actuating (operating) operation (that is an operation for establishing a working state of each of the hydraulic brakes 40, 50 and that is normally a depressing operation) is performed on the brake pedal 60, and the hydraulic pressure in the pressure chamber 72 is built up, a high-low pressure differential of the input-side check valve 99 (which is a value obtained by subtracting a common-passage-side hydraulic pressure from a master-cylinder-side hydraulic pressure) becomes greater than the height-difference-based set pressure, and the input-side check valve 99 is switched to its open state. As a result, a flow of the working fluid from the master cylinder 62 to the brake cylinder is allowed.

Figure 4:
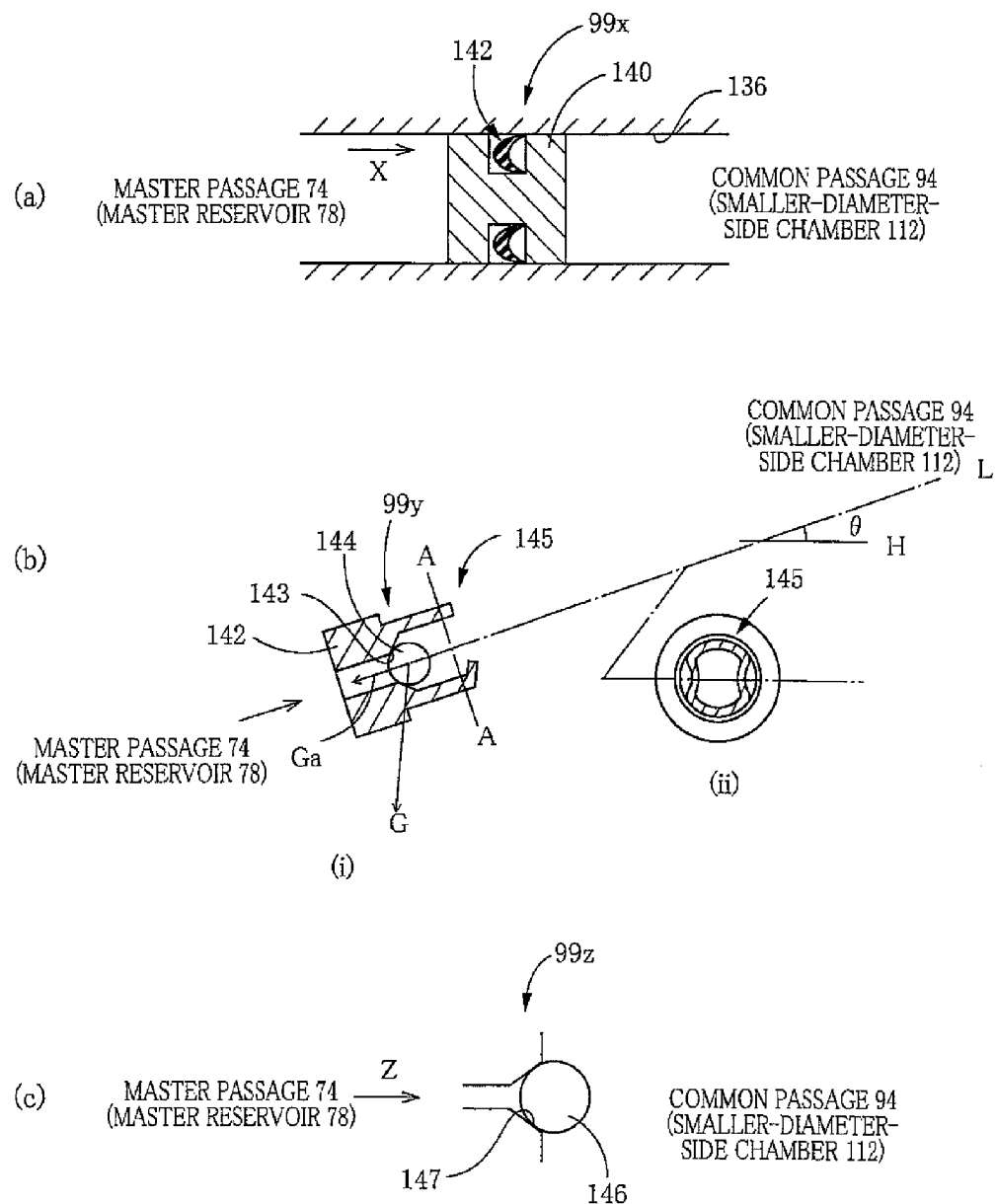
FIGS. 4(a)-4(c) are views illustrating an input-side check valve included in the hydraulic brake circuit.

The input-side check valve 99 may be constituted by one of valves illustrated in FIG. 4, for example. For example, the input-side check valve 99 may be one of a cup seal check valve 99x as illustrated in FIG. 4(*a*), a ball check valve 99y as illustrated in FIG. 4(*b*), and a magnetic check valve 99z as illustrated in FIG. 4(*c*).

In FIG. 4(a), the check valve 99x includes: a housing 140 fixedly provided in the bypass passage 136; and an annular seal member 142 supported by the housing 140. The seal member 142 is formed of a material allowing the seal member 142 to be easily deformed elastically such as rubber. The seal member 142 is easily bent in a direction indicated by arrow X and is hard to be bent in a direction opposite the direction indicated by arrow X. In the present embodiment, the master passage 74 is fluidically connected to an upstream portion of the check valve 99x in the direction indicated by arrow X, and the common passage 94 is fluidically connected to a downstream portion of the check valve 99x in the direction indicated by arrow X. The seal member 142 is not bent when the high-low pressure differential (i.e., a value obtained by subtracting a hydraulic pressure in the common passage 94 from a hydraulic pressure in the master passage 74) is equal to or lower than the height-difference-based set pressure. The check valve 99x is in its closed state, and the outflow of the working fluid from the master reservoir 78 is inhibited. When the high-low pressure differential becomes higher than the height-difference-based set pressure, the seal member 142 is bent. The check valve 99x is switched to its open state, allowing the outflow of the working fluid from the master cylinder 62. It is noted that a flow of the working fluid in a reverse direction, i.e., in a direction directed from the common passage 94 toward the master passage 74 is inhibited.

As illustrated in FIGS. 4(b)-(i), the check valve 99y is a seating valve that includes (a) a housing 142, (b) a valve seat 143 formed in the housing 142, and (c) a valve element 144 movable to and away from the valve seat 143. In the check valve 99y, the valve element 144 is spherical in shape, and no springs are provided. Also, as illustrated in FIGS. 4(b)-(ii), a retaining portion 145 is provided on an opposite side of the housing 142 from the valve seat 143. In the present embodiment, as illustrated in FIGS. 4(b)-(i), the check valve 99y is provided in an orientation in which an axis L of the check valve 99y is inclined by an angle θ with respect to a horizontal line H. Also, the master passage 74 is fluidically connected to a downstream portion of the check valve 99y in a direction of an axis-directional component Ga (=mgsin θ) of the gravity G mg) acting on the valve element 144, and the common passage 94 is fluidically connected to an upstream portion of the check valve 99y in the direction of the axis-directional component Ga.

In the check valve 99y, when the high-low pressure differential (i.e., a value obtained by subtracting the hydraulic pressure in the smaller-diameter-side chamber 112 from a hydraulic pressure in the master reservoir 78) is equal to or smaller than a magnitude corresponding to the component Ga, the valve element 144 is seated on the valve seat 143. The check valve 99y is in its closed state, and a flow of the working fluid from the master reservoir 78 to the output side of the pressurization device 96 is inhibited. When the high-low pressure differential becomes greater than the magnitude corresponding to the component Ga, the valve element 144 is moved off the valve seat 143, so that the check valve 99y is switched to its open state, and a flow of the working fluid from the master passage 74 to the common passage 94 is allowed. In this state, the retaining portion 145 prevents the valve element 144 from coming out of the check valve 99y. Also, when a flow of the working fluid from the common passage 94 to the master passage 74 is generated, a suction force moves the valve element 144 toward the valve seat 143, so that the valve element 144 is seated on the valve seat 143. In other words, the check valve 99y is provided in an orientation in which the component Ga becomes a magnitude corresponding to the height-difference-based set pressure (i.e., in the orientation in which the check valve 99y is inclined by the angle θ).

In FIG. 4(c), the check valve 99z includes a valve element 146 and a valve seat 147 and does not include any springs. Also, at least one of the valve element 146 and the valve seat 147 is a permanent magnet formed of a ferromagnetic material, so that the valve element 146 and the valve seat 147 are moved toward each other by magnetic force. The magnetic force (i.e., an attracting force) acting between the valve element 146 and the valve seat 147 has a magnitude corresponding to the height-difference-based set pressure. The master passage 74 and the common passage 94 are fluidically connected to the check valve 99z such that a pressure differential between the hydraulic pressure in the master passage 74 and the hydraulic pressure in the common passage 94 acts in a direction opposite a direction of the magnetic force, that is, the master passage 74 is connected to an upstream portion of the check valve 99z in a direction indicated by arrow Z, and the common passage 94 is connected to a downstream portion of the check valve 99z in the direction indicated by arrow Z. When the high-low pressure differential is equal to or lower than the height-difference-based set pressure, the check valve 99z is in its closed state, and the outflow of the working fluid from the master reservoir 78 is inhibited. When the high-low pressure differential becomes greater than the height-difference-based set pressure, the valve element 146 is moved off the valve seat 147 against the magnetic force to switch the check valve 99z to its open state. This switching of the state allows the flow of the working fluid from the master passage 74 to the common passage 94. It is noted that the check valve 99z may be provided with a retaining portion, not shown.

In the present embodiment, the bypass passage 136 and the intra-piston communication passage 129 are one example of an intra-pressurization-device communication passage, the input-side check valves 99x, 99y, 99z and other components are one example of a first check valve, and the intra-piston check valve 130 is one example of a second check valve.

It is noted that an input-side cut-off valve 148 is provided between the master passage 74 and the mechanical pressurization device 96. The input-side cut-off valve 148 is a normally-open electromagnetic open/close valve that is in its open state when no current is supplied to a coil of a solenoid of the valve (hereinafter may be simply referred to as "when no current is supplied to its solenoid").

The brake cylinders 42FL, FR provided for the respective front left and right wheels 2, 4 and brake cylinders 52RL, RR provided for the respective rear left and right wheels 46, 48 are connected to the common passage 94 respectively by individual passages 150FL, FR, RL, RR each as a brake-side passage and an individual brake-side passage. Pressure holding valves (SHij:i=F, R, j=L, 153FL, FR, RL, RR are disposed in the respective individual passages 150FL, FR, RL, RR, and pressure reduction valves (SRij:i=F, R, j=L, 156FL, FR, RL, RR are disposed between the respective brake cylinders 42FL, FR, 52RL, 52RR and the reservoir 78. In the present embodiment, each of the pressure holding valves 153FL, FR provided for the respective front left and right wheels 2, 4 is a normally-open electromagnetic open/close valve that is in its open state when no current is supplied to its solenoid, and each of the pressure holding valves 153RL, RR for the respective rear left and right wheels 46, 48 is a normally-closed electromagnetic open/close valve that is in its closed state when no current is supplied to its solenoid. Each of the pressure reduction valves 156FL, FR provided for the respective front left and right wheels 2, 4 is a normally-closed electromagnetic open/close valve that is in its closed state when no current is supplied to its solenoid, and each of the pressure reduction valves 156RL, RR provided for the respective rear left and right wheels 46, 48 is a normally-open electromagnetic open/close valve that is in its open state when no current is supplied to its solenoid.

In addition to the brake cylinders 42, 52, the power hydraulic pressure source 64 and the mechanical pressurization device 96 are also connected to the common passage 94. The power hydraulic pressure source 64 is connected to the common passage 94 by a power hydraulic pressure passage 170. A pressurization linear control valve (SLA) 172 is provided in the power hydraulic pressure passage 170. The pressurization linear control valve 172 is a normally-closed electromagnetic open/close valve that is in its closed state when no current is supplied to its solenoid. Continuous control for a magnitude of a current supplied to the solenoid allows continuous control for a magnitude of the hydraulic pressure in the common passage 94.

Figure 3:
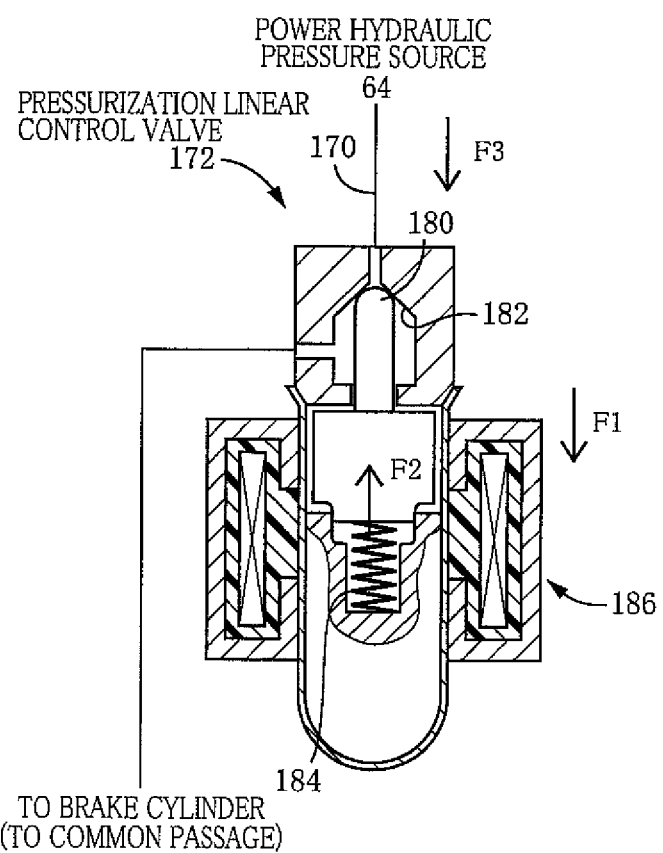
FIG. 3 is a cross-sectional view illustrating a pressurization linear control valve included in the hydraulic brake circuit.

As illustrated in FIG. 3, the pressurization linear control valve 172 includes: a seating valve including a valve element 180 and a valve seat 182; a spring 184; and a solenoid (including a coil and a plunger) 186. An urging force F2 of the spring 184 urges the valve element 180 toward the valve seat 182. Upon receipt of a current, the solenoid 186 generates an electromagnetic driving force F1 that urges the valve element 180 in a direction away from the valve seat 182. In the pressurization linear control valve 172, a pressure differential force F3 related to a pressure differential between the power hydraulic pressure source 64 and the common passage 94 also urges the valve element 180 in the direction away from the valve seat 182 (F1+F3:F2). Control for a current supplied to the solenoid 186 controls the pressure differential force F3 to control a hydraulic pressure in the power hydraulic pressure passage 170. The pressurization linear control valve 172 can be referred to as "output-hydraulic-pressure control valve" for controlling an output hydraulic pressure produced by the power hydraulic pressure source 64. It is noted that when a pressure-reduction control is executed for the common passage 94, at least one of the pressure reduction valves 156 is opened or closed in a state in which corresponding at least one of the pressure holding valves 153 is in its open state. In the present embodiment, the pressurization linear control valve 172, at least one of the pressure reduction valves 156, and other similar components is one example of a power hydraulic-pressure control device.

The mechanical pressurization device 96 is connected to the common passage 94 by a servo-pressure passage 190. An output-side cut-off valve (SREG) 192 as one example of a pressurization-device cut-off valve is disposed in the servo-pressure passage 190. The output-side cut-off valve 192 is a normally-open electromagnetic open/close valve that is in its open state when no current is supplied to its solenoid.

The master passages 74, 76 are respectively connected to downstream portions of the pressure holding valves 153FL, FR that are respectively disposed in the individual passages 150FL, FR connected to the front left and right wheels 2, 4. That is, the master passages 74, 76 bypass the mechanical pressurization device 96 and the common passage 94 to directly connect the respective pressure chambers 72, 70 and the respective brake cylinders 42 provided for the front left and right wheels 2, 4 to each other (noted that each of the master passages 74, 76 can be referred to as "direct manual passage"). The master cut-off valves (SMCFL, FR) 194FL, FR each as a manual cut-off valve are disposed in portions of the respective master passages 74, 76. Each of the master cut-off valves 194FL, FR is a normally-closed electromagnetic open/close valve that is in its closed state when no current is supplied to its solenoid. Also, a stroke simulator 200 is connected to the master passage 74 via a simulator control valve 202. The simulator control valve 202 is a normally-closed electromagnetic open/close valve.

In the present embodiment as described above, the pump device 65, the pressurization linear control valve 172, the master cut-off valves 194, the pressure holding valves 153, the pressure reduction valves 156, the input-side cut-off valve 148, the output-side cut-off valve 192, and other similar components are one example of the hydraulic-pressure controller 54. The hydraulic-pressure controller 54 is controlled on the basis of a command output from the brake ECU 56. As illustrated in FIG. 1, the brake ECU 56 is constituted principally by a computer including an executing portion, an input/output portion, and a storage device. Also, connected to the input/output portion include a brake switch 218, stroke sensors 220, a master-cylinder-pressure sensor 222, an accumulator pressure sensor 224, a brake-cylinder-pressure sensor 226, a level warning 228, wheel speed sensors 230, an ignition switch 234, and the hydraulic-pressure controller 54.

The brake switch 218 is a switch that is switched from an OFF state to an ON state when the brake pedal 60 is operated.

Each of the stroke sensors 220 detects an operating stroke (STK) of the brake pedal 60. In the present embodiment, two stroke sensors 220 are provided to detect the operating stroke of the brake pedal 60 in the same manner. Thus, even in the event of failure in one of the stroke sensors 220, the other can detect the operating stroke.

The master-cylinder-pressure sensor 222 is configured to detect the hydraulic pressure in the pressure chamber 72 of the master cylinder 62 (PMCFL) and provided in the master passage 74 in the present embodiment.

The accumulator pressure sensor 224 detects the pressure (PACC) of the working fluid accumulated in the accumulator 66.

The brake-cylinder-pressure sensor 226 detects the hydraulic pressures (PWC) in the respective brake cylinders 42, 52 and is provided on the common passage 94. Since the brake cylinders 42, 52 and the common passage 94 communicate with each other in the open states of the respective pressure holding valves 153, the hydraulic pressure in the common passage 94 can be set at the hydraulic pressures in the respective brake cylinders 42, 52.

The level warning 228 is a switch that is switched to an ON state when an amount of the working fluid stored in the master reservoir 78 becomes equal to or smaller than a predetermined amount. In the present embodiment, the level warning 228 is switched to the ON state when the amount of the working fluid stored in one of the three fluid chambers 80, 82, 84 becomes equal to or smaller than the predetermined amount.

The wheel speed sensors 230 are provided respectively for the front left and right wheels 2, 4 and the rear left and right wheels 46, 48 to detect rotational speeds of the respective wheels. Also, a running speed of the vehicle is obtained on the basis of the rotational speeds of the respective four wheels.

The ignition switch (IGSW) 234 is a main switch of the vehicle.

The storage device stores various programs and tables, for example.

<Operations in Hydraulic Brake System>

In the present embodiment, states of the hydraulic pressures supplied to the respective brake cylinders 42, 52 are controlled in a case where the hydraulic brake system works normally, in case of possible leakage, and in case where there is a malfunction or fault in the control system.

Figure 5:
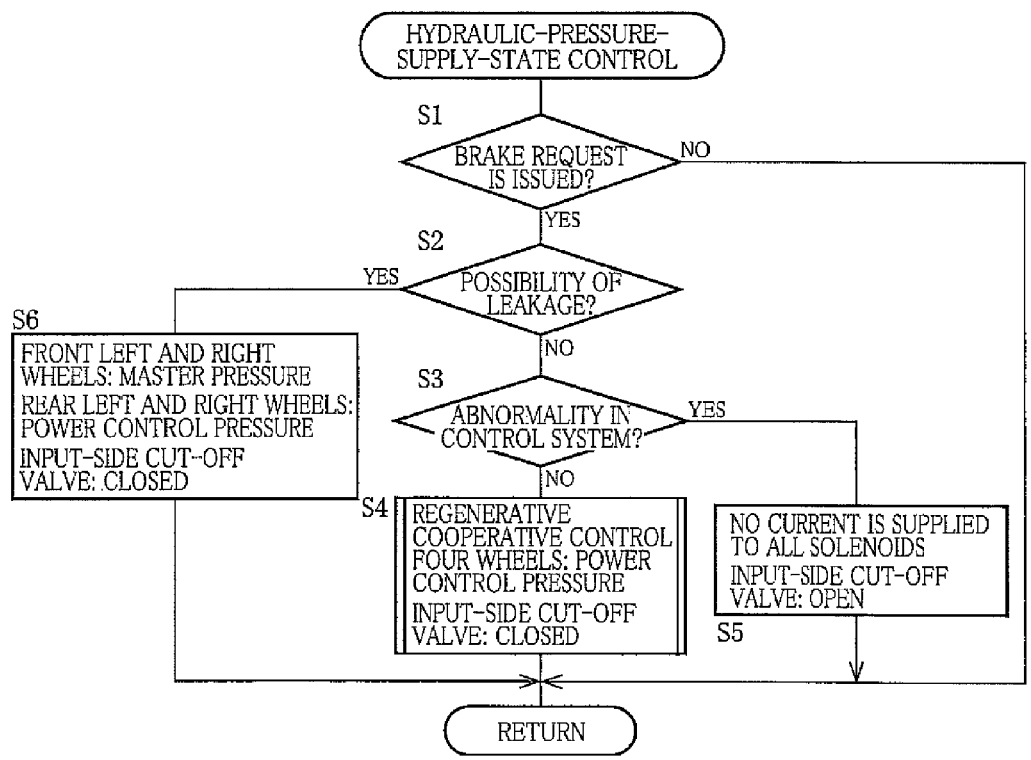
FIG. 5 is a flow chart illustrating a hydraulic-pressure-supply-state control program stored in a storage device of a brake ECU included in the hydraulic brake system.

FIG. 5 is a flow chart illustrating a supply-state control program that is executed at a predetermined time interval.

This supply-state control program begins with Step 1 (hereinafter, "Step" is omitted where appropriate) where it is determined whether a brake request is issued or not. When the brake switch 218 is in its ON state or when an automatic brake is requested to be actuated, for example, it is determined that the brake request has been issued, and a positive decision (YES) is made. Since the automatic brake may be actuated in a traction control, a vehicle stability control, a following-distance control, and a collision avoidance control, the brake request is assumed to be issued when conditions required for starting these controls are satisfied. When the brake request is issued, it is determined at S2 whether there is a possibility of fluid leakage or not, and it is determined at S3 whether there is an abnormality in the control system or not.

The presence or absence of the possibility of the fluid leakage is irrespective of a degree of the possibility of the fluid leakage and an amount of the fluid leakage. Thus, it is assumed that there is a possibility of the fluid leakage, when it is impossible to clearly determine that there is no fluid leakage even in a case where the possibility of the fluid leakage is extremely low or in a case where an amount of the fluid having leaked is extremely small. Accordingly, even where it has been determined that there is a possibility of the fluid leakage, the fluid leakage may not occur in reality (specifically, conditions (b)-(e) which will be described below may be satisfied by a cause that differs from the fluid leakage).

For example, (a) when the level warning switch 228 is in its ON state, (b) when the braking operation is performed and when a predetermined relationship between a stroke of the brake pedal 60 and a hydraulic pressure in the master cylinder 62 is established, it is determined that there is no fluid leakage. On the other hand, when the hydraulic pressure in the master cylinder 62 is low relative to the stroke, it is determined that there is a possibility of the fluid leakage. Also, it is determined that there is a possibility of the fluid leakage (c) when a detection value of the accumulator pressure sensor 224 has not become equal to or larger than the fluid-leakage-determination threshold value even when the pump 90 is operated continuously for equal to or longer than a predetermined length of time, (d) when a detection value of the brake-cylinder-pressure sensor 226 is small relative to a detection value of the master-cylinder-pressure sensor 222 in a case where the regenerative cooperative control is not executed, and (e) when it is determined, upon the preceding brake actuation, that there is a possibility of the fluid leakage (that is, when the hydraulic pressure in the master cylinder 62 is supplied to the brake cylinders 42 provided for the respective front left and right wheels 2, 4, and the pump pressure is supplied to the brake cylinders 52 provided for the respective rear left and right wheels 46, 48), for example.

The abnormality in the control system means a state in which the hydraulic pressures in the respective brake cylinders 42, 52 or the hydraulic pressure in the common passage 94 cannot be controlled using the hydraulic pressure produced by the power hydraulic pressure source 64.

For example, the abnormality in the control system includes: (i) a case where the components such as the electromagnetic open/close valve cannot be operated as commanded (e.g., a case of a break in a wire(s) of the electromagnetic open/close valve such as the pressurization linear control valve 172 (including the pressure holding valves 153, the pressure reduction valves 156, the master cut-off valves 194, and the output-side cut-off valve 192)), (ii) a case where a detection value required for controlling the hydraulic pressures in the respective brake cylinders 42, 52 cannot be obtained or cannot be precisely obtained (e.g., a case of a break in a wire(s) or a cable(s) of the sensor such as the brake switch 218, the stroke sensors 220, the master-cylinder-pressure sensor 222, the accumulator pressure sensor 224, the brake-cylinder-pressure sensor 226, and the wheel speed sensors 230), (iii) electric power (that can be also referred as "electric energy" and "current") cannot be supplied to components such as the electromagnetic open/close valves and the sensors (e.g., a case of an abnormality in a power source of, e.g., the battery device 22 or a case of a break in wires), and (iv) a case where high-pressure working fluid cannot be supplied to the power hydraulic pressure source 64 (e.g., a case of an abnormality in the pump motor 92 or a case where electric power cannot be supplied to the pump motor 92 (including a case due to the abnormality in the power source)).

When negative decisions (NO) are made at S2 and S3, that is, when the hydraulic brake system works normally (i.e., when it is determined that the control system works normally and there is no possibility of the fluid leakage in the present embodiment), a normal-condition control is executed at S4. The output hydraulic pressure produced by the power hydraulic pressure source 64 is controlled by the pressurization linear control valve 172 to supply the power control pressure to the common passage 94 and then to the brake cylinders 42, 52.

In the event of an abnormality in the control system, a positive decision is made at S3, and this flow goes to S5 where supply of the current to the solenoids of all the valves is stopped, so that the valves are placed in their respective original positions. Also, the pump motor 92 is kept stopped.

When it is determined that there is a possibility of the fluid leakage, a positive decision (YES) is made at S2, and this flow goes to S6 where the hydraulic pressure in the master cylinder 62 is supplied to the brake cylinders 42 provided for the respective front left and right wheels 2, 4, and the output hydraulic pressure produced by the power hydraulic pressure source 64 is controlled and supplied to the brake cylinders 52 provided for the respective rear left and right wheels 46, 48. It is rare that there is an abnormality in the control system in addition to a possibility of the fluid leakage. Thus, even when it is determined that there is a possibility of the fluid leakage, it is regarded that the control system works normally, making it possible to control the valves and activate the pump motor 92.

Also, in the present embodiment, the automatic brake is inhibited from being operated when there is an abnormality in the control system or when there is a possibility of the fluid leakage.

1) In a Case where System Works Normally

Figure 6:
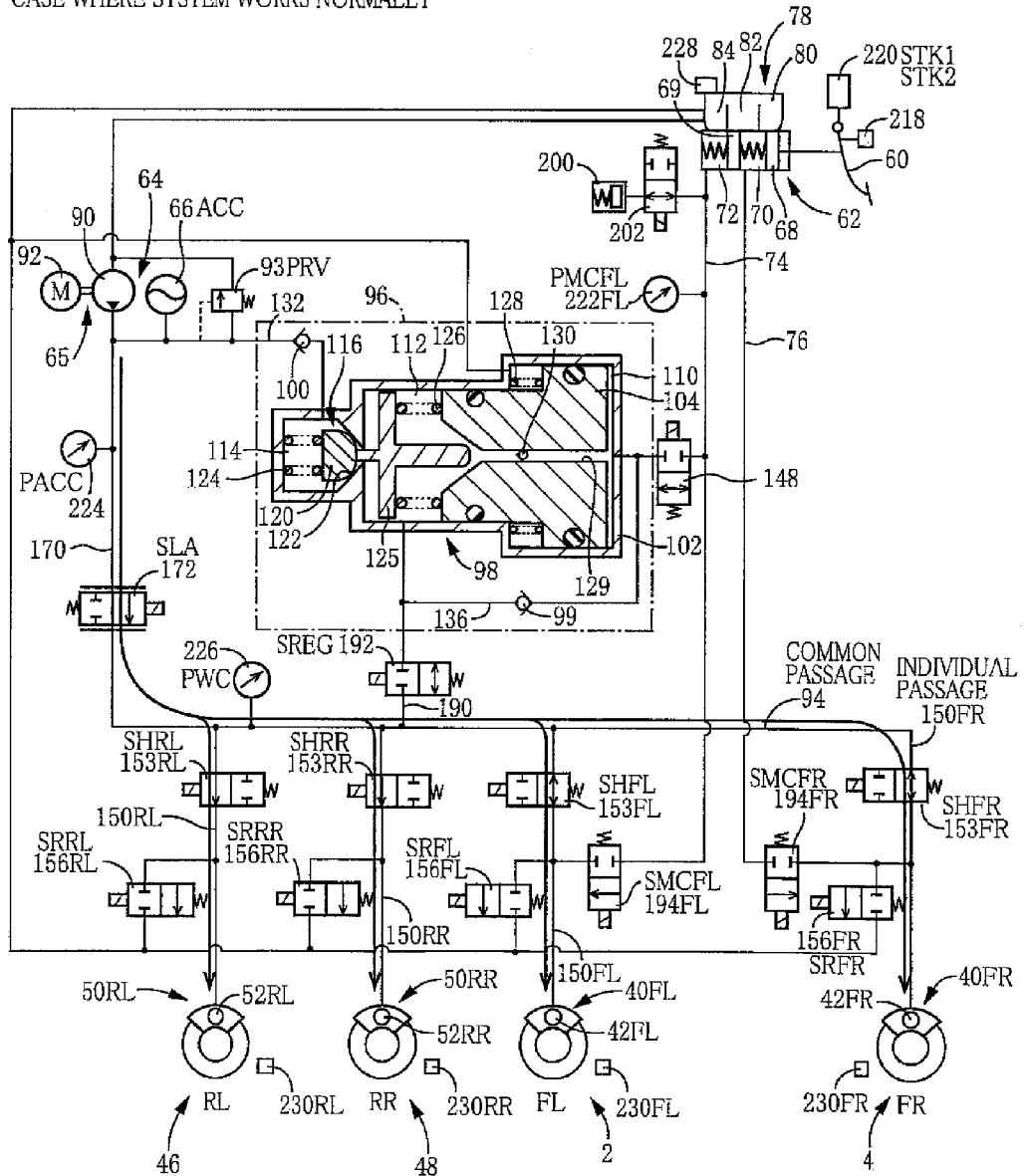
FIG. 6 is a view illustrating a state where the supply-state control program is executed in the hydraulic brake system (in a case where the control system works normally).

As illustrated in FIG. 6, to the brake cylinders 42, 52 provided for the respective front left and right and rear left and right wheels 2, 4, 46, 48, the hydraulic pressure produced by the power hydraulic pressure source 64 is controlled and supplied, whereby the regenerative cooperative control is in principle executed (noted that the controlled hydraulic pressure may be referred to as "power control pressure").

The regenerative cooperative control is executed for equalizing a total braking torque to a total required braking torque. The total braking torque is a sum of the regenerative braking toque applied to the drive wheels 2, 4 and a friction braking torque applied to the driven wheels 46, 48 as well as to the drive wheels 2, 4.

The total required braking torque corresponds to a braking torque required by the driver, when the total required braking torque is obtained on the basis of values detected by the stroke sensors 220, the detection value of the master-cylinder-pressure sensor 222, and other similar devices. Also, the total required braking torque corresponds to a braking torque required in the traction control and the vehicle stability control, when the total required braking torque is obtained on the basis of a running state of the vehicle. A required regenerative braking toque is determined on the basis of the total required braking torque (a requested value) and information which is supplied from the hybrid ECU 58 and which contains data indicative of a generator-side upper limit value and a storage-side upper limit value. The generator-side upper limit value is an upper limit value of the regenerative braking toque which is determined on the basis of, e.g., a rotation speed of the electric motor 20, while the storage-side upper limit value is an upper limit value of the regenerative braking toque which is determined on the basis of, e.g., a storage capacity of the battery device 22. That is, the smallest one of the total required braking torque, the generator-side upper limit value and the storage-side upper limit value is determined as the required regenerative braking toque, and information representative of the determined required regenerative braking toque is supplied to the hybrid ECU 58.

The hybrid ECU 58 sends the motor ECU 28 information representative of the required regenerative braking toque. The motor ECU 28 then sends a control command to the electric power inverter 26 such that the braking torque applied to the front left and right wheels 2, 4 by the electric motor 20 is made equal to the required regenerative braking toque. The electric motor 20 is controlled by the electric power inverter 26.

The motor ECU 28 sends the hybrid ECU 58 information representative of an operating state of the electric motor 20 such as an actual rotation speed. In the hybrid ECU 58, an actual regenerative braking toque is obtained on the basis of the actual operating state of the electric motor 20, and information representative of a value of the actual regenerative braking toque is output to the brake ECU 56.

The brake ECU 56 determines a required hydraulic braking torque on the basis of, for example, a value obtained by subtracting the actual regenerative braking toque from the total required braking torque, and then controls the pressurization linear control valve 172, the pressure reduction valves 156 and other components to bring the brake-cylinder hydraulic pressure closer to a target hydraulic pressure corresponding to the required hydraulic braking torque.

During the regenerative cooperative control, in principal, all the pressure holding valves 153FL, FR, RL, RR provided for the front left and right and rear left and right wheels 2, 4, 46, 48 are placed in their respective open states, and all the pressure reduction valves 156FL, FR, RL, RR in their respective closed states. Also, the master cut-off valves 194FL, FR are placed in their respective closed states, the simulator control valve 202 in its open state, the input-side cut-off valve 148 in its closed state, and the output-side cut-off valve 192 in its closed state. The common passage 94 is disconnected or isolated from the mechanical pressurization device 96, and the brake cylinders 42FL, FR provided for the respective front left and right wheels 2, 4 are decoupled or isolated from the master cylinder 62. In this state, the pressurization linear control valve 172 is controlled to control the output hydraulic pressure produced by the power hydraulic pressure source 64, so that the power control pressure produced by the power hydraulic pressure source 64 is supplied to the common passage 94 and then to all the brake cylinders 42, 52. It is noted that when the hydraulic pressure in the common passage 94 is reduced, at least one of the pressure reduction valves 156FL, FR, RL, RR is controlled.

In the present embodiment as described above, the input-side cut-off valve 148 is in the closed state in the normal operation.

Suppose that the input-side cut-off valve 148 is in the open state.

Since the output-side cut-off valve 192 is in the closed state, the mechanical pressurization device 96 is a non-operating state in principal. However, the forward movement of the stepped piston 104 is allowed within a range in which the sum of a volume of the high pressure chamber 114, a volume of the smaller-diameter-side chamber 112, and a volume of the larger-diameter-side chamber 110 is kept generally constant. Since the simulator control valve 202 is in the open state, on the other hand, when the hydraulic pressure in the master passage 74 becomes higher than an actuating pressure of the stroke simulator 200, the stroke simulator 200 is activated. In the present embodiment, however, the actuating pressure of the stroke simulator 200 is lower than that of the mechanical movable unit 98.

When the brake actuating operation is performed on the brake pedal 60, and thereby the hydraulic pressure in the master passage 74 becomes higher than the actuating pressure of the stroke simulator 200, the stroke simulator 200 is actuated to allow forward movement of the brake pedal 60. When the hydraulic pressure in the master passage 74 thereafter becomes higher than the actuating pressure of the mechanical movable unit 98, the stepped piston 104 is moved forward, resulting in excessive travel of the brake pedal 60, which causes discomfort to the driver.

In the present embodiment, however, the input-side cut-off valve 148 is in the closed state, allowing the brake pedal 60 to move forward with the operation of the stroke simulator 200. This movement of the brake pedal 60 prevents its excessive travel, thereby suppressing the discomfort of the driver.

Also, since the input-side cut-off valve 148 is placed in the closed state, it is possible to reduce vibrations and operating noises, for example.

The actuating pressure of the stroke simulator 200 is a value that is determined by, e.g., sliding resistances such as a set load of a spring and a friction between a piston and a housing of the stroke simulator 200, and when a hydraulic pressure acting on the piston becomes higher than an actuating pressure of the stroke simulator 200, the piston is allowed to be moved. This actuating pressure is determined by, e.g., the set load of the spring, and a frictional force.

The same principle applies to the actuating pressure of the mechanical movable unit 98. That is, the actuating pressure of the mechanical movable unit 98 is a value that is determined by, e.g., sliding resistances such as a set load of the spring 126 and a frictional force between the stepped piston 104 and the housing 102.

In this state, if a slip of the wheels 2, 4, 46, 48 is excessively large so as to satisfy an anti-lock control starting condition, the pressure holding valves 153 and the pressure reduction valves 156 are opened and closed individually to control the hydraulic pressures in the respective brake cylinders 42, 52. As a result, a slipping state of each of the front left and right and rear left and right wheels 2, 4, 46, 48 is optimized.

Also, in a case where the hydraulic brake system is installed on a vehicle not provided with the electric drive device 6, i.e., on a vehicle in which the regenerative cooperative control is not executed, the devices such as the pressurization linear control valve 172 are controlled such that the total required braking torque and the hydraulic braking torque are made equal to each other, in the case where the system works normally.

It is noted that components such as portions of the brake ECU 56 which store and execute the processing at S4 in the hydraulic-pressure-supply-state control program are one example of a first input-side cut-off valve control device and a second input-side cut-off valve control device. Also, these components can be referred to as a power control pressure supplier.

Also, components such as the portions of the brake ECU 56 which store and execute the processing at S4, the power hydraulic pressure source 64, the pressurization linear control valve 172, the common passage 94, the individual passages 150, and the brake cylinders 42, 52 are one example of a power hydraulic system.

2) In Case of Abnormality in Control System

Figure 7:
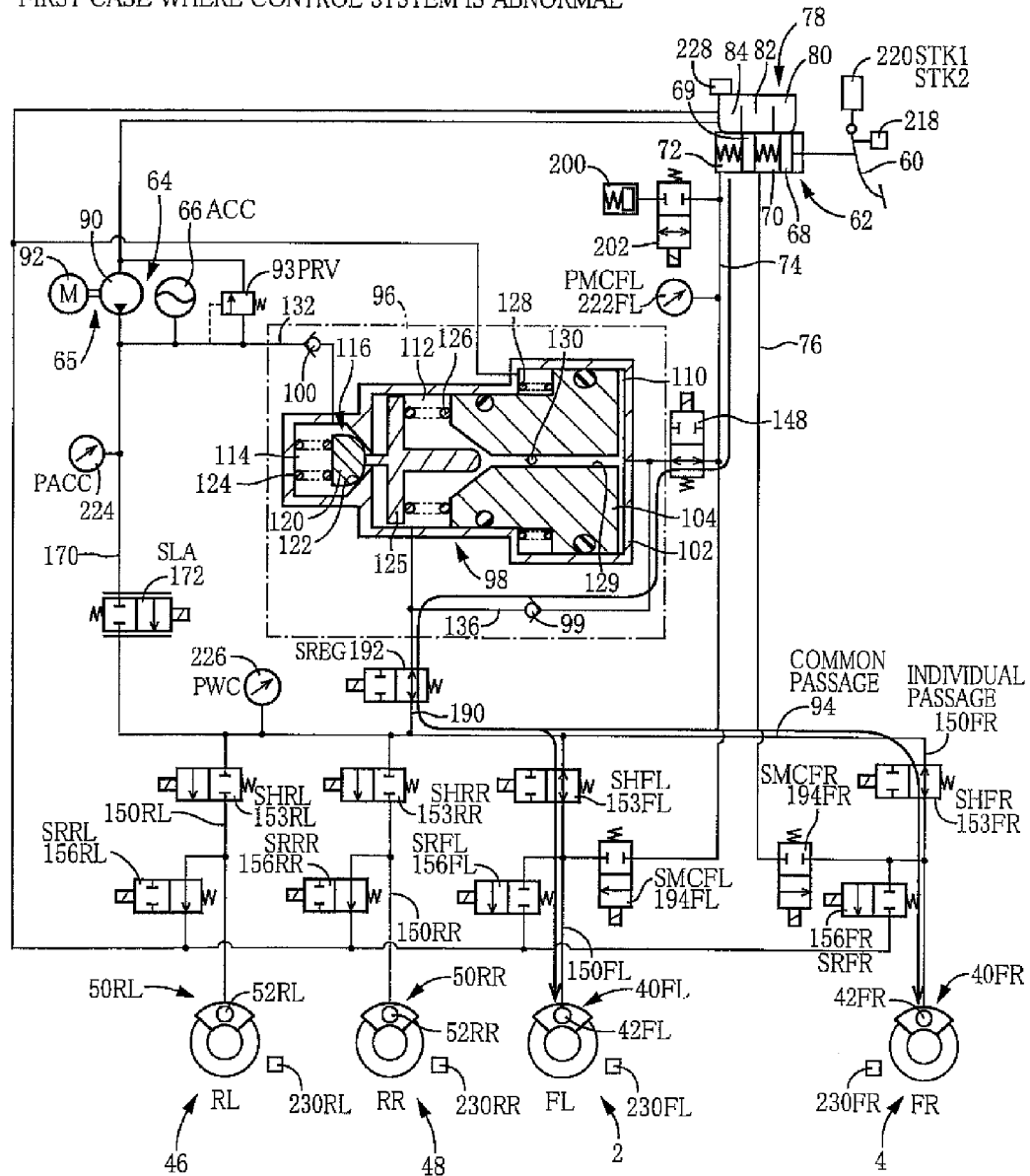
FIG. 7 is a view illustrating another state where the supply-state control program is executed in the hydraulic brake system (in case of an abnormality in the control system).
Figure 8:
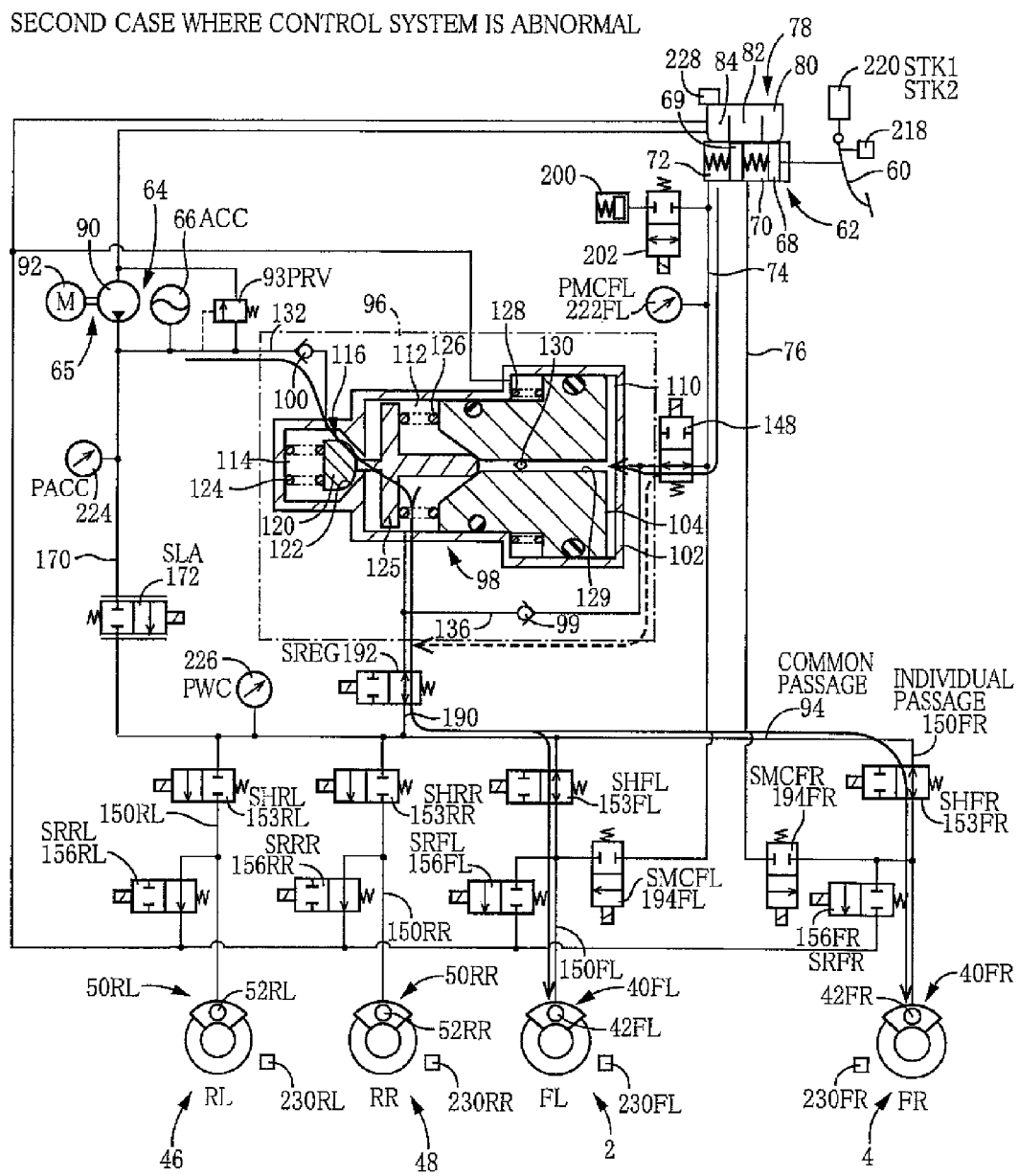
FIG. 8 is a view illustrating another state where the supply-state control program is executed in the hydraulic brake system (in case of an abnormality in the control system).

As illustrated in FIGS. 7 and 8, the valves are placed back in their respective original positions.

No current is supplied to the solenoid 186 to establish the closed state of the pressurization linear control valve 172, so that the power hydraulic pressure source 64 is disconnected from the common passage 94.

Also, the master cut-off valves 194 are placed in the closed states, so that the brake cylinders 42 are decoupled from the master cylinder 62.

Also, the input-side cut-off valve 148 and the output-side cut-off valve 192 are placed in the open states, so that the mechanical pressurization device 96 is connected to the master passage 74 and the common passage 94.

Also, the pressure holding valves 153RL, RR are in the closed states, and the pressure holding valves 153FL, FR in the open states, so that the brake cylinders 42FL, FR provided for the respective front left and right wheels 2, 4 are connected to the common passage 94, and the brake cylinders 52RL, RR provided for the respective rear left and right wheels 46, 48 are disconnected from the common passage 94.

Accordingly, the brake cylinders 42FL, FR provided for the respective front left and right wheels 2, 4 are actuated in the event of the abnormality in the control system. Thus, the generation of yaw moment can be suppressed in a case where the center of gravity of the vehicle is located at generally a center of the vehicle in the right and left direction.

2-1) In a Case where Hydraulic Pressure in Larger-Diameter-Side Chamber 110 is Equal to or Lower than Actuating Pressure of Mechanical Movable Unit 98

As illustrated in FIG. 7, when the hydraulic pressure in the larger-diameter-side chamber 110 is equal to or lower than the actuating pressure of the mechanical movable unit 98, the hydraulic pressure in the pressure chamber 72 (may be referred to as "master hydraulic pressure" as the manual hydraulic pressure) is supplied to the common passage 94 via the master passage 74, the bypass passage 136, and the servo-pressure passage 190 and then to the brake cylinders 42 provided for the respective front left and right wheels 2, 4.

Since the valve opening pressure of the input-side check valve 99 is considerably low, the working fluid can be speedily supplied to the brake cylinders 42 in response to the operation for the brake pedal 60, resulting in shortened brake response time of each hydraulic brake 40.

2-2) In a Case where Hydraulic Pressure in Larger-Diameter-Side Chamber 110 is Higher than Actuating Pressure of Mechanical Movable Unit 98

2-2-1) In a Case where Hydraulic Pressure of Working Fluid Accumulated in Accumulator 66 is Higher than Actuation Allowing Pressure In a case where the hydraulic pressure of the working fluid accumulated in the accumulator 66 is higher than the set pressure, even where the operation of the pump device 65 is stopped, the mechanical movable unit 98 is allowed to be operated. The set pressure is such a pressure that can actuate the mechanical movable unit 98, in other words, the magnitude of the set pressure is such a magnitude that can supply the hydraulic pressure to the high pressure chamber 114 of the mechanical movable unit 98. Thus, the set pressure can be considered to be higher than the hydraulic pressure in the high pressure chamber 114 (specifically in the smaller-diameter-side chamber 112). The set pressure can be referred to as "actuation allowing pressure".

As illustrated by solid lines in FIG. 8, the stepped piston 104 is moved forward by the hydraulic pressure in the larger-diameter-side chamber 110 to be brought into contact with the valve opening member 125, thereby switching the high-pressure supply valve 116 to the open state. The smaller-diameter-side chamber 112 is decoupled from the larger-diameter-side chamber 110, and the high-pressure working fluid is supplied from the accumulator 66 to the high pressure chamber 114 via the high-pressure-side check valve 100 and then to the smaller-diameter-side chamber 112. The hydraulic pressure in the smaller-diameter-side chamber 112 is made higher than the hydraulic pressure in the master cylinder 62 and supplied to the common passage 94 via the output-side cut-off valve 192 being in the open state and then to the brake cylinders 42FL, 42FR provided for the respective front left and right wheels 2, 4, via the respective pressure holding valves 153FL, FR.

Assuming that the actuating pressure is zero, a hydraulic pressure Pout in the smaller-diameter-side chamber 112 is a value obtained by multiplying a hydraulic pressure Pin in the master cylinder 62 (i.e., the hydraulic pressure in the larger-diameter-side chamber 110) by a ratio (Sin/Sout) between a pressure receiving area Sin of the large diameter portion of the stepped piston 104 and a pressure receiving area Sout of the small diameter portion of the stepped piston 104. That is, the hydraulic pressure Pout is represented by the following equation:

$$Pout=Pin\cdot(Sin/Sout)$$

This hydraulic pressure Pout may be referred to as "servo pressure". Thus, the smaller-diameter-side chamber 112 may be referred to as "control pressure chamber".

It is noted that, since the mechanical pressurization device 96 is operated by the hydraulic pressure in the pressure chamber 72, the mechanical pressurization device 96 can be considered to be a manual hydraulic pressure source in a broad sense. In the present embodiment, the pressure chamber 72 is one example of a pressurization-device-coupled manual hydraulic pressure source as a first manual hydraulic pressure source, and the mechanical pressurization device 96 is one example of a second manual hydraulic pressure source.

2-2-2) In a Case where Hydraulic Pressure of Working Fluid Accumulated in Accumulator 66 is Equal to or Lower than Actuation Allowing Pressure In a case where the hydraulic pressure of the working fluid accumulated in the accumulator 66 is equal to or lower than the actuation allowing pressure, as in the state illustrated in FIG. 7, the master hydraulic pressure in the pressure chamber 72 of the master cylinder 62 is supplied to the brake cylinders 42 provided for the respective front left and right wheels 2, 4 via the master passage 74, the bypass passage 136, the servo-pressure passage 190, and the common passage 94.

Meanwhile, when the hydraulic pressure of the working fluid accumulated in the accumulator 66 is reduced by the operation of the mechanical movable unit 98 and becomes lower than the actuation allowing pressure, the supply of the working fluid from the accumulator 66 to the high pressure chamber 114 is stopped. This makes it hard for the mechanical movable unit 98 to be operated or actuated. For example, when the brake is pumped, more working fluid accumulated in the accumulator 66 is consumed, making the accumulator pressure lower than the actuation allowing pressure. The forward movement of the stepped piston 104 is inhibited (it is considered that the stepped piston 104 is moved forward until the stepped piston 104 is brought into contact with the stopper, and then the forward movement of the stepped piston 104 is inhibited), so that the hydraulic pressure in the smaller-diameter-side chamber 112 is not built up any higher, that is, the mechanical movable unit 98 is made unable to exhibit a boosting function. When the hydraulic pressure in the pressure chamber 72 becomes higher than the hydraulic pressure in the smaller-diameter-side chamber 112, as indicated by a broken line in FIG. 8, the hydraulic pressure in the pressure chamber 72 of the master cylinder 62 is supplied to the common passage 94 via the bypass passage 136 and the servo-pressure passage 190. The hydraulic pressure in the pressure chamber 72 of the master cylinder 62 is supplied to the brake cylinders 42FL, 42FR provided for the respective front left and right wheels 2, 4, without being boosted.

Also, since the pressure holding valves 153RL, RR are in the closed states, the hydraulic pressure in the mechanical movable unit 98 is inhibited from being supplied to the brake cylinders 52RL, 52RR provided for the respective rear left and right wheels 46, 48. This reduces a possibility of a fluid shortage and a shortage of pressure buildup for the brake cylinders 42FL, FR provided for the respective front left and right wheels 2, 4.

Moreover, the volume of the pressure chamber 72 may be increased in the master cylinder 62. Where the volume of the pressure chamber 72 is increased, even when the working fluid is supplied to both of the brake cylinders 42FL, FR provided for the respective front left and right wheels 2, 4, the fluid shortage can be avoided. In this case, the stroke of the brake pedal 60 operated by the driver may be larger.

In the present embodiment, the configuration in which each of the pressure holding valves 153FL, FR is the normally open valve, the configuration in which each of the input-side cut-off valve 148 and the output-side cut-off valve 192 is the normally open valve, portions of the brake ECU 56 which store and execute the processing at S5, and so on are one example of an abnormal-case servo-pressure supply device. Also, portions of the brake ECU 56 which store and execute the processing at S5 are one example of a servo pressure supplier.

3) In Case of Detection of Possibility of Fluid Leakage

Figure 9:
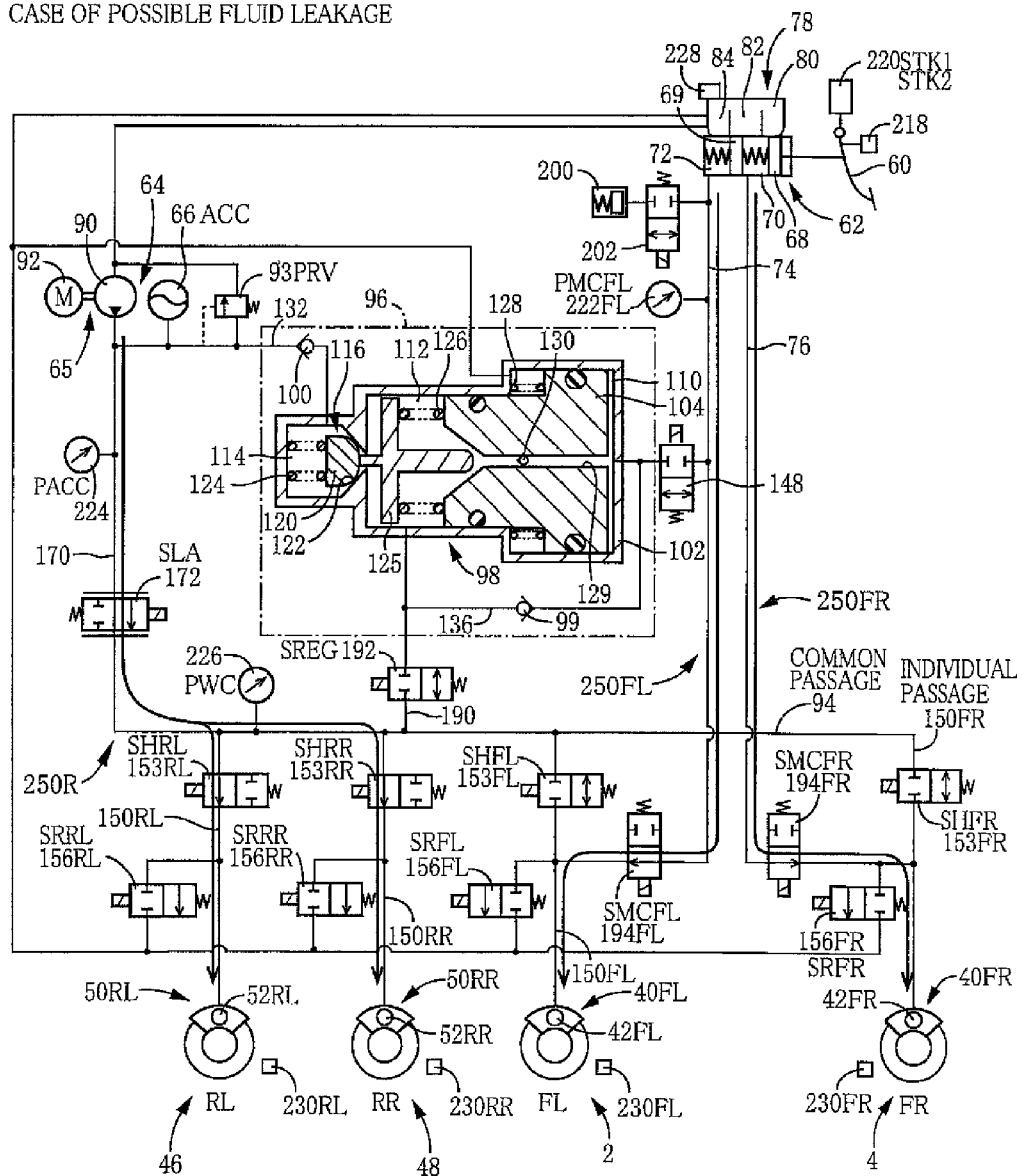
FIG. 9 is a view illustrating a state in which an ignition switch is OFF in the hydraulic brake system (in case of possible fluid leakage).

As illustrated in FIG. 9, the pressure holding valves 153FL, FR for the respective front left and right wheels 2, 4 are placed in the closed states, and the pressure holding valves 153RL, RR for the respective rear left and right wheels 46, 48 in the open states. Also, the master cut-off valves 194FL, FR are placed in the open states, and the input-side cut-off valve 148, the output-side cut-off valve 192, and the simulator control valve 202 in the closed states. Also, all the pressure reduction valves 156 are placed in the closed states.

The hydraulic pressures in the pressure chambers 72, 70 of the master cylinder 62 are respectively supplied to the brake cylinders 42FL, FR provided for the respective front left and right wheels 2, 4, and the hydraulic pressure produced by the pump device 65 is controlled and supplied to the brake cylinders 52RL, RR provided for the respective rear left and right wheels 46, 48.

Since the pressure holding valves 153FL, FR for the respective front left and right wheels 2, 4 are thus in the closed states, the brake cylinders 42FL, FR provided for the respective front left and right wheels 2, 4 are independent of each other. Also, the brake cylinders 42FL, FR provided for the respective front left and right wheels 2, 4 are decoupled or isolated from the brake cylinders 52RL, RR provided for the respective rear left and right wheels 46, 48. That is, the brake cylinders provided for the respective front wheels 2, 4, and the brake cylinders provided for the respective rear wheels 46, 48 are isolated from each other, and the brake cylinders provided respectively for the front left wheel 2 and the front right wheel 4 are isolated from each other. That is, three brake lines are isolated from one another, specifically a brake line 250FL including the brake cylinder 42FL provided for the front left wheel 2, a brake line 250FR including the brake cylinder 42FR provided for the front right wheel 4, and a brake line 250R including the brake cylinders 52RL, RR provided for the respective rear left and right wheels 46, 48 are isolated from one another. Accordingly, even if one of these three brake lines suffers from the fluid leakage, the other brake lines are not influenced by the fluid leakage.

In this sense, the pressure holding valves 153FL, FR have a function as a separate valve for separating the brake lines 250FR, FL, R from one another.

In the present embodiment, the brake line 250FR includes the brake cylinder 42FR, the master passage 76, the pressure chamber 70, and the fluid chamber 80. The brake line 250FL includes the brake cylinder 42FL, the master passage 74, the pressure chamber 72, and the fluid chamber 82. The brake line 250R includes the brake cylinders 52RL, RR, the individual passages 150RL, RR, the power hydraulic pressure source 64, and the fluid chamber 84. Therefore, the configuration in which the brake lines 250FR, FL, R are independent of one another means that the fluid chambers 80, 82, 84 of the reservoir 78 are also independent of one another.

In the present embodiment, portions of the brake ECU 56 which store and execute the processing at S6 and so on are one example of a manual-hydraulic-pressure and power-control-pressure supplier.

Also, even in a case where there is no possibility of the fluid leakage, when the hydraulic pressure of the working fluid accumulated in the accumulator 66 is lower than the actuation allowing pressure, the state in FIG. 9 can be established. The situation in which the hydraulic pressure of the working fluid accumulated in the accumulator 66 becomes lower than the actuation allowing pressure is considered to be caused by, e.g., the abnormality in the pump device 65 (noted that the electromagnetic open/close valve can be controlled), but in this case it is determined that the situation is caused by the abnormality in the control system, and the state in FIG. 7 or 8 is established. However, in the state in FIG. 7 or 8, the mechanical movable unit 98 cannot be operated, and as indicated by the broken line in FIG. 8 the hydraulic pressure in the pressure chamber 72 of the master cylinder 62 is supplied to the brake cylinders 42FL, FR. When the state in FIG. 9 is established, in contrast, the pressure chambers 72, 70 are coupled to the respective brake cylinders 42FL, FR, thereby reducing shortage of the hydraulic pressure. It is noted that, in a case where the hydraulic pressures in the brake cylinders 52RL, RR provided for the respective rear left and right wheels 46, 48 cannot be effectively controlled due to a low hydraulic pressure of the working fluid accumulated in the accumulator 66, the pressure holding valves 153RL, RR are preferably placed in the closed states, with the pressurization linear control valve 172 being in the closed state.

4) In a Case of Release of Hydraulic Brake

Upon release of the braking operation, no current is supplied to the solenoids of all the valves, so that all the valves are placed back in the original positions in FIG. 2. In the mechanical pressurization device 96, the stepped piston 104 is located at its back end position (or moved back to the back end position). The stepped piston 104 is spaced apart from the valve opening member 125, so that the intra-piston communication passage 129 is opened. The hydraulic pressures in the brake cylinders 42FL, FR provided for the respective front left and right wheels 2, 4 are returned to the master cylinder 62 (i.e., the master reservoir 78) via the intra-piston communication passage 129 and the intra-piston check valve 130. Also, the hydraulic pressures in the brake cylinders 52RL, RR provided for the respective rear left and right wheels 46, 48 are returned to the reservoir 78 via the respective pressure reduction valves 156.

5) OFF State of Ignition Switch 234

No current is supplied to the solenoids of all the valves, so that all the valves are placed back in the original positions in FIG. 2.

a) As illustrated in FIG. 2, since the pressurization linear control valve 172 is in the closed state, the power hydraulic pressure source 64 is disconnected from the common passage 94. Thus, even in the event of fluid leakage at a position downstream of the common passage 94 (e.g., the brake cylinders 42FL, FR), it is possible to prevent an outflow of the working fluid from the fluid chamber 84 of the reservoir 78 via the power hydraulic pressure passage 170.

b) Since the master cut-off valves 194 are in the closed states, even if fluid leakage occurs near the brake cylinders 42FL, FR provided for the respective front left and right wheels 2, 4, it is possible to prevent an outflow of the working fluid from the fluid chambers 80, 82 of the reservoir via the master passages 74, 76.

c) Since the input-side check valve 99 and the intra-piston check valve 130 are provided, even if fluid leakage occurs at a position downstream of the common passage 94, it is possible to prevent an outflow of the working fluid from the fluid chamber 82 of the master reservoir 78 via the mechanical pressurization device 96. Even in the event of fluid leakage at a position downstream of the common passage 94, the outflow of the working fluid from the fluid chamber 82 of the master reservoir 78 via the intra-piston communication passage 129 is inhibited, and the input-side check valve 99, the intra-piston check valve 130, and so on are one example of an outflow preventing device 260.

As thus described, in an OFF state of the ignition switch 234 in the present embodiment, even if fluid leakage occurs at a position downstream of the common passage 94, it is possible to reliably prevent an outflow of the working fluid from the fluid chambers 80, 82, 84 of the master reservoir 78, allowing the hydraulic brakes 40, 50 to be operated satisfactorily.

The input-side check valve 99, the intra-piston check valve 130, and so on are one example of the outflow preventing device 260 in the present embodiment. Nevertheless, in addition to these devices, the outflow from the master reservoir 78 can be prevented by devices such as the master cut-off valves 194, the pressurization linear control valve 172, and the pressure holding valves 153RL, RR.

Embodiment 2

Figure 10:
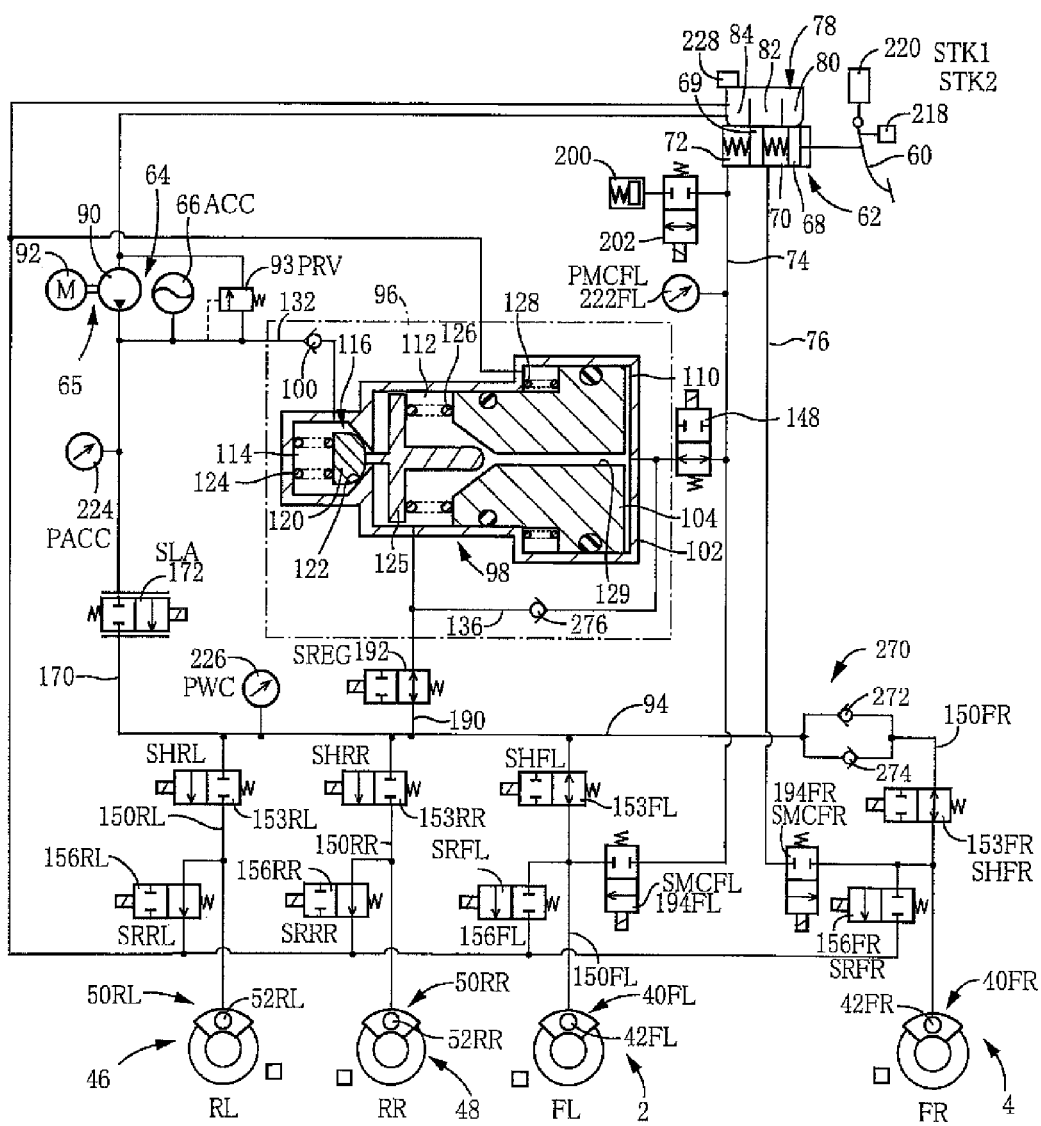
FIG. 10 is a hydraulic-brake circuit diagram of a hydraulic brake system according to embodiment 2 of the present invention.

As illustrated in FIG. 10, an outflow preventing device 270 is provided at any position between a portion of the common passage 94 which is connected to the servo-pressure passage 190 and a portion of the individual passage 150FR in which the pressure holding valve 153FR is provided. The other configurations are the same as those in embodiment 1. The outflow preventing device 270 includes a first check valve 272 and a second check valve 274 which are provided parallel to each other. Like the input-side check valve 99 in embodiment 1, the first check valve 272 is configured such that its valve opening pressure is set at the height-difference-based set pressure. Like the intra-piston check valve 130 in embodiment 1, the second check valve 274 allows a flow of the working fluid from the brake cylinder 42FR to the master reservoir 78 and inhibits a flow of the working fluid from the master reservoir 78 to the brake cylinder 42FR. The outflow preventing device 270 can prevent an outflow of the working fluid from the reservoir fluid chamber 82 to the brake cylinder 42FR via the mechanical pressurization device 96 when the brake actuating operation is not being performed on the brake pedal 60. In particular, the outflow preventing device 270 can prevent an outflow of the working fluid from the reservoir fluid chamber 82 in the event of fluid leakage near the brake cylinder 42FR provided for the front right wheel 4, thereby reducing a possibility of a shortage of the braking force when the hydraulic brakes 40, 50 are operated. It is noted that the intra-piston check valve is not necessary in the mechanical pressurization device 96. Also, an input-side check valve 276 may have any valve opening pressure. The valve opening pressure of the input-side check valve 276 may be set at a magnitude that is not related to the hydraulic pressure difference due to the height difference.

Embodiment 3

Figure 11:
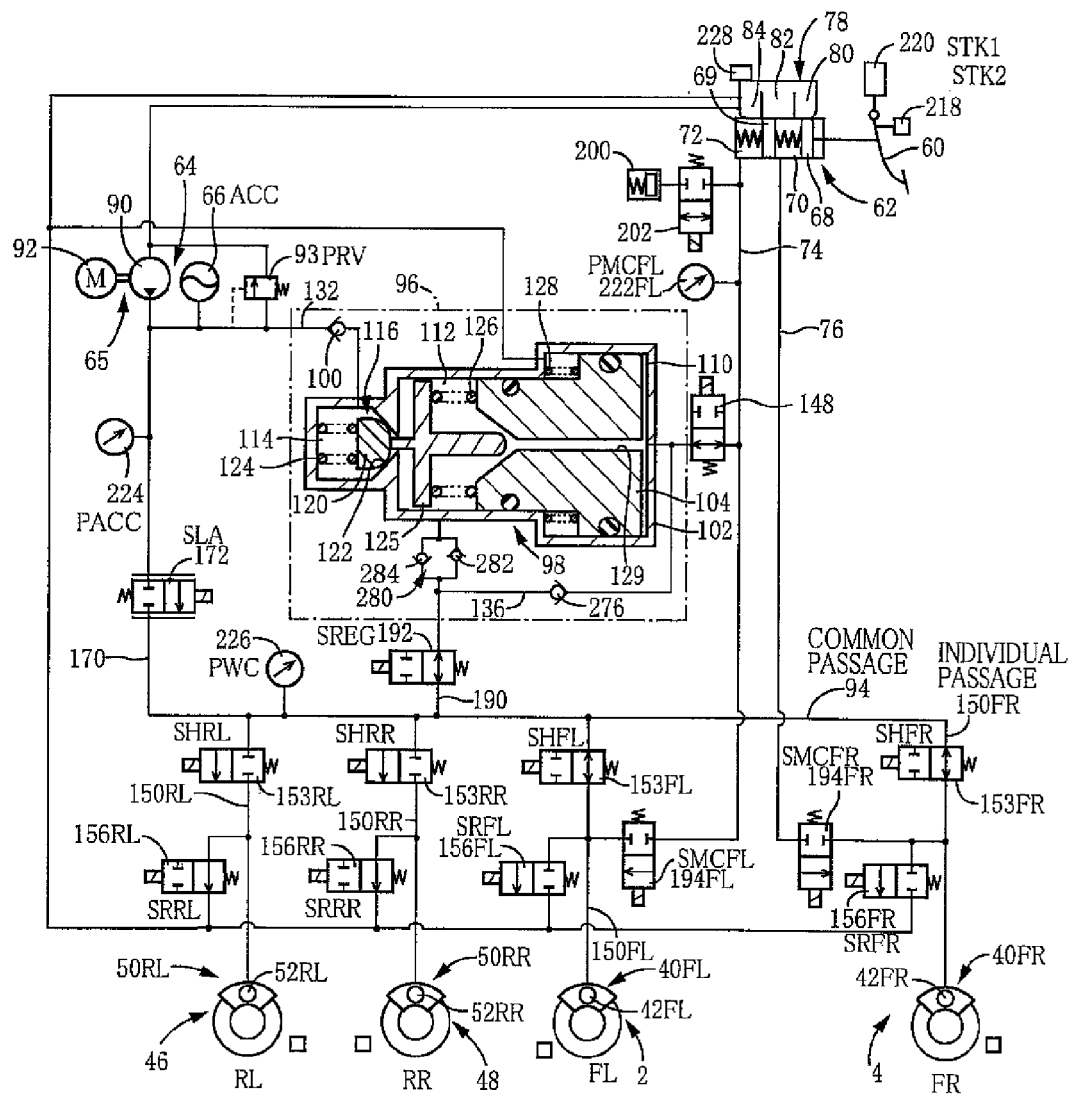
FIG. 11 is a hydraulic-brake circuit diagram of a hydraulic brake system according to embodiment 3 of the present invention.

As illustrated in FIG. 11, an outflow preventing device 280 may be provided in the servo-pressure passage 190 and in the mechanical pressurization device 96 at a position between the smaller-diameter-side chamber 112 and a portion of the servo-pressure passage 190 which is connected to the bypass passage 136. As in embodiment 2, the outflow preventing device 280 includes a first check valve 282 and a second check valve 284 which are provided parallel to each other. The other configurations are the same as those in embodiment 1. The outflow preventing device 280 can inhibit the outflow of the working fluid from the fluid chamber 82 of the master reservoir 78 via the intra-piston communication passage 129 when the brake actuating operation is not being performed on the brake pedal 60. The outflow preventing device 280 may be provided at any position in the servo-pressure passage 190. For example, the outflow preventing device 280 may be provided downstream of the bypass passage 136 and may be provided downstream of the output-side cut-off valve 192, i.e., on a side of the output-side cut-off valve 192 which is nearer to the common passage.

Other Embodiments

It is noted that the brake circuit may have any design.

For example, the mechanical pressurization device 96 may be directly connected to the master passage 74. In other words, the input-side cut-off valve 148 is not essential. The outflow preventing device is not essential, either. Also, providing both of the master cut-off valves 194FL, FR as the normally closed valves is not essential, and at least one of the master cut-off valves 194FL, FR may be a normally open valve.

Also, the system may be configured such that at least one of the pressure holding valves 153RL, RR for the respective rear left and right wheels 46, 48 is a normally-open electromagnetic open/close valve, and a corresponding at least one of the pressure reduction valves 156RL, RR is a normally-closed electromagnetic open/close valve. In the present embodiment, in the event of the abnormality in the control system, the output hydraulic pressure in the mechanical pressurization device 96 can be supplied to three or four of the brake cylinders 42, 52. In the event of the abnormality in the control system, brake cylinders to be coupled to the mechanical pressurization device 96 can be determined by a capability of the supply of the working fluid based on, e.g., the volume of the pressure chamber 72 of the master cylinder 62. Also, when a volume of the master cylinder 62 is increased, the operating stroke of the driver on the brake pedal 60 may be increased, or a reaction force may be increased (that is, a larger operating force may be required). Nevertheless, the volume of the master cylinder 62 may be suitably determined with consideration of, e.g., an operation feeling of the driver and the number of hydraulic brakes to be operated in the event of the abnormality in the control system.

Embodiment 4

Figure 12:
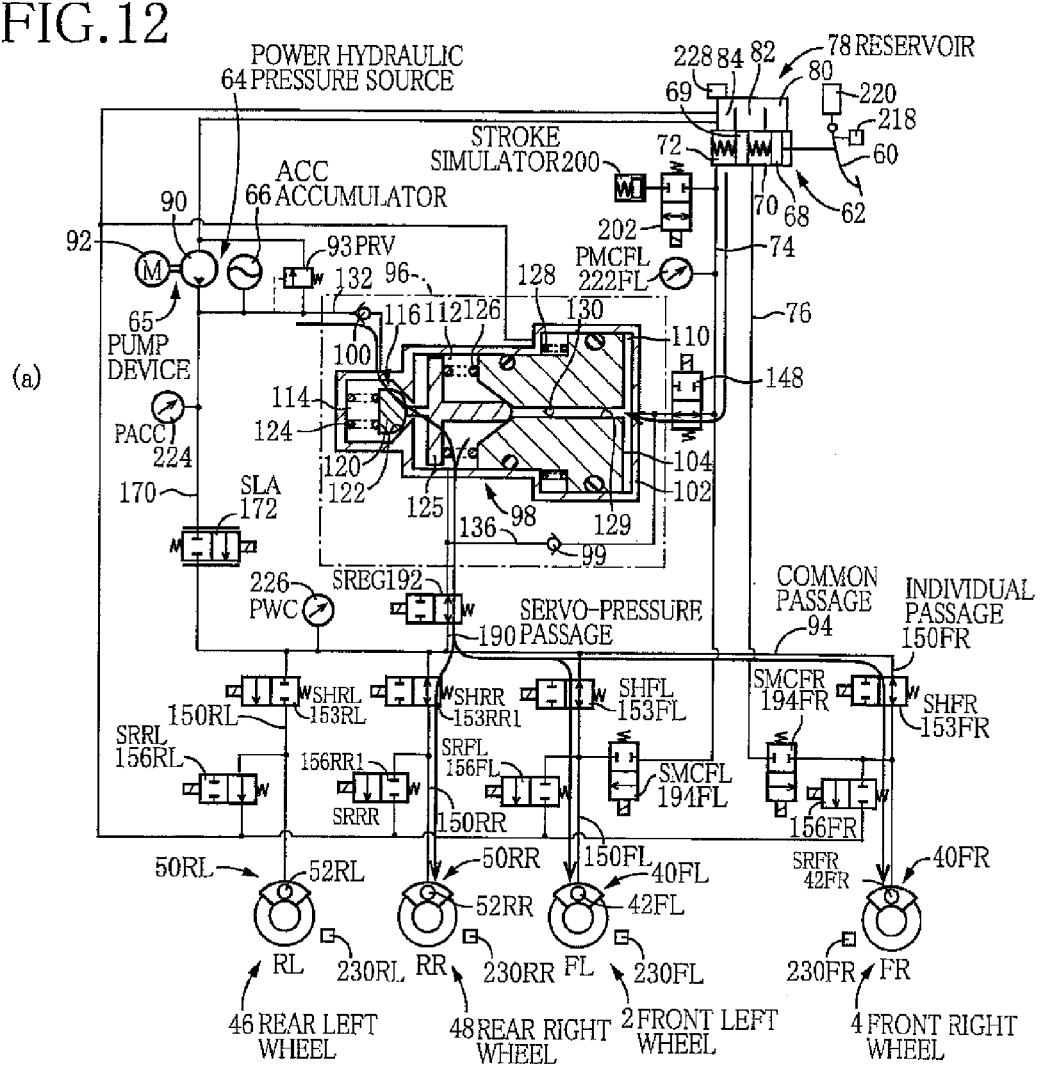
FIG. 12(a) is a hydraulic-brake circuit diagram of a hydraulic brake system according to embodiment 4 of the present invention.
FIG. 12(b) is a view illustrating a right-hand drive vehicle on which the hydraulic brake system is mounted.

As illustrated in FIG. 12(a), the system is configured such that a pressure holding valve 153RR1 corresponding to a brake cylinder 52RR provided for the rear right wheel 48 that is one of the rear left and right wheels 46, 48 is a normally-open electromagnetic open/close valve, and a pressure reduction valve 156RR1 for the rear right wheel 48 is a normally-closed electromagnetic open/close valve. In the present embodiment, in the event of the abnormality in the control system, the output hydraulic pressure in the mechanical pressurization device 96 is supplied to the brake cylinders 42FL, FR, 52RR provided respectively for the front left and right wheels 2, 4 and the rear right wheel 48. As illustrated in FIG. 12(b), in a relatively small-sized vehicle that has a driver's seat in its right portion in a forward direction (that is, a steering member 300 is provided in the right portion in the forward direction), namely a right-hand drive vehicle, a center of gravity G1 of the entire vehicle including the driver may be located on the right of a center line of the vehicle in the right and left direction. The other configurations are the same as those in embodiment 1. In this vehicle, a length rL of an arm extending from the center of gravity G1 to a contact position where the left wheels 2, 46 coontact a road surface is longer than a length rR of an arm extending from the center of gravity G1 to a contact position where the right wheels 4, 48 contact the road surface (rL>rR). When the hydraulic pressure in the mechanical pressurization device 96 is supplied to the brake cylinders 42FL, FR provided for the respective front left and right wheels 2, 4 in the event of the abnormality in the control system in this configuration, a yaw moment γ in a left-turning direction acts on the vehicle.

$$\gamma = rR \cdot (F_{FR}) - rL \cdot (F_{FL}) < 0$$

To address this yaw moment, in the present embodiment, in the event of the abnormality in the control system, the servo pressure as the hydraulic pressure in the mechanical pressurization device 96 is supplied to the brake cylinders 42FL, FR provided for the respective front left and right wheels 2, 4 and the brake cylinder 52RR provided for the rear right wheel 48. The respective hydraulic pressures in the brake cylinders provided respectively for three wheels 42FL, FR, RR are generally equal to one another ($P_{FL} = P_{FR} = P_{RR}$). Thus, the sum of braking forces (i.e., forces acting on positions between tires and the road surface) caused by the hydraulic pressures supplied to the brake cylinders 42FL, 52RL provided for the respective left wheels 2, 46 (noted that the hydraulic pressure is not supplied to the brake cylinder 52RL provided for the rear left wheel 46) is smaller than the sum of braking forces caused by the hydraulic pressures supplied to the brake cylinders 42FR, RR provided for the respective right wheels 4, 48 ($F_{FL} < F_{FR} + F_{RR}$).

An absolute value of the yaw moment γ acting on this vehicle is represented by the following equation:

$$|\gamma| = |rR \cdot (F_{FR} + F_{RR}) - rL \cdot (F_{FL})|$$

Since the arm rL is longer than the arm rR as described above, it is possible to reduce the absolute value of the yaw moment γ acting on the vehicle.

In the present embodiment as described above, the servo pressure in the mechanical pressurization device 96 is supplied to the brake cylinders provided respectively for the three wheels of the four front left and right and rear left and right wheels in the event of the abnormality in the control system, so that the sum of the braking forces acting on the respective left wheels 2, 46 and the sum of the braking forces acting on the respective right wheels 4, 48 are not equal to each other. However, in a case where the center of gravity G is located off the center of the vehicle in the right and left direction, the servo pressure in the mechanical pressurization device 96 is distributed such that the sum of braking forces acting on wheel(s) nearer to the shorter arm extending from the center of gravity G is larger than the sum of braking forces acting on wheel(s) nearer to the longer arm extending from the center of gravity G. Thus, the generation of the yaw moment can be suppressed in the event of the abnormality in the control system. In the present embodiment, the master cylinder 62, the mechanical pressurization device 96, the common passage 94, the individual passages 150FL, FR, RR, the normally-open pressure holding valves 153FL, FR, RR1, the brake cylinders 42FL, FR, 52RR, and so on are one example of a manual hydraulic system. This manual hydraulic system includes a single-type hydraulic-pressure distributor. It is noted that, while the output hydraulic pressure in the mechanical pressurization device 96 is the servo pressure as described above, the servo pressure can be considered to be a manual hydraulic pressure in a broad sense.

It is noted that the intra-piston check valve 130 and the input-side cut-off valve 148 are not essential in the present embodiment.

Embodiment 5

In a hydraulic brake circuit illustrated in FIG. 13(a), a pressure holding valve 153RL2 corresponding to the brake cylinder 52RL provided for the rear left wheel 46 that is one of the rear left and right wheels 46, 48 is a normally open valve, and a pressure reduction valve 156RL2 for the rear left wheel 46 is a normally closed valve. In the present embodiment, in the event of the abnormality in the control system, the servo pressure in the mechanical pressurization device 96 is supplied to the brake cylinders 42FL, FR, 52RL respectively for the front left and right wheels 2, 4 and the rear left wheel 46. As illustrated in FIG. 13(b), in a vehicle that has a driver's seat in its left portion in the forward direction (that is, a steering member 302 is provided in the left portion in the forward direction), namely a left-hand drive vehicle, a center of gravity G2 of the entire vehicle including the driver may be located on the left of a center line of the vehicle in the right and left direction. The other configurations are the same as those in embodiment 1.

In the present embodiment, an absolute value of the yaw moment γ acting on the vehicle in the event of the abnormality in the control system is represented by the following equation:

$$|\gamma| = |rR(F_{FR}) - rL(F_{FL} + F_{RL})|$$

In this case, the sum of braking forces acting on the respective right wheels 4, 48 is smaller than the sum of braking forces acting on the respective left wheels 2, 46 ($F_{FR} < F_{FL} \ F_{RL}$), and an arm rR extending from the center of gravity G2 to a contact position where the right wheels 4, 48 contact the road surface is longer than an arm rL extending from the center of gravity G2 to a contact position where the left wheels 2, 46 contact the contact position (rR>rL), making it possible to reduce the absolute value of the yaw moment γ acting on the vehicle. In the present embodiment, the master cylinder 62, the mechanical pressurization device 96, the common passage 94, the individual passages 150FL, FR, RL, the normally-open pressure holding valves 153FL, FR, RL2, the brake cylinders 42FL, FR, 52RR, and so on are one example of a manual hydraulic system. This manual hydraulic system includes a single-type hydraulic-pressure distributor.

Embodiment 6

In a hydraulic brake circuit in FIG. 14(a), a master cut-off valve 194FR3 corresponding to the brake cylinder 42FR provided for the front right wheel 4 is a normally open valve, and a pressure holding valve 153FR3 is a normally closed valve. Also, a pressure holding valve 153RR3 corresponding to the brake cylinder 52RR provided for the rear right wheel 48 is a normally open valve, and a pressure reduction valve 156RR3 is a normally closed valve. In the event of an abnormality in the control system, a master pressure is supplied to the brake cylinder 42FR provided for the front right wheel 4, and the servo pressure in the mechanical pressurization device 96 is supplied to the brake cylinders 42FL, 52RR provided respectively for diagonal wheels (i.e., the front left wheel 2 and the rear right wheel 48).

A right-turning-directional yaw moment γ acting on a vehicle that has a driver's seat in its left portion in the forward direction (i.e., a vehicle having a steering wheel 302 in its left portion) is represented by the following equation:

$$\gamma = rR(F_{FR}+F_{RR}) - rL(F_{FL})$$

In this equation, a hydraulic pressure Pm in the master cylinder 62 is lower than a servo pressure Pb in the mechanical pressurization device 96 (Pm<Pb). Also, where the brake-cylinder hydraulic pressures are equal to one another, the braking force acting on the rear wheel is smaller than the braking forces acting on the front wheels. Accordingly, the sum of the braking forces acting on the respective left wheels 2, 46 and the sum of the braking forces acting on the respective right wheels 4, 48 are generally equal to each other.

$$(F_{FL}) \approx (F_{FR}+F_{RR})$$

Meanwhile, since the arm rR is longer than the arm rL (rR>rL), the yaw moment γ is a positive value (γ>0) in the present embodiment. Thus, as illustrated in FIG. 14(b), a yaw moment in a right-turning direction acts on the left-hand drive vehicle in the event of the abnormality in the control system. The yaw moment acting on the vehicle in the event of the abnormality in the control system has a direction that causes the vehicle to deviate from an opposite lane in a region where legal regulations stipulate that a left-hand drive vehicle must run on the right side of the road. As a result, for example, when the driver performs a correcting operation, safety of the vehicle can be improved when compared with a case where a yaw moment having a direction that causes the vehicle to move toward the opposite lane acts on the vehicle. In the present embodiment, the power hydraulic pressure source 64, the pressurization linear control valve 172, the common passage 94, the individual passages 150, the pressure holding valves 153, the brake cylinders 42, 52, and so on are one example of the power hydraulic system. Also, the master cylinder 62, the mechanical pressurization device 96, the common passage 94, the individual passages 150FL, RR, the normally-open pressure holding valves 153FL3, RR3, the master passage 76, a normally-open master cut-off valve 194FL3, the brake cylinders 42FL, FR, 52RR, and so on are one example of a manual hydraulic system. This manual hydraulic system includes a mixed-type hydraulic pressure distributor.

It is noted that the same effects can be obtained in a case where a left-hand drive vehicle includes a brake circuit illustrated in FIG. 2.

Embodiment 7

Figure 15:
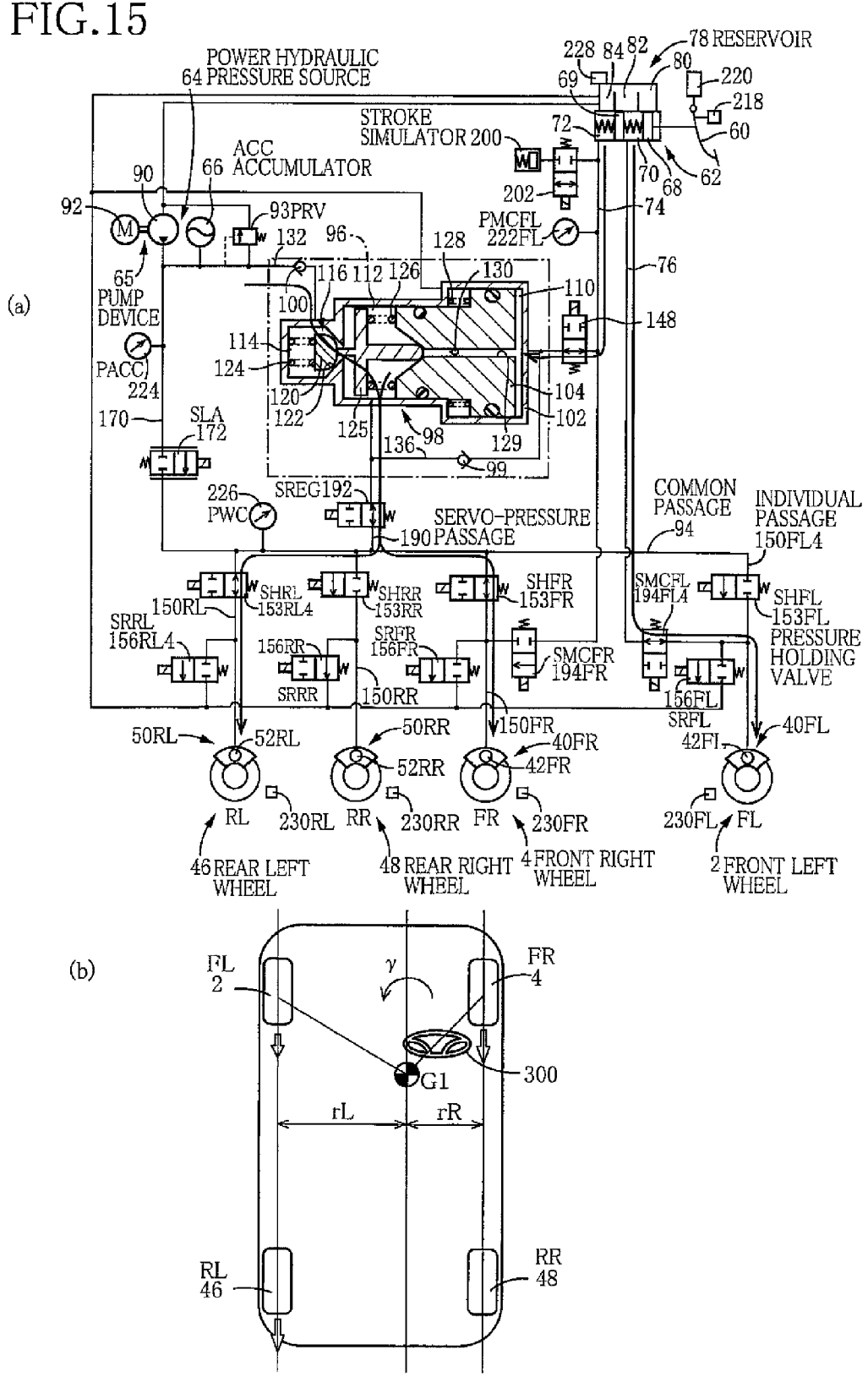
FIG. 15(a) is a hydraulic-brake circuit diagram of a hydraulic brake system according to embodiment 7 of the present invention.
FIG. 15(b) is a view illustrating a right-hand drive vehicle on which the hydraulic brake system is mounted.

In a hydraulic brake circuit in FIG. 15(a), a master cut-off valve 194FL4 corresponding to the brake cylinder 42FL provided for the front left wheel 2 is a normally open valve, and a pressure holding valve 153FL4 is a normally closed valve. Also, a pressure holding valve 153RL4 corresponding to the rear left wheel 46 is a normally open valve, and a pressure reduction valve 156RL4 is a normally closed valve. In the event of an abnormality in the control system, the master pressure is supplied to the brake cylinder 42FL provided for the front left wheel 2, and the servo pressure in the mechanical pressurization device 96 is supplied to the brake cylinders 42FR, 52RL provided respectively for diagonal wheels (i.e., the front right wheel 4 and the rear left wheel 46).

A right-turning directional yaw moment γ acting on a vehicle that has a driver's seat in its right portion in the forward direction (i.e., a vehicle having a steering wheel 300 in its right portion) is represented by the following equation:

$$\gamma = rR(F_{FR}) - rL(F_{FL}+F_{RL})$$

In this equation, the sum of the braking forces acting on the respective left wheels 2, 46 and the sum of the braking forces acting on the respective right wheels 4, 48 are generally equal to each other.

$$(F_{FR}) \approx (F_{FL}+F_{RL})$$

Meanwhile, since the arm rL is longer than the arm rR (rL>rR), the yaw moment γ is a negative value (γ<0) and accordingly is a yaw moment in the left-turning direction as illustrated in FIG. 15(b).

This yaw moment has a direction that causes the vehicle to deviate from an opposite lane in a region where legal regulations stipulate that a right-hand drive vehicle must run on the left side of the road. This configuration can improve safety of the vehicle in the event of the abnormality in the control system.

In the present embodiment, the master cylinder 62, the mechanical pressurization device 96, the common passage 94, the individual passages 150FR, RL, the normally-open pressure holding valves 153FR4, RL4, the master passage 76, a normally-open master cut-off valve 194FR4, the brake cylinders 42FL, FR, 52RL, and so on are one example of a manual hydraulic system. This manual hydraulic system includes a single-type hydraulic-pressure distributor.

Embodiment 8

Figure 16:
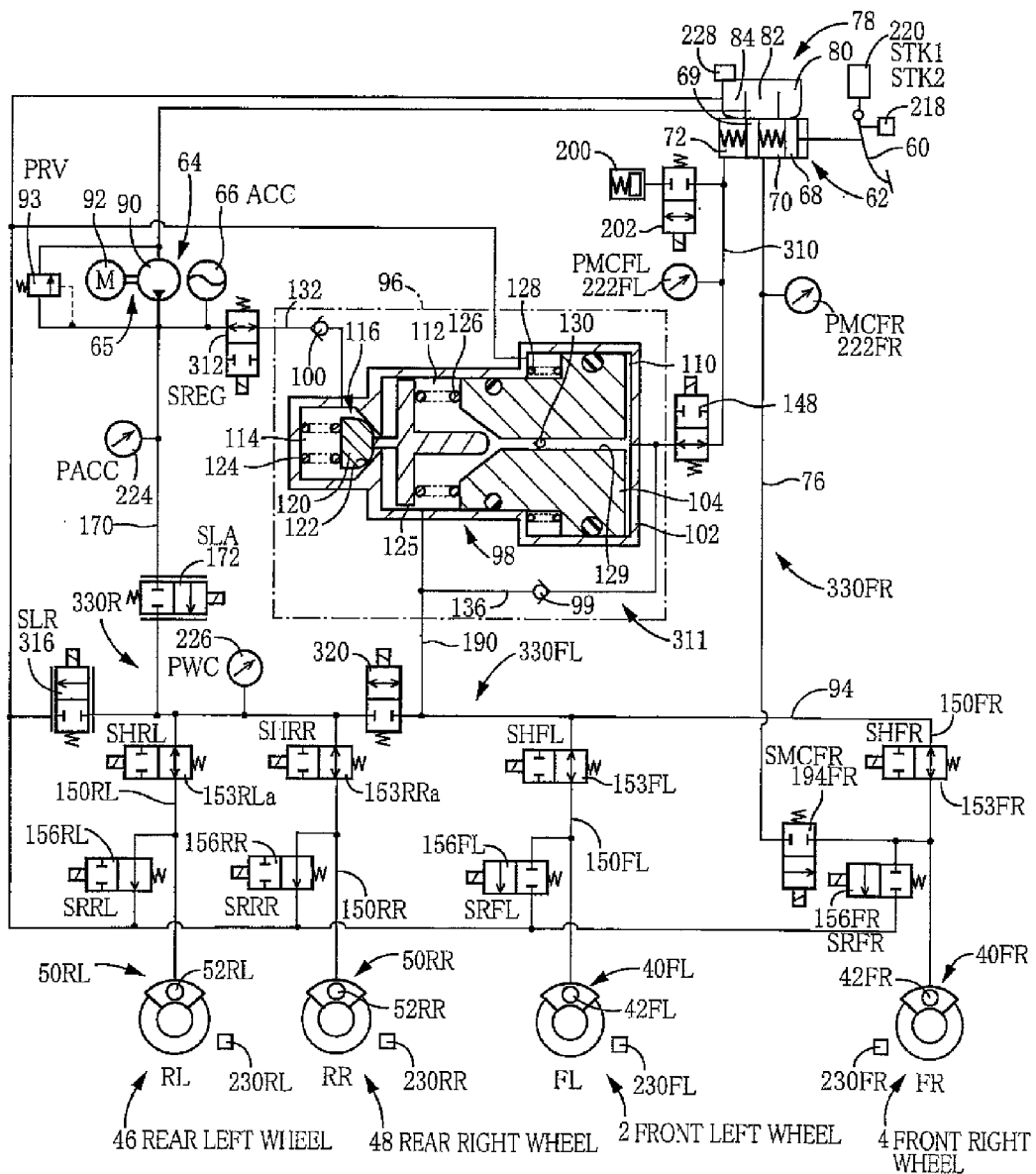
FIG. 16 is a hydraulic-brake circuit diagram of a hydraulic brake system according to embodiment 8 of the present invention.

The hydraulic brake system may include a brake circuit illustrated in FIG. 16. The other configurations are the same as those in embodiment 1. In the hydraulic brake circuit illustrated in FIG. 16, the pressure chamber 72 of the master cylinder 62 is coupled to the mechanical pressurization device 96 by a mechanical-valve input passage 310. Also, since the bypass passage 136 is provided in the mechanical pressurization device 96, the pressure chamber 72 is coupled to the brake cylinders 42FL, FR via the mechanical-valve input passage 310, the bypass passage 136, the servo-pressure passage 190, the common passage 94, and the individual passages 150FL, 150FR. Thus, the mechanical-valve input passage 310, the bypass passage 136, the servo-pressure passage 190, the common passage 94, the individual passages 150FL, FR, and so on can be considered to constitute a master passage (not bypassing the mechanical pressurization device 96 and can be referred to as an indirect manual passage 311).

Also, a high-pressure cut-off valve 312 is provided in a high-pressure passage 132 formed between the mechanical pressurization device 96 and the power hydraulic pressure source 64, and the high-pressure cut-off valve 312 is in series with the high-pressure-side check valve 100. While the high-pressure cut-off valve 312 is provided nearer to the power hydraulic pressure source 64 than the high-pressure-side check valve 100 in the present embodiment, the high-pressure cut-off valve 312 may be provided at any position. The high-pressure-side check valve 100 functions in an open state of the high-pressure cut-off valve 312. The high-pressure-side check valve 100 inhibits a flow of the working fluid from the mechanical pressurization device 96 to the power hydraulic pressure source 64 and, when the hydraulic pressure produced by the power hydraulic pressure source 64 is higher than the hydraulic pressure in the mechanical pressurization device 96, a flow of the working fluid from the power hydraulic pressure source 64 to the mechanical pressurization device 96 is allowed. However, the high-pressure-side check valve 100 does not function in a closed state of the high-pressure cut-off valve 312. The inflow and outflow of the working fluid to and from the high pressure chamber 114 are inhibited, so that the operation of the mechanical pressurization device 96 is also inhibited.

Also, as in embodiment 1, the input-side cut-off valve 148 is provided in a portion of the mechanical-valve input passage 310. Since the input-side cut-off valve 148, when being in its closed state, inhibits the flow of the working fluid from the master cylinder 62 to the brake cylinders, the input-side cut-off valve 148 can be considered to correspond to a master cut-off valve. The input-side cut-off valve 148 is provided in the indirect manual passage and is a normally open valve. Also, a pressure-reduction linear control valve 316 is provided between the common passage 94 and the reservoir 78 in the present embodiment. The pressure-reduction linear control valve 316 has generally the same structure as that of the pressurization linear control valve 172 illustrated in FIG. 3. In the pressure-reduction linear control valve 316, a pressure differential force related to a pressure differential between the hydraulic pressure in the common passage 94 and the hydraulic pressure in the reservoir 78 acts in a direction in which the valve element 180 is moved off the valve seat 182. Continuous control for a current supplied to the solenoid 186 allows the control for the magnitude of the hydraulic pressure in the common passage 94. It is noted that the pressure-reduction linear control valve 316 is not essential, and as in embodiment 1, the hydraulic pressure in the common passage 94 can be reduced using the pressure reduction valves 156 in the open states of the pressure holding valves 153.

Furthermore, a separate valve 320 is provided in the common passage 94 at a position between a position where the common passage 94 is connected to the servo-pressure passage 190 and a position where the common passage 94 is connected to an individual passage 150RR. The separate valve 320 is a normally-closed electromagnetic open/close valve. In other words, the mechanical pressurization device 96 is connected to the common passage 94 on a side of the separate valve 320 which is nearer to the brake cylinders 42FL, FR provided respectively for the front wheels 2, 4. Also, each of pressure holding valves 153RLa, RRa provided respectively corresponding to the brake cylinders 52RL, RR provided for the respective rear left and right wheels 46, 48 is a normally open valve.

It is noted that the separate valve 320 is not essential. Also, each of the pressure holding valves 153RLa, RRa may be a normally closed valve.

In the present embodiment, the output-side cut-off valve 192 is not provided. The closed state of the high-pressure cut-off valve 312 makes it difficult for the mechanical movable unit 98 to be operated. Also, in the closed state of the input-side cut-off valve 148, the hydraulic pressure in the master cylinder 62 is never supplied to the larger-diameter-side chamber 110, so that the hydraulic pressure in the master cylinder 62 never moves the stepped piston 104 forward. Thus, establishment of the closed state of the high-pressure cut-off valve 312 and the closed state of the input-side cut-off valve 148 achieves generally the same effects as obtained in the case where the output-side cut-off valve is placed in the closed state. Thus, there is a small need to provide the output-side cut-off valve on an output-side of the mechanical pressurization device 96. Also, the master passage 74 (i.e., a direct master passage) is not connected to the pressure chamber 72. This is because a master passage 311 (i.e., an indirect master passage) is provided to lower a need to provide the master passage 74 in addition to the master passage 311. Furthermore, a master-cylinder-pressure sensor 222FR is provided on the master passage 76. Since two master-cylinder-pressure sensors are provided, even if there is an abnormality in one of these master-cylinder-pressure sensors, the other master-cylinder-pressure sensor can detect the master cylinder pressure.

<Operations in Hydraulic Braking Device>

1) In a Case where System Works Normally

Figure 17:
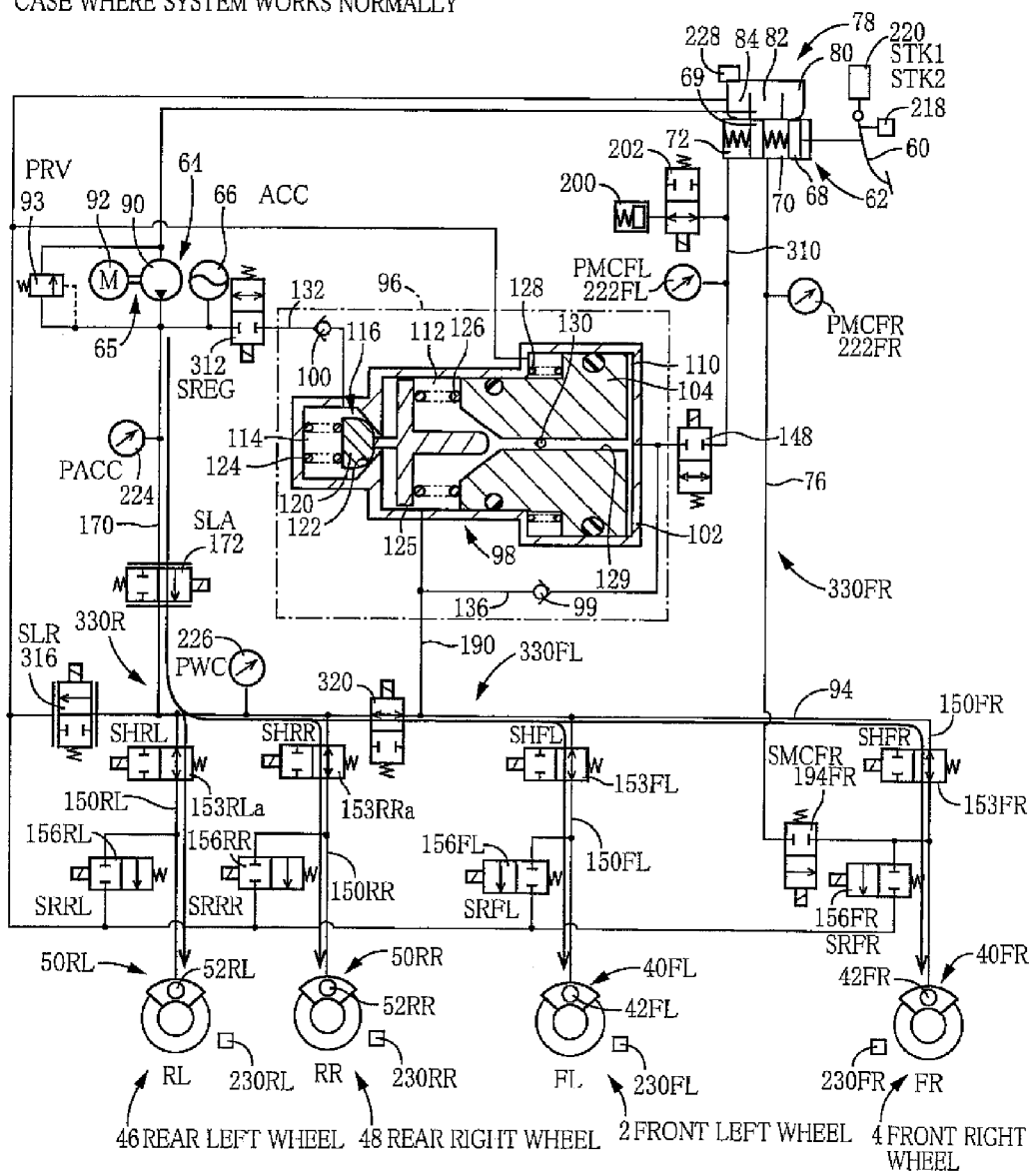
FIG. 17 is a view illustrating a state where the supply-state control program is executed in the hydraulic brake system (in a case where the system works normally).

As illustrated in FIG. 17, the input-side cut-off valve 148 is placed in the closed state, the simulator control valve 202 in the open state, and the high-pressure cut-off valve 312 in the closed state. Also, the pressure reduction valves 156RL, RR for the respective rear left and right wheels 46, 48 are placed in the closed states, and the separate valve 320 in the open state. The brake cylinder 42FR is decoupled from the master cylinder 62, and the mechanical pressurization device 96 is inhibited to be operated. In this state, the output hydraulic pressure produced by the power hydraulic pressure source 64 is utilized to supply the hydraulic pressure in the common passage 94 to the brake cylinders 42, 52 under the control of the pressurization linear control valve 172 and the pressure-reduction linear control valve 316. The common passage 94 and the smaller-diameter-side chamber 112 of the mechanical pressurization device 96 are in communication with each other, but since the input-side cut-off valve 148 is in the closed state, the hydraulic pressure in the smaller-diameter-side chamber 112 is never transferred back to the mechanical-valve input passage 310. Also, since the high-pressure cut-off valve 312 is in the closed state, the hydraulic pressure in the accumulator 66 is never supplied to the high pressure chamber 114, so that the hydraulic pressure in the smaller-diameter-side chamber 112 is maintained. As will be described below, the hydraulic pressure in the smaller-diameter-side chamber 112 is supplied to the larger-diameter-side chamber 110 via the intra-piston check valve 130, causing the stepped piston 104 to be moved forward and brought into contact with the valve opening member 125 to close the intra-piston communication passage 129. Also, since the input-side cut-off valve 148 is in the closed state, the backward movement of the stepped piston 104 is inhibited in principle. Thus, it is considered that this hardly affect the control of the hydraulic pressure in the common passage 94.

In the present embodiment, since the pressure holding valves 153RLa, RRa are the normally open valves, the need to supply the current to the solenoids in normal brake operation is eliminated, whereby power consumption can be reduced accordingly.

2) In Case of Abnormality in Control System

Figure 18:
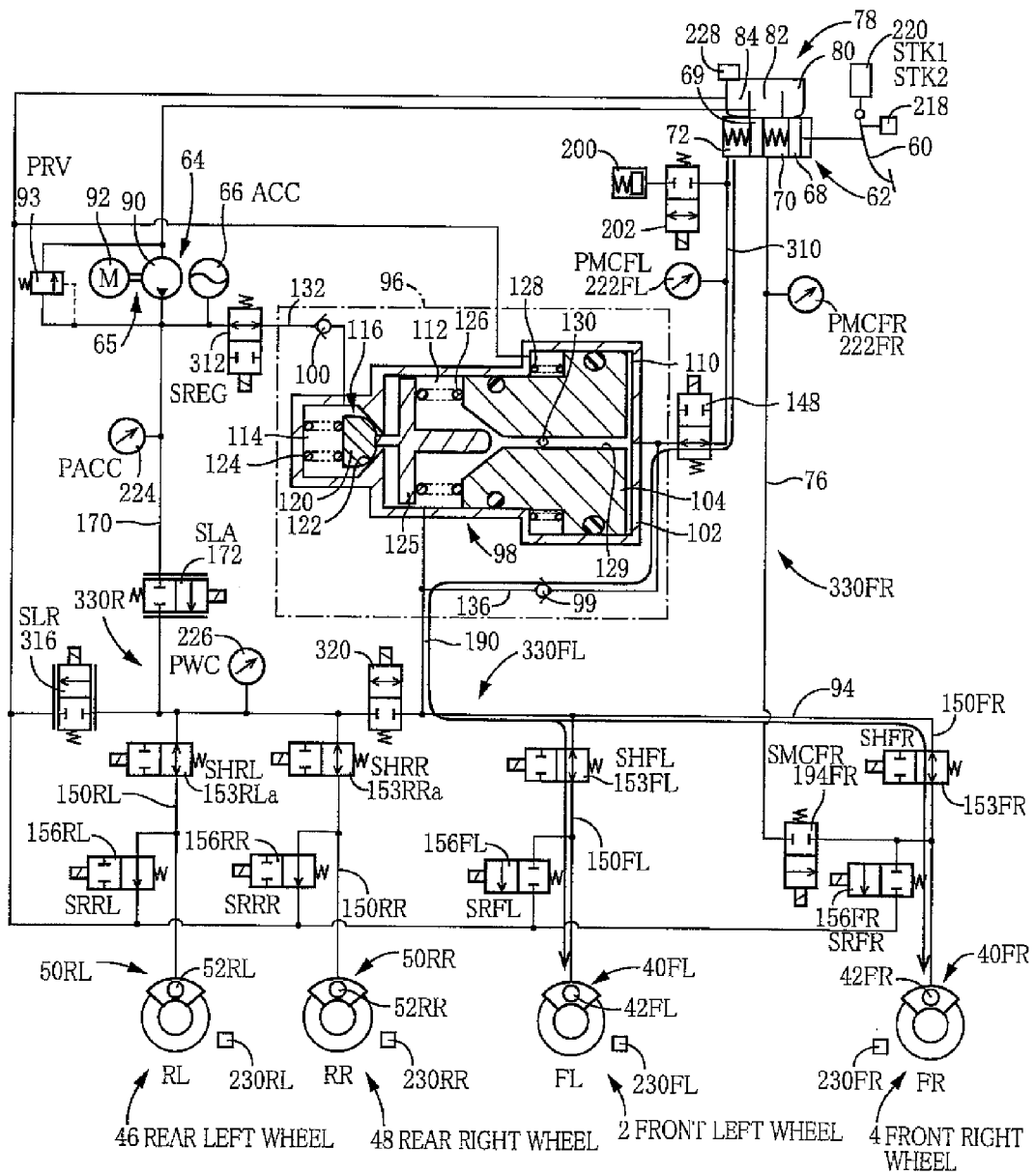
FIG. 18 is a view illustrating another state where the supply-state control program is executed in the hydraulic brake system (in case of an abnormality in the control system).
Figure 19:
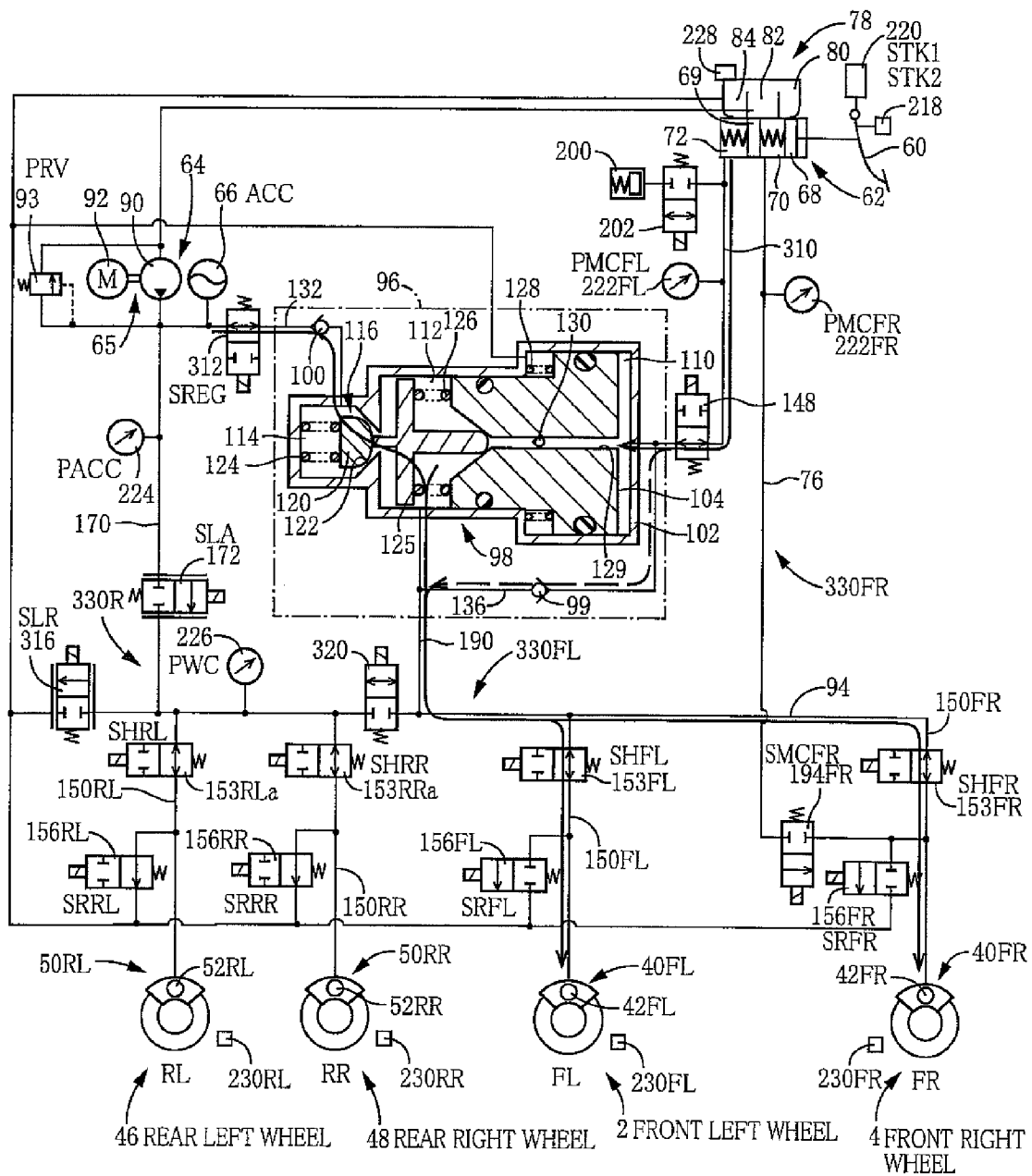
FIG. 19 is a view illustrating another state where the supply-state control program is executed in the hydraulic brake system (in case of an abnormality in the control system).

As illustrated in FIGS. 18 and 19, no current is supplied to all the solenoids, so that all the valves are placed back in their respective original positions.

2-1) In a Case where Hydraulic Pressure in Larger-Diameter-Side Chamber 110 is Equal to or Lower than Actuating Pressure of Mechanical Movable Unit 98

As illustrated in FIG. 18, when the hydraulic pressure in the larger-diameter-side chamber 110 is equal to or lower than the actuating pressure of the mechanical movable unit 98, the hydraulic pressure in the pressure chamber 72 is supplied to the common passage 94 via the mechanical-valve input passage 310, the bypass passage 136, and the servo-pressure passage 190 and then to the brake cylinders 42 provided for the respective front left and right wheels 2, 4. Since the valve opening pressure of the input-side check valve 99 is considerably low, the working fluid can be speedily supplied to the brake cylinders 42 in response to the operation for the brake pedal 60, resulting in shortened brake response time of each hydraulic brake 40. The brake cylinders 42FL, FR provided for the respective front left and right wheels 2, 4 are operated as described above in the event of the abnormality in the control system. Thus, in the case where the center of gravity of the vehicle is located at generally the center of the vehicle in the right and left direction, the generation of the yaw moment can be suppressed.

2-2) In a Case where Hydraulic Pressure in Pressure Chamber 72 is Higher than Actuating Pressure of Mechanical Movable Unit 98

2-2-1) In a Case where Hydraulic Pressure of Working Fluid Accumulated in Accumulator 66 is Higher than Actuation Allowing Pressure In a case where the hydraulic pressure of the working fluid accumulated in the accumulator 66 is higher than the actuation allowing pressure, even where the operation of the pump device 65 is stopped, the mechanical movable unit 98 is allowed to be operated. As illustrated by solid lines in FIG. 19, the stepped piston 104 is moved forward by the hydraulic pressure in the larger-diameter-side chamber 110 to be brought into contact with the valve opening member 125, thereby switching the high-pressure supply valve 116 to the open state. The smaller-diameter-side chamber 112 is decoupled from the larger-diameter-side chamber 110, and the high-pressure working fluid is supplied from the accumulator 66 to the high pressure chamber 114 via the high-pressure-side check valve 100. The hydraulic pressure in the smaller-diameter-side chamber 112 (i.e., the servo pressure) is made higher than the hydraulic pressure in the master cylinder 62 and supplied to the common passage 94 and then to the brake cylinders 42FL, 42FR provided for the respective front left and right wheels 2, 4. The magnitude of the hydraulic pressure in the smaller-diameter-side chamber 112 is determined by the hydraulic pressure in the larger-diameter-side chamber 110 and the ratio between the respective pressure receiving areas of the large diameter portion and the small diameter portion of the stepped piston 104.

2-2-2) in a Case where Hydraulic Pressure of Working Fluid Accumulated in Accumulator 66 is Equal to or Lower than Actuation Allowing Pressure In a case where the hydraulic pressure of the working fluid accumulated in the accumulator 66 is equal to or lower than the set pressure, as in the state illustrated in FIG. 18, the hydraulic pressure in the pressure chamber 72 of the master cylinder 62 is supplied to the brake cylinders 42 provided for the respective front left and right wheels 2, 4 via the mechanical-valve input passage 310, the bypass passage 136, the servo-pressure passage 190, and the common passage 94. Meanwhile, the hydraulic pressure of the working fluid accumulated in the accumulator 66 is higher than the actuation allowing pressure at the actuation of the hydraulic brakes 40, but when the hydraulic pressure of the working fluid accumulated in the accumulator 66 is reduced by the operation of the mechanical movable unit 98 and becomes lower than the actuation allowing pressure, the supply of the working fluid from the accumulator 66 to the high pressure chamber 114 is stopped. This inhibits the mechanical movable unit 98 from being operated or actuated. For example, when the brake is pumped, more working fluid accumulated in the accumulator 66 is consumed, which may result in the lower accumulator pressure. The forward movement of the stepped piston 104 is inhibited (it is considered that the stepped piston 104 is brought into contact with the stopper), so that the hydraulic pressure in the smaller-diameter-side chamber 112 is not built up any higher, that is, the mechanical movable unit 98 is made unable to exhibit the boosting function. The hydraulic pressure in the pressure chamber 72 becomes higher than the hydraulic pressure in the smaller-diameter-side chamber 112, and as indicated by a broken line in FIG. 19, the hydraulic pressure in the pressure chamber 72 of the master cylinder 62 is supplied to the common passage 94 via the bypass passage 136 and the servo-pressure passage 190. The hydraulic pressure in the pressure chamber 72 of the master cylinder 62 is supplied to the brake cylinders 42FL, 42FR provided for the respective front left and right wheels 2, 4, without being boosted.

Also, since the separate valve 320 is in the closed state, the hydraulic pressure in the mechanical movable unit 98 is inhibited from being supplied to the brake cylinders 52RL, 52RR provided for the respective rear left and right wheels 46, 48. This reduces the possibility of the fluid shortage and the shortage of the pressure buildup for the brake cylinders 42FL, FR provided for the respective front left and right wheels 2, 4. Moreover, the volume of the pressure chamber 72 can be increased in the master cylinder 62. Where the volume of the pressure chamber 72 is increased, even when the working fluid is supplied to both of the brake cylinders 42FL, FR provided for the respective front left and right wheels 2, 4, the fluid shortage can be avoided. In this case, the stroke of the brake pedal 60 operated by the driver may be larger.

3) In Case of Possible Leakage

Figure 20:
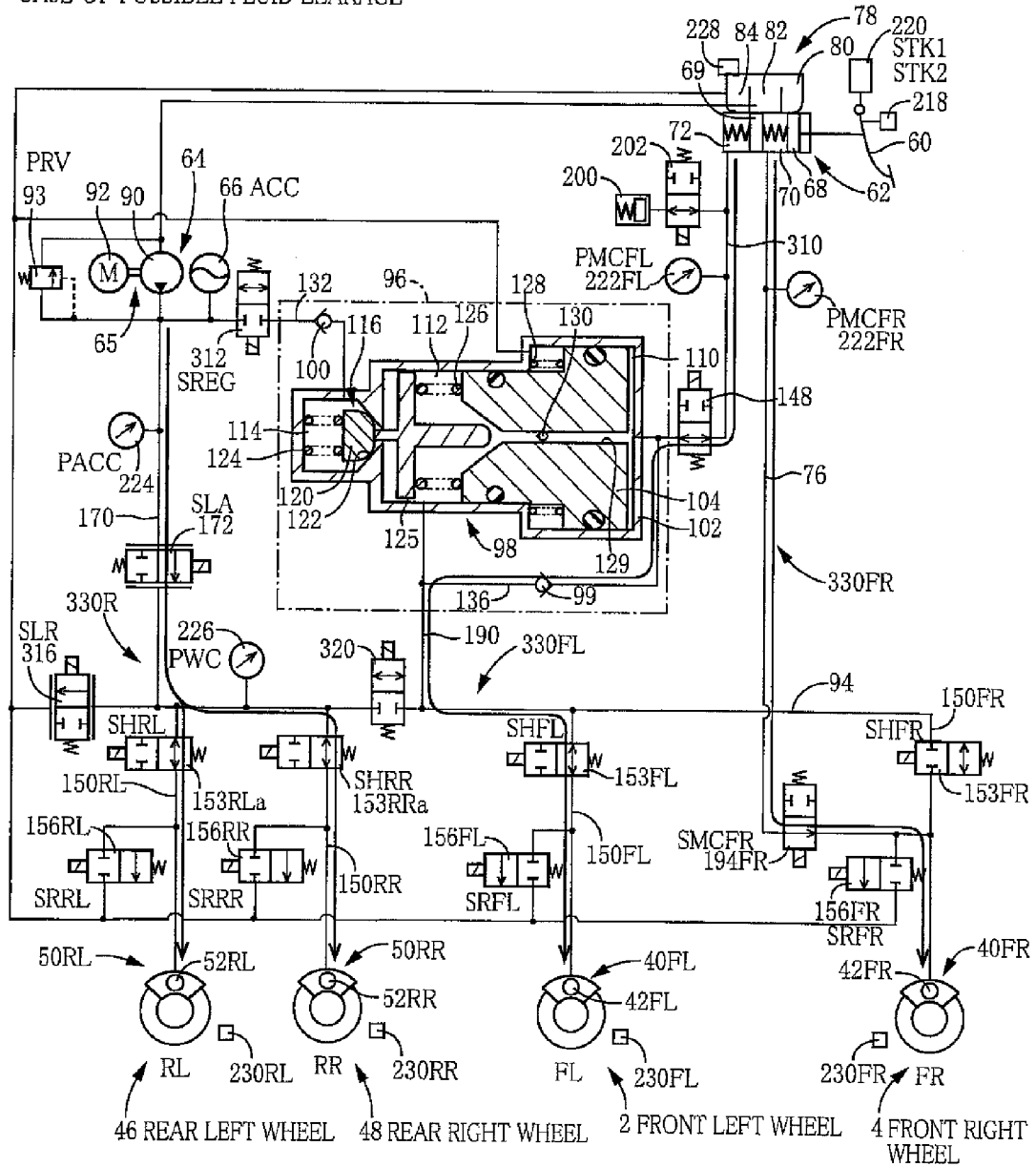
FIG. 20 is a view illustrating still another state where the supply-state control program is executed in the hydraulic brake system (in case of possible fluid leakage).

As illustrated in FIG. 20, the input-side cut-off valve 148 is placed in the open state, the high-pressure cut-off valve 312 in the closed state, and the master cut-off valve 194FR in the open state. Also, the pressure reduction valves 156RL, RR for the respective rear left and right wheels 46, 48 are placed in the closed states. Also, the separate valve 320 is placed in the closed state, and the pressure holding valve 153FR for the front right wheel 4 in the closed state.

(a) The brake cylinders 52 provided for the respective rear left and right wheels 46, 48 are isolated from the brake cylinders 42 provided for the respective front left and right wheels 2, 4. In this state, the hydraulic pressure produced by the power hydraulic pressure source 64 is controlled by the pressurization linear control valve 172 and the pressure-reduction linear control valve 316 and supplied to the brake cylinders 52 provided for the respective rear left and right wheels 46, 48.

(b) The brake cylinder 42FR provided for the front right wheel 4 is isolated from the brake cylinders 42FL, 52RL, RR for the respective three wheels. In this state, the hydraulic pressure in the pressure chamber 70 of the master cylinder 62 is supplied to the brake cylinder 42FR provided for the front right wheel 4.

(c) The brake cylinder 42FL provided for the front left wheel 2 is isolated from the brake cylinders 52RL, RR provided for the respective rear left and right wheels 46, 48 and the brake cylinder 42FR provided for the front right wheel 4. In this state, the hydraulic pressure in the pressure chamber 72 is supplied to the brake cylinder 42FL provided for the front left wheel 2 via the mechanical pressurization device 96 (the bypass passage 136).

In this case, since the high-pressure cut-off valve 312 is in the closed state, the operation of the mechanical movable unit 98 is inhibited even in the open state of the input-side cut-off valve 148. Thus, the equal hydraulic pressure is supplied to the brake cylinders 42FL, FR provided for the respective front left and right wheels 2, 4.

Also, since the high-pressure cut-off valve 312 is in the closed state, the hydraulic pressure produced by the power hydraulic pressure source 64 is not supplied to the mechanical pressurization device 96, so that the three brake lines 330FL, FR, R can be independent of one another. If the high-pressure cut-off valve 312 is in the open state (for example, the high-pressure cut-off valve 312 is not provided), the hydraulic pressure produced by the power hydraulic pressure source 64 is supplied to the brake line 330R including the brake cylinders 52 provided for the respective rear left and right wheels 46, 48 and to the brake line 330FL including the brake cylinder 42FL provided for the front left wheel 2, so that these brake lines 330R, 330FL cannot be independent of each other. Thus, in the event of fluid leakage in the brake line 330FL, the hydraulic pressure produced by the power hydraulic pressure source 64 is consumed in the brake line 330FL, which may affect the brake line 330R. In contrast, in the case where the high-pressure cut-off valve 312 is placed in the closed state, it is possible to inhibit an outflow of the working fluid from the power hydraulic pressure source 64 via the mechanical pressurization device 96 even in the event of the fluid leakage in the brake line 330FL.

That is, the establishment of the closed states of the high-pressure cut-off valve 312 and the separate valve 320 can make the three brake lines 330FL, FR, R independent of one another. Thus, even in the event of fluid leakage in one of these three brake lines, this fluid leakage does not affect the other brake lines. The brake line 330FR includes the brake cylinder 42FR, the master passage 76, the pressure chamber 70, and the fluid chamber 80. The brake line 330FL includes the brake cylinder 42FL, the individual passage 150FL, the common passage 94, the servo-pressure passage 190, the mechanical pressurization device 96, the mechanical-valve input passage 310, the pressure chamber 72, and the fluid chamber 82. The brake line 330R includes the brake cylinders 52RL, RR, the individual passages 150RL, RR, the power hydraulic pressure source 64, and the fluid chamber 84. Accordingly, the state in which the brake lines 330FR, FL, R are independent of one another means that the fluid chambers 80, 82, 84 of the master reservoir 78 are also independent of one another.

Also, in a case where there is an abnormality in the control system (for example, the pump device 65 is inoperative, but the control for the electromagnetic open/close valve is possible), and the hydraulic pressure in the accumulator 66 is lower than the actuation allowing pressure, it is sometimes more effective to switch to the state in FIG. 20 than to switch to the state in FIG. 18. In the state in which the operation of the mechanical movable unit 98 is inhibited, the hydraulic pressure in the pressure chamber 72 is supplied to the brake cylinders 42FL, FR provided respectively for the front left and right wheels in the state in FIG. 18, but the pressure chambers 72, 70 are fluidically coupled with the respective brake cylinders 42FL, FR provided for the respective front left and right wheels 2, 4 in the state in FIG. 20, resulting in less shortages of the working fluid in the brake cylinders 42FL, FR.

4) In a Case of Release of Hydraulic Brake

Upon release of the braking operation, no current is supplied to the solenoids of all the valves, so that all the valves are placed back in the original positions in FIG. 16. Also, in the mechanical pressurization device 96, the stepped piston 104 is spaced apart from the valve opening member 125. The hydraulic pressures in the brake cylinders 42FL, FR provided for the respective front left and right wheels 2, 4 are returned to the master cylinder 62 (i.e., the master reservoir 78) via the intra-piston communication passage 129 and the intra-piston check valve 130. Also, the hydraulic pressures in the brake cylinders 52RL, RR provided for the respective rear left and right wheels 46, 48 are returned to the reservoir 78 via the respective pressure reduction valves 156.

5) OFF State of Ignition Switch 234

No current is supplied to the solenoids of all the electromagnetic open/close valves, so that all the valves are placed back in the original positions in FIG. 16. Since the three brake lines 330FR, FL, R are independent of one another as in the case in embodiment 1, even in the event of fluid leakage in one of these three brake lines, this fluid leakage does not affect the other brake lines. Also, since the outflow preventing device is provided in the mechanical pressurization device 96, the outflow of the working fluid from the master reservoir 78 via the mechanical pressurization device 96 can be inhibited.

6) Check of Mechanical Pressurization Device 96

In the present embodiment, when predefined check conditions are satisfied, a check of whether the operation of the mechanical pressurization device 96 is normal or not is executed.

Figure 21:
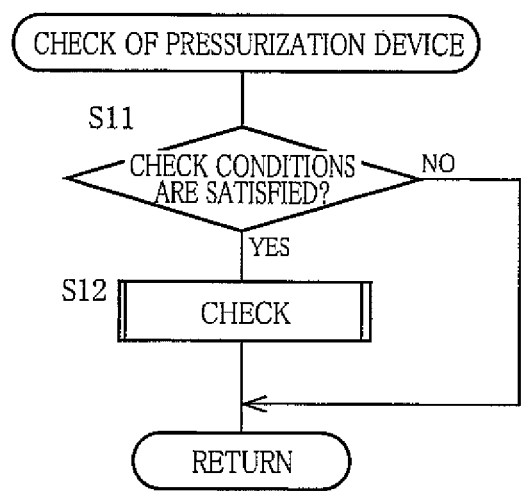
FIG. 21 is a flow chart illustrating a check program stored in the storage device of the brake ECU of the hydraulic brake system.

A check program represented by a flow chart in FIG. 21 is executed in each predefined set length of time. At S11, it is determined whether the check conditions are satisfied or not. When the check conditions are not satisfied, the check is not executed, but when the check conditions are satisfied, the check of the operation of the mechanical pressurization device 96 is executed at S12. In the present embodiment, the check conditions are considered to be satisfied when (i) a first brake actuating operation is performed for the brake pedal 60 after the ignition switch 234 is switched from the OFF state to the ON state, and (ii) the vehicle is in a stopped state. The vehicle can be considered to be in the stopped state when the running speed of the vehicle which is obtained on the basis of the detection values of the wheel speed sensors 230 is equal to or lower than a set speed which can consider that the vehicle is in the stopped state.

The check is thus executed in the operating state of the brake pedal 60. Also, the check is preferably executed in the stopped state of the vehicle but may not be executed in the stopped state. The check includes two methods: check 1 and check 2. The checks 1 and 2 may be executed such that one of the checks 1 and 2 is selectively executed, such that both of the checks 1 and 2 are executed when the check conditions are satisfied, or such that the check 1 is executed when the master-cylinder hydraulic pressure is equal to or higher than a set pressure, and the check 2 is executed when the master-cylinder hydraulic pressure is lower than the set pressure. As will be described below, the set pressure of the master-cylinder hydraulic pressure can be determined to have such a magnitude that allows reliable determination of whether the operation of the mechanical pressurization device 96 is normal or not in the check 1. This set pressure may be referred to as "checkable pressure".

6-1) Check 1

In the check 1, the input hydraulic pressure Pin (Pm) in the mechanical movable unit 98 and the output hydraulic pressure Pout (Pwc) in the mechanical movable unit 98 are compared with each other to determine whether the operation of the mechanical pressurization device 96 is normal or not. As illustrated in FIG. 22(*a*), the pressurization linear control valve 172 and the pressure-reduction linear control valve 316 are placed in the closed states, and the input-side cut-off valve 148 and the high-pressure cut-off valve 312 are placed in the open states. In these states, the operation of the mechanical pressurization device 96 is allowed. A value Pm detected by a master-cylinder-pressure sensor 222FL (i.e., the input hydraulic pressure Pin in the mechanical movable unit 98) and a value Pw detected by the brake-cylinder-pressure sensor 226 (i.e., the output hydraulic pressure Pout in the mechanical movable unit 98) are compared with each other. When these values fall within a normal region R illustrated in FIG. 22(*b*), it can be determined that the operation of the mechanical pressurization device 96 is normal. On the other hand, when these values do not fall within the normal region R, it is determined that the operation of the mechanical pressurization device 96 is abnormal. The solid line in FIG. 22(*b*) represents a relationship between Pin and Pout in the case where the operation of the mechanical pressurization device 96 is normal.

The abnormality of the operation of the mechanical pressurization device 96 is considered to be caused by at least one of (a) an abnormality in the power hydraulic pressure source 64 (e.g., a case where the output hydraulic pressure produced by the power hydraulic pressure source 64 is low and a case where no high hydraulic pressure is supplied from the power hydraulic pressure source 64, and these cases are considered to be caused by, for example, the fluid leakage from the accumulator 66, a failure of the pump motor 92, the fluid leakage from the high-pressure passage 132), (b) a stuck-closed fault of the high-pressure cut-off valve 312, (c) a failure in the mechanical pressurization device 96 (i.e., a case where the mechanical movable unit 98 is inoperative, which is caused by, for example, a stuck-closed fault of the high-pressure supply valve 116 and an inoperative failure of the stepped piston 104 such as seizing up thereof), (d) a stuck-closed fault of the input-side cut-off valve 148, and other similar causes. Examples of other causes include a fault in the master-cylinder-pressure sensor 222FL and/or the brake-cylinder-pressure sensor 226, a stuck-closed fault of the separate valve 320, and fluid leakage. In contrast, in the case where the operation of the mechanical pressurization device 96 is normal, it is considered that the operation of the mechanical movable unit 98 is normal, the high-pressure working fluid is supplied from the power hydraulic pressure source 64, and the high-pressure cut-off valve 312 and the input-side cut-off valve 148 are switched to the open states as commanded. In other words, in the case where the operation of the mechanical pressurization device 96 is normal, it can be determined that not only the mechanical pressurization device 96 but also components, devices, and so on associated with the operation of the mechanical pressurization device 96 are normal.

It is noted that, while the detection value of the master-cylinder-pressure sensor 222FL is used as the input hydraulic pressure Pin, the detection value of the master-cylinder-pressure sensor 222FR or a value estimated based on the detection value of the stroke sensors 220 may be used, for example.

Also, in a case where it has already found that at least one of (a) the power hydraulic pressure source 64, (b) the high-pressure cut-off valve 312, (c) the mechanical pressurization device 96, and (d) the input-side cut-off valve 148 is normal, or more specifically in a case where it has already found that these devices are normal, when it is determined that the operation of the mechanical pressurization device 96 is abnormal, a cause of this abnormality may be obtained.

6-2) Check 2

In the check 2, the stepped piston 104 is moved forward in the closed state of the mechanical input-side cut-off valve 148 and the closed state of the high-pressure cut-off valve 312 to build up the hydraulic pressure in the smaller-diameter-side chamber 112 so as to switch the high-pressure supply valve 116 to the open state. It is thereafter determined whether the operation of the mechanical pressurization device 96 is normal or not on the basis of a change in the hydraulic pressure in the smaller-diameter-side chamber 112 after the high-pressure cut-off valve 312 is controlled to be switched to the open state.

6-2-1) Pre-Check Control

Figure 23:
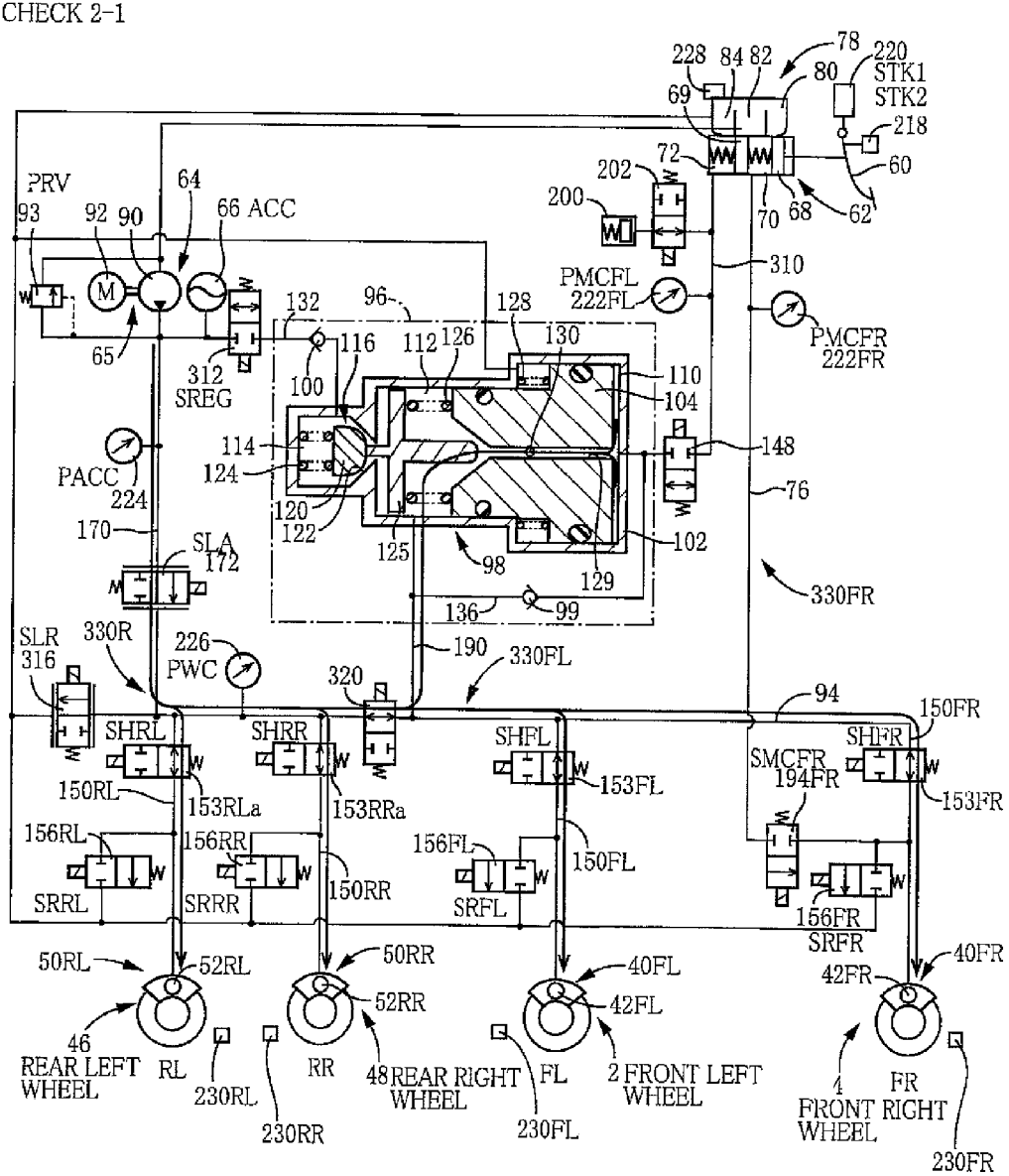
FIG. 23 is a view illustrating a state where the check program is executed in the hydraulic brake system (check 2-1).

As illustrated in FIG. 23, the pressurization linear control valve 172 and the pressure-reduction linear control valve 316 are controlled in the closed states of the mechanical input-side cut-off valve 148 and the high-pressure cut-off valve 312, so that the hydraulic pressure in the common passage 94 is changed to a target hydraulic pressure Pref1. The target hydraulic pressure Pref1 has a magnitude that is higher than the actuating pressure of the stepped piston 104 and that causes the high-pressure supply valve 116 to be switched to the open state. With the stepped piston 104 located at its back end position, the intra-piston communication passage 129 fluidically couples the smaller-diameter-side chamber 112 and the larger-diameter-side chamber 110 with each other. When the hydraulic pressure is supplied to the smaller-diameter-side chamber 112, the hydraulic pressure is supplied to the larger-diameter-side chamber 110 via the intra-piston communication passage 129 and the intra-piston check valve 130. When the hydraulic pressure in the larger-diameter-side chamber 110 is lower than the actuating pressure, the intra-piston communication passage 129 is kept in the open state, so that the hydraulic pressure in the larger-diameter-side chamber 110 is increased along the solid line in FIG. 25(*a*) with an increase in the hydraulic pressure in the smaller-diameter-side chamber 112. These hydraulic pressures have equal magnitude (Pin=Pout).

When the hydraulic pressure in the larger-diameter-side chamber 110 thereafter reaches the actuating pressure, the stepped piston 104 is moved forward. This forward movement should cause the following operations: the stepped piston 104 is brought into contact with the valve opening member 125 to close the intra-piston communication passage 129, and the valve opening member 125 is moved forward to switch the high-pressure supply valve 116 to the open state. The hydraulic pressure in the smaller-diameter-side chamber 112 becomes higher than the hydraulic pressure in the larger-diameter-side chamber 110, and the hydraulic pressure in the smaller-diameter-side chamber 112 becomes the servo pressure. As indicated by one-dot chain lines in FIG. 25(*a*), the hydraulic pressure in the larger-diameter-side chamber 110 increases with the increase in the hydraulic pressure in the smaller-diameter-side chamber 112. The hydraulic pressure in the smaller-diameter-side chamber 112 (i.e., the detection value of the brake-cylinder-pressure sensor 226) is controlled by the pressurization linear control valve 172 so as to be brought closer to the target hydraulic pressure Pref1. After the hydraulic pressure in the smaller-diameter-side chamber 112 reaches the target hydraulic pressure Pref1, the hydraulic pressure in the smaller-diameter-side chamber 112 is reduced principally by the control for the pressure-reduction linear control valve 316 so as to be brought closer to a target hydraulic pressure Pref2. As illustrated in FIG. 25(a), hysteresis of the mechanical movable unit 98 makes the hydraulic pressure in the smaller-diameter-side chamber 112 and the hydraulic pressure in the larger-diameter-side chamber 110 generally equal to each other. In the present embodiment, since the hydraulic pressure in the smaller-diameter-side chamber 112 is reduced after the stepped piston 104 is moved forward by the increase in the hydraulic pressure in the smaller-diameter-side chamber 112, a direction of the change in the hydraulic pressure (i.e., hysteresis) is opposite to that in normal brake operation.

It is noted that, since the check is executed in a state in which the brake actuating operation is being performed on the brake pedal 60, the pressure holding valves 153 are in the open states, and the pressure reduction valves 156 in the closed states, so that each of the respective hydraulic pressures in all the brake cylinders 42, 52 is the target hydraulic pressure Pref1. In this sense, the target hydraulic pressure Pref1 can be adjusted at a magnitude that is determined by a braking force requested by the driver. In most cases, requirement in which the target hydraulic pressure Pref1 is higher than the actuating pressure is satisfied.

6-2-2) Switch of High-Pressure Cut-Off Valve 312

Figure 24:
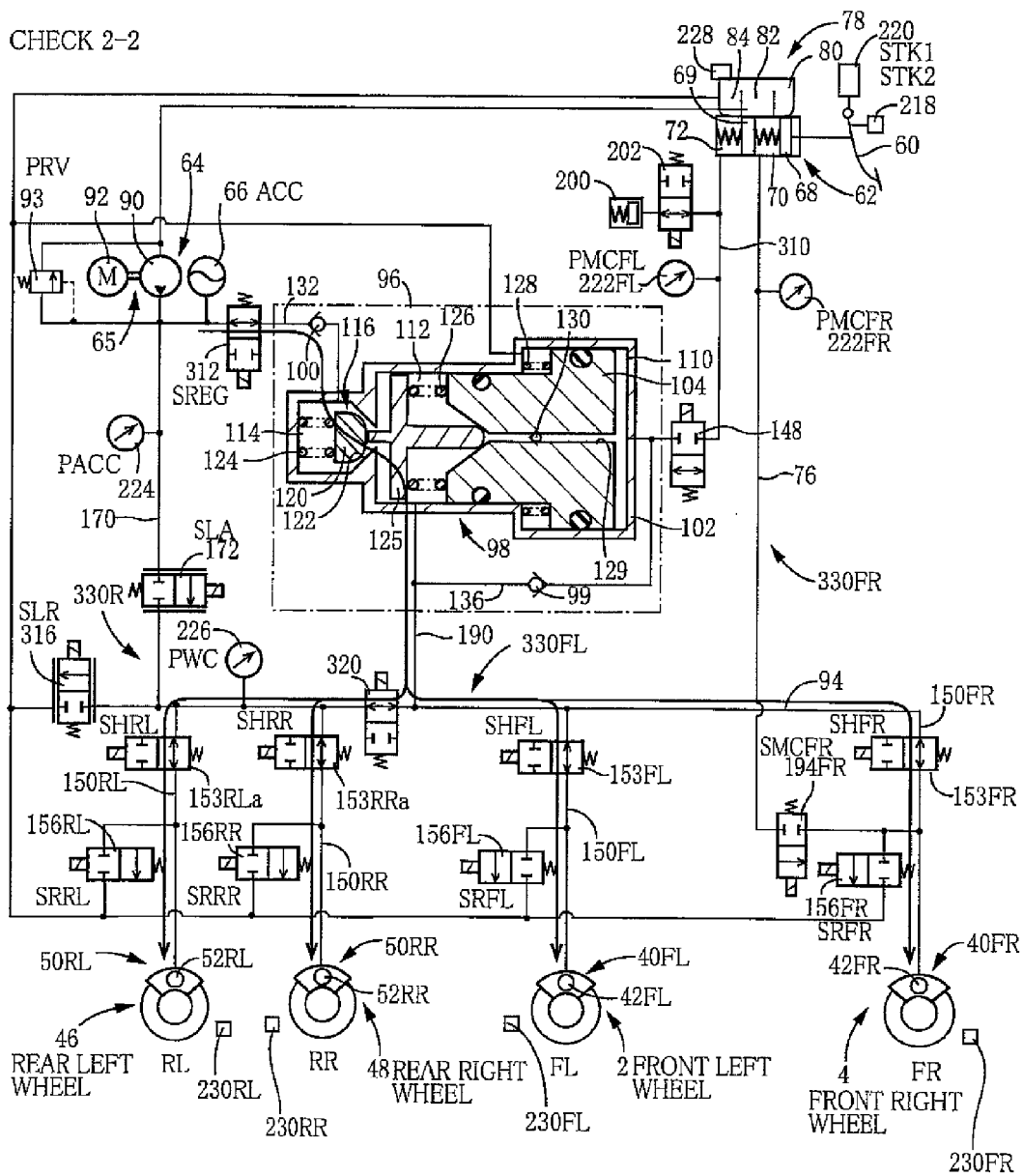
FIG. 24 is a view illustrating another state where the check program is executed in the hydraulic brake system (check 2-2).

As illustrated in FIG. 24, the pressurization linear control valve 172 and the pressure-reduction linear control valve 316 are then switched to the closed states to form a closed space around the smaller-diameter-side chamber 112. The space containing the smaller-diameter-side chamber 112 and the brake-cylinder-pressure sensor 226 is isolated from the reservoir 78 and the power hydraulic pressure source 64 and also from the master cylinder 62 (noted that the master cut-off valve 194FR is in the closed state). In this state, a current to be supplied to the solenoid of the high-pressure cut-off valve 312 is controlled so as to switch the high-pressure cut-off valve 312 from the closed state to the open state (that is, no current is supplied to the solenoid). When the high-pressure working fluid is supplied from the power hydraulic pressure source 64 to the smaller-diameter-side chamber 112, the hydraulic pressure in the smaller-diameter-side chamber 112 is immediately built up. In the present embodiment, as illustrated in FIG. 25(b), a detection value Pwc of the brake-cylinder-pressure sensor 226 should be increased to the hydraulic pressure Pref1 and then increased along the one-dot chain line. Thus, when the detection value of the brake-cylinder-pressure sensor 226 is lower than the hydraulic pressure Pref1 after the current to be supplied to the solenoid of the high-pressure cut-off valve 312 is controlled so as to switch the high-pressure cut-off valve 312 from the closed state to the open state, in other words, when an amount of increase $\Delta Pwc$ of the detection value Pwc is smaller than a determination threshold value $\Delta Pth$ (=Pref1−Pref2), it is determined that the operation of the mechanical pressurization device 96 is not normal.

Figure 26:
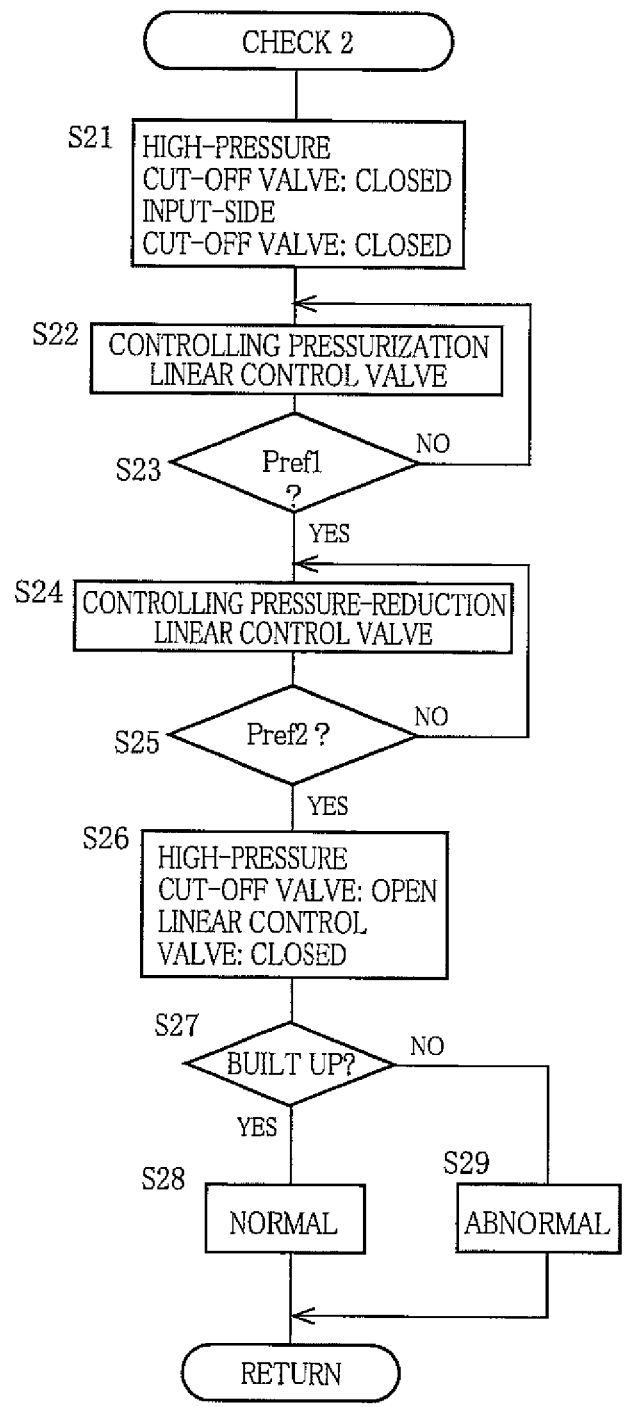
FIG. 26 is a flow chart partly illustrating the check program (in a case where check 2 is executed).

FIG. 26 illustrates a routine in the case where the check 2 is executed at S12.

At S21, the input-side cut-off valve 148 is controlled to be placed in the closed state, and the high-pressure cut-off valve 312 in the closed state. At S22, a current to be supplied to the pressurization linear control valve 172 is controlled to build up the hydraulic pressure in the smaller-diameter-side chamber 112 (the common passage 94 and the brake cylinders 42, 52). Then at S23, it is determined whether the detection value Pwc of the brake-cylinder-pressure sensor 226 has been brought closer to the target hydraulic pressure Pref1 or not. Until the detection value Pwc has been brought closer to the target hydraulic pressure Pref1, the processings at S22 and S23 are repeated. When the detection value Pwc has been brought closer to the target hydraulic pressure Pref1, the pressure-reduction linear control valve 316 is mainly controlled at S24 to reduce the hydraulic pressure in the smaller-diameter-side chamber 112. At S25, it is determined whether the hydraulic pressure in the smaller-diameter-side chamber 112 has been brought closer to generally the target hydraulic pressure Pref2 or not. The control for the pressure-reduction linear control valve 316 is continued until the hydraulic pressure in the smaller-diameter-side chamber 112 has been brought closer to the target hydraulic pressure Pref2. Then at S26, the pressurization linear control valve 172 and the pressure-reduction linear control valve 316 are placed in the closed states, and the high-pressure cut-off valve 312 in the open state to form the closed space. Then at S27, it is determined whether or not the detection value Pwc of the brake-cylinder-pressure sensor 226 becomes equal to or higher than the hydraulic pressure Pref1. When the brake-cylinder hydraulic pressure is built up, it is determined at S28 that the operation of the mechanical pressurization device 96 is normal. When the brake-cylinder hydraulic pressure is not built up, it is determined at S29 that the operation of the mechanical pressurization device 96 is not normal.

In the present embodiment as described above, the check can be executed in the state in which the brake actuating operation is being performed on the brake pedal 60, i.e., in normal braking, resulting in increase in opportunities of the check and improvement in a reliability of the hydraulic brake system.

Also, since the input-side cut-off valve 148 is in the closed state, a reaction force applied to the brake pedal 60 does not change due to the check, thereby suppressing lowering of operation feeling of the driver.

Also, since the input-side cut-off valve 148 is in the closed state, each target hydraulic pressure Pref may have a magnitude that is not related to a state of the braking operation of the driver. In the check 1, when the input hydraulic pressure Pm is lower than the checkable pressure, it is impossible to accurately determine whether the operation of the mechanical pressurization device 96 is normal or not. In the check 2, on the other hand, since each of the target hydraulic pressures Pref 1, 2 is set at any magnitude (within a range higher than the actuating pressure), it is possible to accurately determine whether the operation of the mechanical pressurization device 96 is normal or not, thereby improving the reliability of the hydraulic brake system.

It is noted that it is possible to wait until a predefined set length of time has passed before the processing at S27 is executed. In this embodiment, the presence or absence of the change in the hydraulic pressure in the smaller-diameter-side chamber 112 can be accurately detected.

Also, a magnitude of the target hydraulic pressure Pref1 is not limited to be a magnitude related to a braking torque requested by the driver. The target hydraulic pressure may have any magnitude as long as the target hydraulic pressure is capable of switching the high-pressure supply valve 116 to the open state.

Also, the check 2 is executable in the non-operated state of the brake pedal 60, in other words, in a case where a parking brake, not shown, is in a working state (or in a case where a shift position is located at a parking position). In this case, all the pressure holding valves 153 may be in the closed states, and the pressure holding valves 153RL, RR corresponding to the brake cylinders 52 of the respective rear left and right wheels may be in the closed states. In this embodiment, the closed space containing the smaller-diameter-side chamber 112 and the brake-cylinder-pressure sensor 226 can be made narrower, allowing the accurate detection of the change in the hydraulic pressure in the smaller-diameter-side chamber 112. Also, there is a low need to set the magnitude of the target hydraulic pressure Pref1 at the magnitude related to the braking torque requested by the driver.

Also, in the check 2, the processings at S24 and S25 are not essential. The high-pressure cut-off valve 312 may be switched from the closed state to the open state after the hydraulic pressure in the smaller-diameter-side chamber 112 has reached the target hydraulic pressure Pref1 (in the case where the positive decision (YES) has been made at S23). In this configuration, the hydraulic pressure in the smaller-diameter-side chamber 112, i.e., the brake-cylinder hydraulic pressure should increase along the one-dot chain line in FIG. 25(c). Thus, it is determined that the operation of the mechanical movable unit 98 is normal, in a case where the brake-cylinder hydraulic pressure has increased from the hydraulic pressure Pref1 by equal to or higher than an abnormality-determination threshold value ΔPth after a predefined set length of time is elapsed after the high-pressure cut-off valve 312 is switched from the closed state to the open state.

Also, when the detection value Pwc has not reached the target hydraulic pressure Pref1 at S23 within a set length of time or when the hydraulic pressure in the smaller-diameter-side chamber 112 has not reached the target hydraulic pressure Pref2 at S25 within a set length of time, it may be determined that the operation of the mechanical pressurization device 96 is normal.

Also, when the brake-cylinder hydraulic pressure Pwc transiently increases after the high-pressure cut-off valve 312 is switched from the closed state to the open state, it may be determined that the operation of the mechanical pressurization device is normal.

Also, the check may be executed after the ignition switch 234 is switched from the ON state to the OFF state. In this configuration, a magnitude of the target hydraulic pressure in the smaller-diameter-side chamber 112 may be any value.

Also, the hydraulic pressure in the smaller-diameter-side chamber 112 may be controlled also when the check is executed by a first checker.

Also, the application of the present embodiment is not limited to the hydraulic brake system, and the present embodiment may be widely applied to a hydraulic-pressure operating system.

In the present embodiment, portions of the brake ECU 56 which store and execute the check program are one example of a pressurization-device check device. Portions of the pressurization-device check device which store and execute the processing at S12 are one example of the first checker and a second checker. Each of the first checker and the second checker is also an input-hindered-state check executer and an operating checker. A portion of the first checker which executes the first check to determine that the operation of the mechanical pressurization device 96 is normal is one example of a first normality determiner. Portions of the second checker which store and execute the processings at S27 and S28 and so on are one example of a second normality determiner and a servo-state-transition normality determiner (a servo-state-pressurization normality determiner in a case where the processings at S24 and S25 are not executed). Portions of the second checker which store and execute the processing at S26 and so on are one example of a high-pressure cut-off valve controller. Portions of the second checker which store and execute the processings at S22-S26 and so on are one example of a pre-check output-side hydraulic-pressure controller. Portions of the pre-check output-side hydraulic-pressure controller which store and execute the processings at S22 and S23 and so on are one example of a pressurization controller, and portions of the pre-check output-side hydraulic-pressure controller which store and execute the processings at S24 and S25 and so on are one example of a pressure-reduction controller. Also, portions of the pre-check output-side hydraulic-pressure controller which store and execute the processing at S26 and so on are one example of a closed-space former.

Embodiment 9

Figure 27:
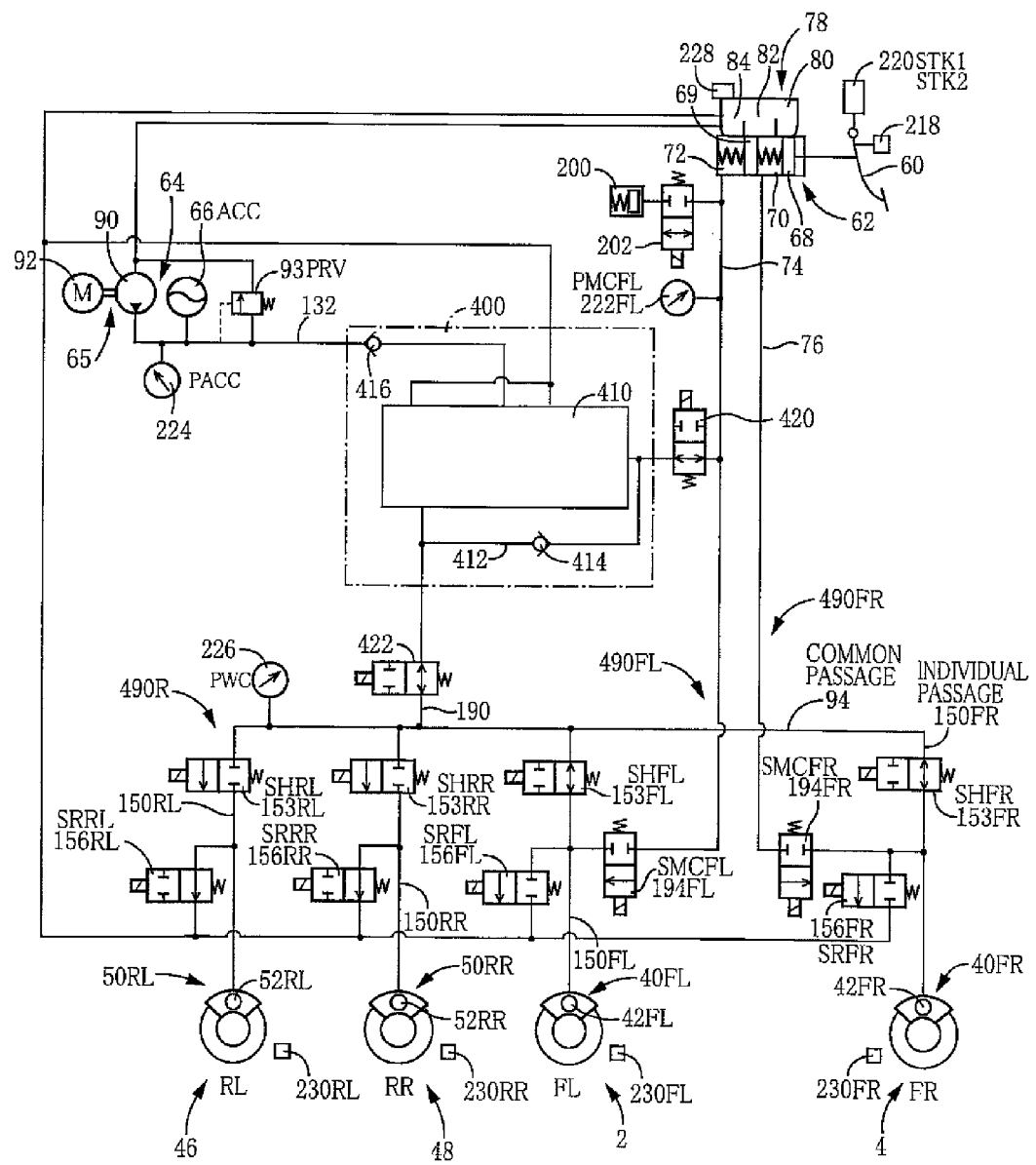
FIG. 27 is a circuit diagram of a hydraulic brake circuit of a hydraulic brake system according to embodiment 9 of the present invention.
Figure 28:
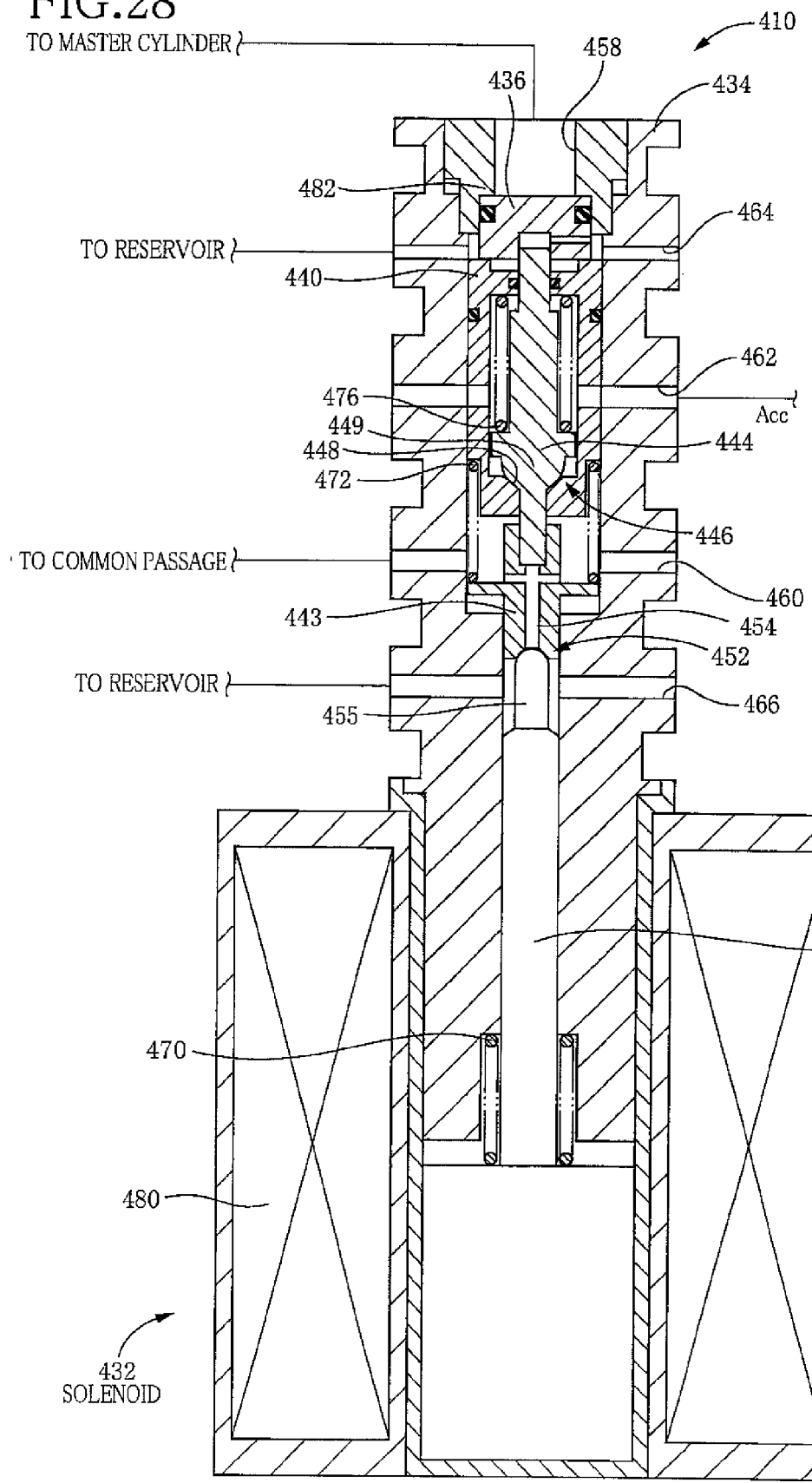
FIG. 28 is a cross-sectional view illustrating a mechanical/power pressurization device included in the hydraulic brake circuit.

A mechanical/power hydraulic-pressure control device 400 may be used instead of the mechanical pressurization device 96. One example of this mechanical/power hydraulic-pressure control device 400 is illustrated in FIGS. 27 and 28. The other configurations are the same as those in embodiment 1.

As illustrated in FIG. 27, the mechanical/power hydraulic-pressure control device 400 is provided among the power hydraulic pressure source 64, the master passage 74, and the common passage 94. The mechanical/power hydraulic-pressure control device 400 has a function as the pressurization device. The mechanical/power hydraulic-pressure control device 400 includes: a mechanical/power movable unit (hereinafter simply referred to as "movable unit") 410; a bypass passage 412 bypassing the mechanical/power movable unit 410 to connect between the master passage 74 and the common passage 94; a check valve 414 provided in the bypass passage 412; and a high-pressure-side check valve 416 provided between the mechanical/power hydraulic-pressure control device 400 and the power hydraulic pressure source 64. Also, an input-side cut-off valve 420 is provided between the mechanical/power hydraulic-pressure control device 400 and the master passage 74, and an output-side cut-off valve 422 is provided between the mechanical/power hydraulic-pressure control device 400 and the common passage 94. As illustrated in FIG. 28, the movable unit 410 is operable by one of an electromagnetic driving force produced by a solenoid 432 and a hydraulic operating force corresponding to the master-cylinder hydraulic pressure Pm (i.e., a pilot pressure). In the event of the abnormality in the electrical system, the movable unit 410 is operable by the hydraulic operating force corresponding to the master-cylinder hydraulic pressure Pm. The movable unit 410 is described in JP-A-2010-926, and a detailed explanation thereof is omitted.

The mechanical/power movable unit 410 includes: (i) a housing 434 having a stepped cylinder bore; (ii) a master-hydraulic-pressure receiver 436 fluid-tightly and slidably fitted in a large-diameter portion of the cylinder bore of the housing 434; (iii) a first valve member 440 engaged with the master-hydraulic-pressure receiver 436; (iv) a plunger 442 slidably fitted in a small-diameter portion of the cylinder bore; and (v) a second valve member 444 engaged with the plunger 442 with a power transmission member 443 therebetween.

The first valve member 440 has a generally cylindrical shape and has an inner face on which the second valve member 444 is slidably disposed. A high-pressure supply valve 446 is formed by the first valve member 440 and the second valve member 444. A portion of the first valve member 440 is a valve seat 448, and a portion of the second valve member 444 is a valve element 449. The first valve member 440 and the second valve member 444 are moved relative to each other to open and close the high-pressure supply valve 446. In this sense, the first valve member 440 can be referred to as "valve seat member", and the second valve member 444 as "valve element member". Also, the first valve member 440 is one example of an outer-circumferential-side member, and the second valve member 444 is one example of an inner-circumferential-side valve member. Also, a reservoir cut-off valve 452 is constituted by the plunger 442 and the power transmission member 443. The power transmission member 443 has a liquid passage 454 with which an engaging portion 455 of the plunger 442 is engaged, with the engaging portion 455 facing an opening portion of the liquid passage 454. The engaging portion 455 of the plunger 442 is brought into contact with and separated from the opening portion of the liquid passage 454 to open and close the opening portion of the liquid passage 454. The engaging portion 455 of the plunger 442 is one example of a valve element, and a periphery of the opening portion of the liquid passage 454 is one example of a valve seat.

The housing 434 has a master pressure port 458, an output port 460, a high pressure port 462, and two low pressure ports 464, 466. The master passage 74 is connected to the master pressure port 458, the servo-pressure passage 190 is connected to the output port 460, the power hydraulic pressure source 64 is connected to the high pressure port 462, and the master reservoir 78 is connected to the low pressure ports 464, 466. The high-pressure supply valve 446 couples and decouples the output port 460 and the high pressure port 462 to and from each other, and the reservoir cut-off valve 452 couples and decouples the output port 460 and the low pressure port 466 to and from each other. Opening and closing of the high-pressure supply valve 446 and the reservoir cut-off valve 452 control a hydraulic pressure in the output port 460.

Also, a spring 470 is provided between the plunger 442 and the housing 434 to urge the plunger 442 backward. A spring 472 is provided between the power transmission member 443 and the first valve member 440 to urge them so as to expand a space therebetween. A spring 476 is provided between the first valve member 440 and the second valve member 444 to urge the high-pressure supply valve 446 such that the high-pressure supply valve 446 is placed in a closed state. As thus described, the high-pressure supply valve 446 is a normally closed valve, and the reservoir cut-off valve 452 is a normally open valve.

When a current is supplied to a coil 480, the plunger 442 is moved forward against an urging force of the spring 470 and brought into contact with the power transmission member 443. As a result, the liquid passage 454 is closed, and the reservoir cut-off valve 452 is placed in a closed state. The power transmission member 443 is moved upward in FIG. 28 against an urging force of the spring 472, and the second valve member 444 is moved upward relative to the first valve member 440 against an urging force of the spring 476. As a result, the high-pressure supply valve 446 is placed in an open state. The output port 460 is decoupled from the low pressure port 466 and coupled to the high pressure port 462, so that the hydraulic pressure in the output port 460 can be built up. A power control pressure as the hydraulic pressure in the output port 460 is supplied to the common passage 94. In the present embodiment, the solenoid 432 is constituted by the coil 480 and the plunger 442.

It is noted that the first valve member 440 is located at its back end position, and the master-hydraulic-pressure receiver 436 is held in contact with a stopper 482, so that an upward movement of the master-hydraulic-pressure receiver 436 from an illustrated position is inhibited. Thus, the hydraulic pressure in the output port 460 can be built up in a state in which the brake pedal 60 is not operated, so that the automatic brake can be actuated.

When the master-cylinder hydraulic pressure Pm is applied, the master-hydraulic-pressure receiver 436 is moved downward in FIG. 28, so that the first valve member 440 is moved downward relative to the second valve member 444. The power transmission member 443 is pushed on the plunger 442 via the spring 472, so that the liquid passage 454 is closed. The reservoir cut-off valve 452 is placed in a closed state, and the high-pressure supply valve 446 in the open state. The output port 460 is decoupled from the low pressure port 466 and coupled to the high pressure port 462, so that the hydraulic pressure in the output port 460 is built up, and the control pressure is supplied to the common passage 94.

An operation in the brake circuit configured as described above will be explained.

1) In a Case where System Works Normally

In the present embodiment, the regenerative cooperative control is executed.

A current to be supplied to the coil 480 is controlled on the basis of a command output from the brake ECU 56. The pressure holding valves 153 for all the four wheels are placed in the open states, the pressure reduction valves 156 for all the four wheels in the closed states, the simulator control valve 202 in the open state, and the input-side cut-off valve 420 and the output-side cut-off valve 422 in closed states. Since the input-side cut-off valve 420 is in the closed state, the master-cylinder hydraulic pressure Pm is never applied to the master pressure port 458. A total required braking torque is obtained, and a value obtained by subtracting an actually-applied regenerative braking toque from the total required braking torque is determined as a required hydraulic braking torque, and a hydraulic pressure corresponding to the required hydraulic braking torque is determined as a target hydraulic pressure. The current to be supplied to the coil 480 is controlled such that the brake-cylinder hydraulic pressure Pwc actually detected by the brake-cylinder-pressure sensor 226 is brought closer to the target hydraulic pressure Pref. In other words, the current to be supplied to the coil 480 is controlled such that the hydraulic pressure in the output port 460 of the mechanical/power hydraulic-pressure control device 400 is brought closer to the target hydraulic pressure Pref. In the present embodiment as thus described, the mechanical/power hydraulic-pressure control device 400 utilizes the output hydraulic pressure produced by the power hydraulic pressure source 64 to control the hydraulic pressure in the common passage 94, eliminating a need to provide the pressurization linear control valve 172 and the pressure-reduction linear control valve 316.

Also, the hydraulic pressure in the output port 460 may be controlled at a magnitude that is lower than the hydraulic pressure in the master cylinder 62.

2) In Case of Abnormality in Control System

In case where there is an abnormality in the control system, no current is supplied to the solenoids of the electromagnetic open/close valves, so that the electromagnetic open/close valves are placed back in the original positions illustrated in FIG. 27. In the mechanical/power hydraulic-pressure control device 400, since no current is supplied to the coil 480, the plunger 442 is located at its back end position. Upon the brake actuating operation on the brake pedal 60, a hydraulic pressure related to the operating force of the brake pedal 60 is produced in the pressure chamber 72 of the master cylinder 62. The hydraulic pressure in the pressure chamber 72 is supplied to the movable unit 410 via the master pressure port 458 to move the master-hydraulic-pressure receiver 436 and the first valve member 440 relative to the second valve member 444. Also, the power transmission member 443 is pressed against the engaging portion 455 of the plunger 442. As a result, the reservoir cut-off valve 452 is placed in the closed state, and the high-pressure supply valve 446 in the open state.

Where the high-pressure working fluid is accumulated in the accumulator 66, the hydraulic pressure in the output port 460 is made higher than the master hydraulic pressure (the master-cylinder hydraulic pressure) Pm. The hydraulic pressure in the output port 460 is supplied to the brake cylinders 42FL, FR provided for the respective front left and right wheels 2, 4, via the servo-pressure passage 190 and the common passage 94. On the other hand, where no hydraulic pressure is supplied from the accumulator 66, the hydraulic pressure in the master cylinder 62 is higher than the hydraulic pressure in the control-pressure port 460, so that the hydraulic pressure in the pressure chamber 72 is supplied to the common passage 94 via the bypass passage 412. It is noted that even where no hydraulic pressure is supplied from the accumulator 66, the reservoir cut-off valve 452 is placed in the closed state by the application of the master pressure to the master pressure port 458, so that the control-pressure port 460 is isolated from the low pressure port 466.

3) In Case of Possible Fluid Leakage

The input-side cut-off valve 420 is placed in the closed state, and the pressure holding valves 153FL, FR for the respective front left and right wheels 2, 4 are placed in the closed states. Also, the pressure holding valves 153RL, RR for the respective rear left and right wheels 46, 48 are placed in the open states, and the pressure reduction valves 156RL, RR are placed in the closed states. The hydraulic pressure controlled by the control of the current to be supplied to the coil 480 in the mechanical/power hydraulic-pressure control device 400 is supplied to the brake cylinders 52RL, RR provided for the respective rear left and right wheels 46, 48. The master hydraulic pressures are respectively supplied from the pressure chambers 70, 72 of the master cylinder 62 to the brake cylinders 42FL, FR provided for the respective front left and right wheels 2, 4. In view of the above, a brake line 490FL including the brake cylinder 42FL provided for the front left wheel 2, a brake line 490FR including the brake cylinder 42FR provided for the front right wheel 4, and a brake line 490R including the brake cylinders 52RL, RR provided for the respective rear left and right wheels 46, 48 are made independent from one another, so that fluid leakage in one of these lines does not affect the other brake lines.

4) In a Case of Release of Hydraulic Brake

The valves are placed back in the original positions illustrated in FIG. 27. The hydraulic pressures in the brake cylinders 52RL, RR provided for the respective rear left and right wheels 46, 48 are returned to the master reservoir 78 via the respective pressure reduction valves 156RL, RR. The hydraulic pressures in the brake cylinders 42FL, FR provided for the respective front left and right wheels 2, 4 are returned to the master reservoir 78 via the reservoir cut-off valve 452 and the low pressure port 466 of the movable unit 410.

It is noted that the mechanical/power hydraulic-pressure control device 400 can control the current to be supplied to the coil 480 in a state in which the hydraulic pressure in the master cylinder 62 is applied to the master pressure port 458. Since the master cylinder pressure is applied to the power transmission member 443 via the spring 472, the current to be supplied to the coil 480 can be controlled to control relative positions of the first valve member 440 and the second valve member 444, so that the hydraulic pressure in the output port 460 can be determined at a magnitude related to the hydraulic pressure in the master cylinder 62.

Embodiment 10

Figure 29:
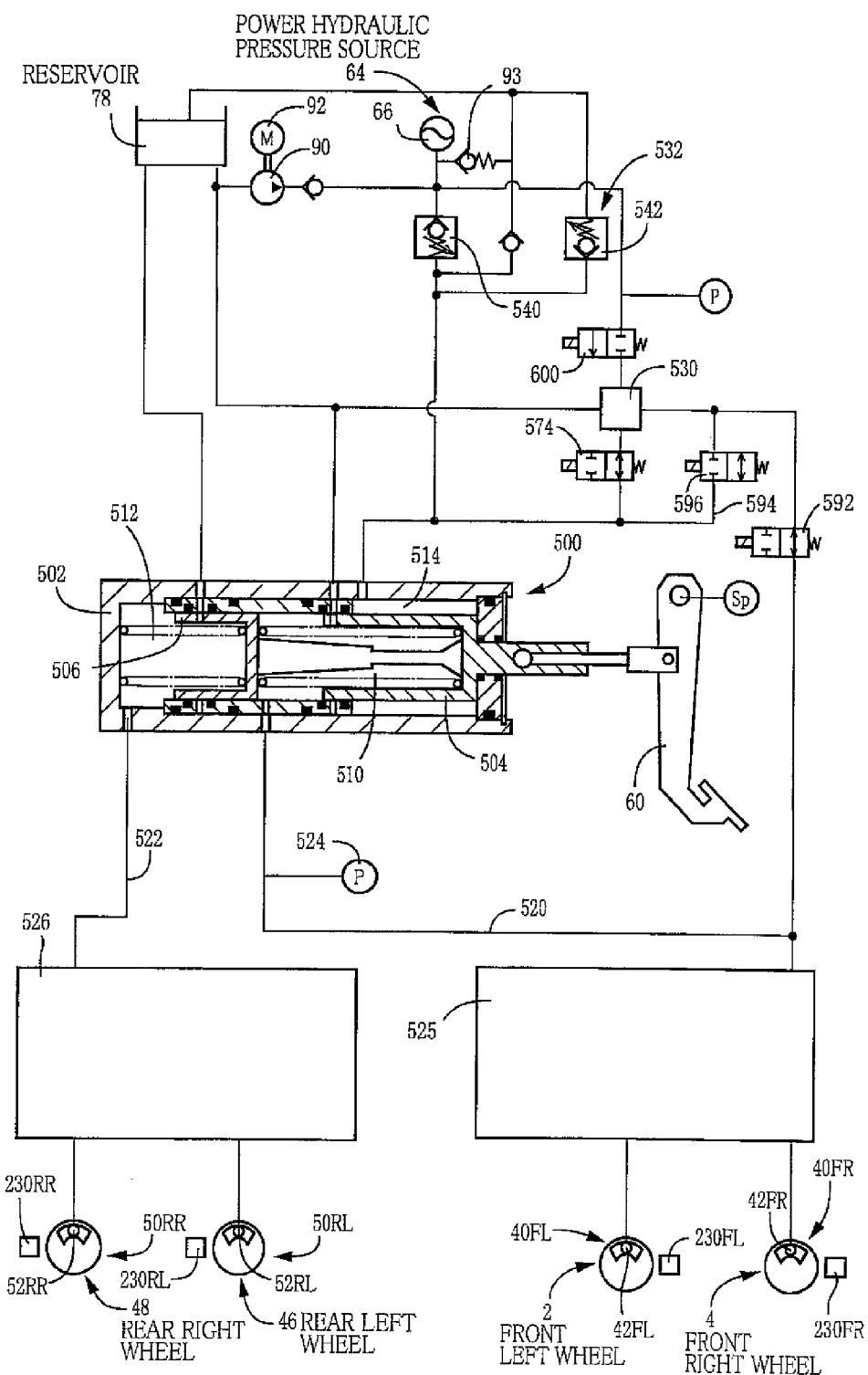
FIG. 29 is a circuit diagram of a hydraulic brake circuit of a hydraulic brake system according to embodiment 10 of the present invention.
Figure 30:
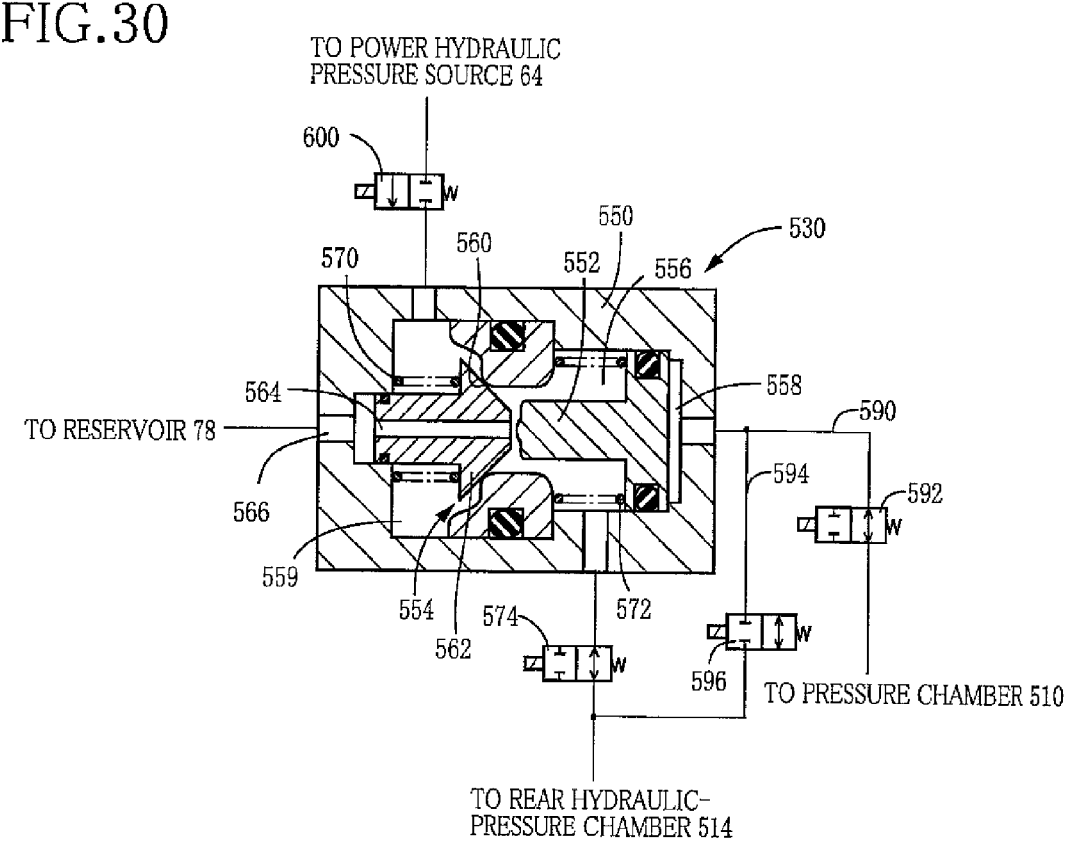
FIG. 30 is a cross-sectional view illustrating a pressurization device included in the hydraulic brake circuit.

The check of the pressurization device can be executed in a hydraulic brake circuit illustrated in FIGS. 29 and 30. A mechanical pressurization device illustrated in FIG. 30 is described in JP-A-2001-225739 and will be briefly explained. The other configurations are the same as those in embodiment 1.

In FIG. 29, a master cylinder 500 includes: a housing 502; two pressurizing pistons 504, 506 slidably fitted in the housing 502; pressure chambers 510, 512 formed in front of the respective pressurizing pistons 504, 506; and a rear hydraulic-pressure chamber 514 formed at a rear of the pressurizing piston 504. The pressurizing piston 504 is mechanically coupled with the brake pedal 60. Master passages 520, 522 are connected to the respective pressure chambers 510, 512. The master passage 520 is connected to the brake cylinders 42 provided for the respective front left and right wheels 2, 4, and the master passage 522 is connected to the brake cylinders 52 provided for the respective rear left and right wheels 46, 48. A brake-cylinder hydraulic sensor 524 is provided in the master passage 520. The hydraulic brake circuit in the present embodiment has front and rear lines, namely a front-wheel-side line and a rear-wheel-side line. In the front-wheel-side line, an antilock control device 525 is provided among the brake cylinders 42FL, FR, the pressure chamber 510, and a reservoir, not shown. In the rear-wheel-side line, an antilock control device 526 is provided among the brake cylinders 52RL, RR, the pressure chamber 512, and the reservoir.

A pressurization device 530 and a hydraulic-pressure control device 532 are coupled in parallel to the rear hydraulic-pressure chamber 514. Each of the pressurization device 530 and the hydraulic-pressure control device 532 utilizes the hydraulic pressure produced by the power hydraulic pressure source 64. The hydraulic-pressure control device 532 includes a pressurization linear control valve 540 and a pressure-reduction linear control valve 542 which are controlled to control the hydraulic pressure produced by the power hydraulic pressure source 64 such that the controlled hydraulic pressure is supplied to the rear hydraulic-pressure chamber 514. The structures of the pressurization linear control valve 540, the pressure-reduction linear control valve 542, and so on are the same as those illustrated in FIG. 3.

As illustrated in FIG. 30, the pressurization device 530 includes: a stepped piston 552 slidably fitted in a housing 550; and a high-pressure supply valve 554 provided in front of the stepped piston 552. A space in front of the stepped piston 552 is a smaller-diameter-side chamber 556, and a space at a rear of the stepped piston 552 is a larger-diameter-side chamber 558. The master passage 520 (the pressure chamber 510 of the master cylinder 500) is connected to the larger-diameter-side chamber 558, and the rear hydraulic-pressure chamber 514 is coupled to the smaller-diameter-side chamber 556. The high-pressure supply valve 554 is provided between the smaller-diameter-side chamber 556 and a high pressure chamber 559 coupled to the power hydraulic pressure source 64. The high-pressure supply valve 554 includes: a valve seat 560 formed in the housing 550; and a valve element 562 movable relative to the valve seat 560. The valve element 562 has a through hole 564 that can fluidically couple the smaller-diameter-side chamber 556 and a reservoir port 566 with each other. Provided between the valve element 562 and the housing 550 is a spring 570 that urges the valve element 562 toward the valve seat 560. Provided between the stepped piston 552 and the housing 550 is a spring 572 that urges the stepped piston 552 toward its back end position.

With the stepped piston 552 located at the back end position, the high-pressure supply valve 554 is in a closed state, so that the smaller-diameter-side chamber 556 is isolated from the high pressure chamber 559 and coupled to the reservoir port 566. When the stepped piston 552 is moved forward, the through hole 564 of the valve element 562 is closed, and the valve element 562 is moved off the valve seat 560, so that the smaller-diameter-side chamber 556 is isolated from the reservoir port 566 and coupled to the high pressure chamber 559 to build up a hydraulic pressure in the smaller-diameter-side chamber 556. An output-side cut-off valve 574 is provided between the pressurization device 530 and the rear hydraulic-pressure chamber 514. The output-side cut-off valve 574 is a normally-open electromagnetic open/close valve.

A normally open valve in the form of a pilot cut-off valve 592 is provided in a pilot passage 590 that connects between the larger-diameter-side chamber 558 and the master passage 520. A normally closed valve in the form of a communication cut-off valve 596 is provided in a bypass passage (may be referred to as "extra-piston communication passage") 594 that bypasses the pressurization device 530 to couple the smaller-diameter-side chamber 556 and the larger-diameter-side chamber 558 with each other. A normally closed valve in the form of a high-pressure cut-off valve 600 is provided in a high control pressure passage 598 that couples the accumulator 66 and the high pressure chamber 559 with each other.

<Check of Whether Operation of Pressurization Device 530 is Normal>

In the present embodiment, the check 2 is executed. Also, in the present embodiment, the check 2 is executed preferably in a state in which the brake pedal 60 is not being operated. For example, the check 2 can be executed when the ignition switch 234 is switched from the ON state to the OFF state or when the brake pedal 60 is not being operated while the vehicle is in the stopped state.

Figure 31:
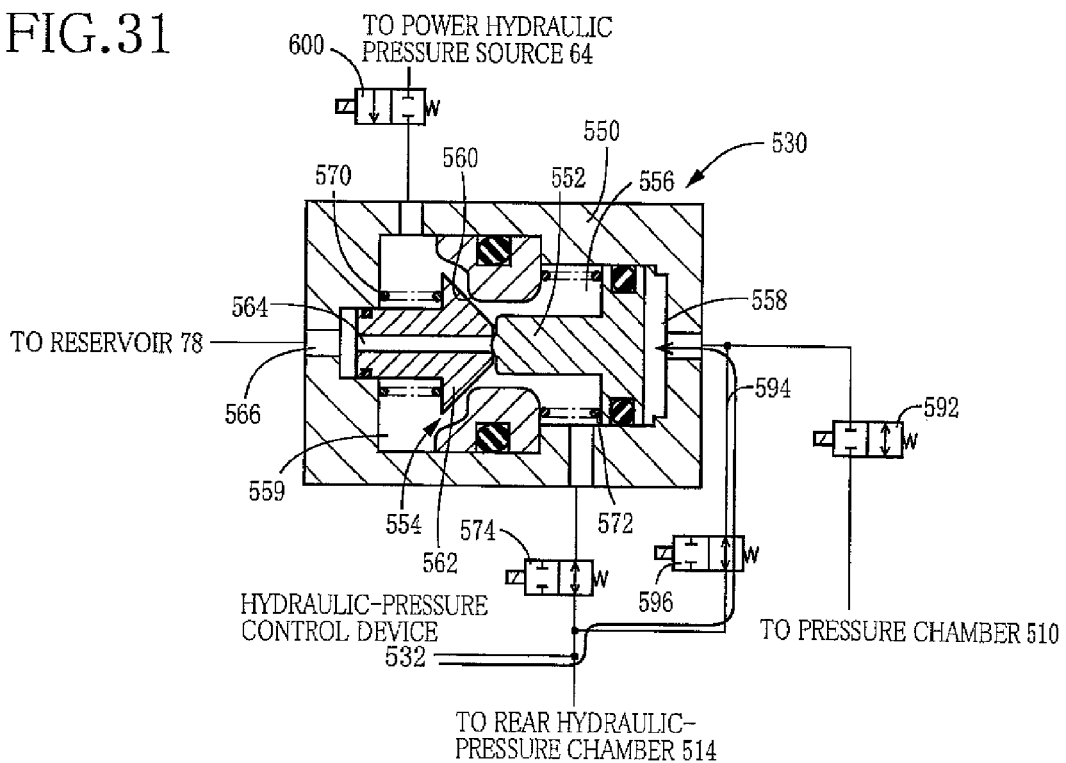
FIG. 31 is a view illustrating a state where the check program is executed in the hydraulic brake system.

As illustrated in FIG. 31, the pilot cut-off valve 592 is placed in a closed state, the communication cut-off valve 596 in an open state, the high-pressure cut-off valve 600 in a closed state, and the output-side cut-off valve 574 in an open state. The pressurization linear control valve 540 and the pressure-reduction linear control valve 542 are controlled to bring a hydraulic pressure in the rear hydraulic-pressure chamber 514 closer to the target hydraulic pressure Pref.

The hydraulic pressure in the smaller-diameter-side chamber 556 of the pressurization device 530 is made equal to a hydraulic pressure in the larger-diameter-side chamber 558 of the pressurization device 530, that is, each hydraulic pressure is made the target hydraulic pressure Pref. When the hydraulic pressure in the larger-diameter-side chamber 558 becomes higher than an actuating pressure of the stepped piston 552, the stepped piston 552 should be moved forward and brought into contact with the valve element 562 of the high-pressure supply valve 554 to close the through hole 564. The high-pressure supply valve 554 should be switched to an open state, and the smaller-diameter-side chamber 556 should be isolated from the reservoir 78. The stepped piston 552 is considered to be moved forward until the valve element 562 is brought into contact with a stopper, not shown.

Also, since the output-side cut-off valve 574 is in the open state, an outflow of the working fluid from the smaller-diameter-side chamber 556 is allowed, which allows the forward movement of the stepped piston 552. Also, the hydraulic pressure in the smaller-diameter-side chamber 556 is supplied from the output-side cut-off valve 574 to the rear hydraulic-pressure chamber 514 to build up the hydraulic pressure in the rear hydraulic-pressure chamber 514. As a result, the pressurizing piston 504 is moved forward to build up a hydraulic pressure in the pressure chamber 510, and the hydraulic pressure in the pressure chamber 510 is detected by the brake-cylinder hydraulic sensor 524. A predetermined relationship is established between the hydraulic pressure in the rear hydraulic-pressure chamber 514 and the hydraulic pressure in the pressure chamber 510. In the present embodiment, a detection value of the brake-cylinder hydraulic sensor 524 is controlled such that the hydraulic pressure in the rear hydraulic-pressure chamber 514 is brought closer to a value that corresponds to the target hydraulic pressure Pref.

Figure 32:
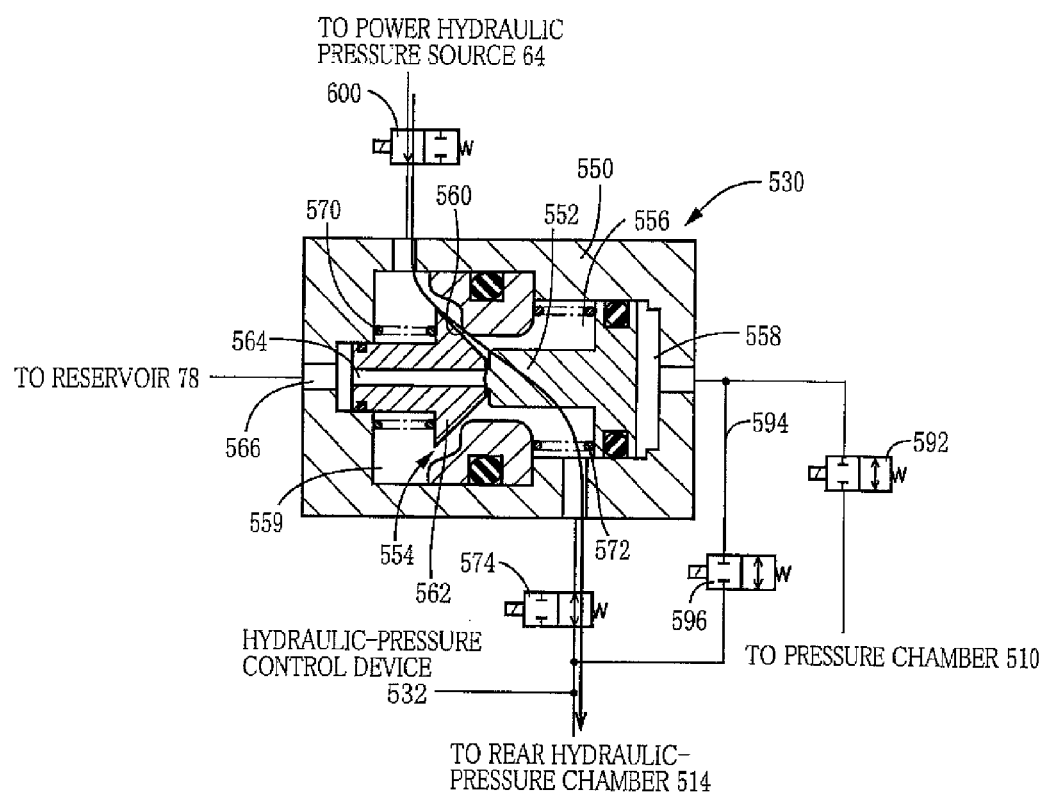
FIG. 32 is a view illustrating another state where the check program is executed in the hydraulic brake system.

In this state, a current to be supplied to a solenoid of the communication cut-off valve 596 is controlled such that, as illustrated in FIG. 32, the communication cut-off valve 596 is placed in a closed state, and the high-pressure cut-off valve 600 in an open state. The smaller-diameter-side chamber 556 should be isolated from the larger-diameter-side chamber 558, so that the high hydraulic pressure is supplied from the power hydraulic pressure source 64 to the smaller-diameter-side chamber 556. It is detected whether the detection value Pwc of the brake-cylinder hydraulic sensor 524 has increased or not. When the detection value Pwc of the brake-cylinder hydraulic sensor 524 has increased, it is determined that an operation of the pressurization device 530 is normal. The stepped piston 552 is considered to be moved by the hydraulic pressure in the smaller-diameter-side chamber 556 and the hydraulic pressure in the larger-diameter-side chamber 558, so that the hydraulic pressure in the smaller-diameter-side chamber 556 becomes a value that is higher than the hydraulic pressure in the larger-diameter-side chamber 558 by a ratio determined by a shape of the stepped piston 552. As described above, the present invention is also applicable to the pressurization device provided upstream of the master cylinder 500.

Figure 33:
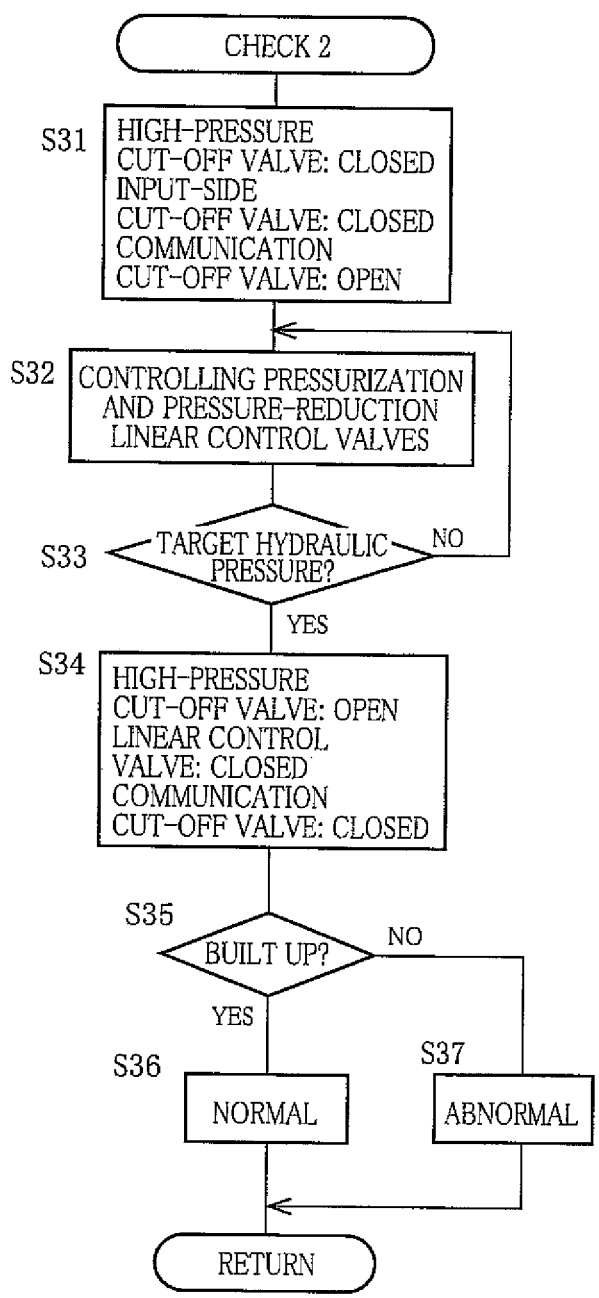
FIG. 33 is a flow chart partly illustrating the check program (in a case where check 2 is executed).

There will be briefly explained a case where the check 2 is executed according to the flow chart illustrated in FIG. 33. At S31, currents to be supplied to solenoids are controlled such that the high-pressure cut-off valve 600 and the pilot cut-off valve 592 are placed in the closed states, and the communication cut-off valve 596 in the open state. At S32 and S33, the pressurization and pressure-reduction linear control valves 540, 542 are controlled to bring the hydraulic pressure detected by the brake cylinder hydraulic sensor 524 closer to the target hydraulic pressure. At S34, the pressurization and pressure-reduction linear control valves 540, 542 are placed in the closed state, and the communication cut-off valve 596 is switched to the closed state, and the high-pressure cut-off valve 600 to the open state. At S35, it is determined whether the hydraulic pressure detected by the brake cylinder hydraulic sensor 524 has increased or not. When the hydraulic pressure detected by the brake cylinder hydraulic sensor 524 has increased, it is determined at S36 that the operation of the pressurization device 530 is normal. When the hydraulic pressure detected by the brake cylinder hydraulic sensor 524 has not increased, it is determined at S37 that the operation of the pressurization device 530 is not normal.

In the present embodiment, portions of the brake ECU 56 which store and execute the processing at S32 and S33, and so on are one example of a pre-check input-side hydraulic-pressure pressurization controller, and portions of the brake ECU 56 which store and execute the processing at S35-S37, and so on are one example of an input-hydraulic-pressure-control normality determiner. Also, portions of the brake ECU 56 which store and execute the processing at S31 and S34, and so on are one example of a communication-cut-off-valve controller.

Embodiment 11

The system may be configured such that in the event of the abnormality in the control system, the servo pressure is supplied to brake cylinders of respective wheels located at diagonal positions. One example of this configuration is illustrated in FIG. 34.

The master cut-off valve 194FR3 may be replaced with a normally closed valve (namely a master cut-off valve 194FRb) in the brake circuit illustrated in FIG. 13(a). In the present embodiment, in the event of the abnormality in the control system, the servo pressure is supplied to the brake cylinders 42FL, 52RR provided respectively for the front left wheel 2 and the rear right wheel 48. As illustrated in FIG. 34(b), in the vehicle having the steering wheel 302 in its left portion, a brake force applied to the right wheels (near the longer arm) is smaller than a brake force applied to the left wheels (near the shorter arm), whereby the generation of the yaw moment can be suppressed. In the present embodiment, portions of the brake ECU 56 which store and execute the processing at S5, and so on are one example of a second hydraulic-pressure supplier. Also, the pressure chamber 72 is one example of the first manual hydraulic pressure source, and the mechanical pressurization device 96 is one example of the second manual hydraulic pressure source.

Embodiment 12

Likewise as illustrated in FIG. 35(a), the master cut-off valve 194FL4 may be replaced with a normally closed valve (namely a master cut-off valve 194FLc) in the brake circuit illustrated in FIG. 14(a). In the present embodiment, the servo pressure is supplied to the brake cylinders 42FR, 52RL respectively provided for the front right wheel 4 and the rear left wheel 46. As illustrated in FIG. 35(b), in the vehicle having the steering wheel 300 in its right portion, a brake force applied to the left wheels (near the longer arm) is smaller than a brake force applied to the right wheels (near the shorter arm), whereby the generation of the yaw moment can be suppressed. In the present embodiment, portions of the brake ECU 56 which store and execute the processing at S5, and so on are one example of the second hydraulic-pressure supplier. Also, the pressure chamber 72 is one example of the first manual hydraulic pressure source, and the mechanical pressurization device 96 is one example of the second manual hydraulic pressure source.

While the embodiments have been described above, two or more of these embodiments are implemented in combination.

It is to be understood that the present invention is not limited to the details of the illustrated embodiments, but may be embodied with various changes and modifications, which may occur to those skilled in the art, for example, two or more of these embodiments can be implemented in combination.

DESCRIPTION OF REFERENCE NUMERALS

40, 50: hydraulic brake, 42, 52: brake cylinder, 54: hydraulic-pressure controller, 56: brake ECU, 60: brake pedal, 62: master cylinder, 64: power hydraulic pressure source, 66: accumulator, 70, 72: pressure chamber, 74, 76: master passage, 94: common passage, 96: mechanical pressurization device, 98: mechanical movable unit, 99: input-side check valve, 100: high-pressure-side check valve, 104: stepped piston, 110: larger-diameter-side chamber, 112: smaller-diameter-side chamber, 116: high-pressure supply valve, 132: high-pressure-side check valve, 136: bypass passage, 148: input-side cut-off valve, 150: individual passage, 153: pressure holding valve, 156: pressure reduction valve, 170: power hydraulic pressure passage, 172: pressurization linear control valve, 190: servo-pressure passage, 192: output-side cut-off valve, 218: brake switch, 220: stroke sensor, 222: master-cylinder-pressure sensor, 226: brake-cylinder-pressure sensor, 228: level warning, 250FL, FR, R: brake hydraulic line, 260, 270, 280: outflow preventing device, 272, 282: first check valve, 274, 284: second check valve, 300, 302: steering wheel, 330FL, FR, R: brake hydraulic line, 400: mechanical/power pressurization device, 410: mechanical/power movable unit, 432: solenoid, 436: master-hydraulic-pressure receiver, 440: first valve member, 442: plunger, 443: power transmission member, 444: second valve member, 446: high-pressure supply valve, 452: reservoir cut-off valve, 500: master cylinder, 514: rear hydraulic-pressure chamber, 520: master passage, 530: pressurization device, 532: hydraulic-pressure control device, 574: output-side cut-off valve, 596: communication cut-off valve, 592: pilot cut-off valve, 594: bypass passage, 600: high-pressure cut-off valve

The invention claimed is:

1. A hydraulic brake system comprising:
   a plurality of hydraulic brakes provided respectively for a plurality of wheels of a vehicle and each configured to be operated by a hydraulic pressure in a corresponding one of a plurality of brake cylinders to restrain rotation of a corresponding one of the plurality of wheels;
   at least one manual hydraulic pressure source configured to produce a hydraulic pressure by a braking operation of a driver;
   a pressurization device comprising a movable unit configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source; and
   a common passage to which the pressurization device is connected and to which the plurality of brake cylinders are connected,
   the hydraulic brake system further comprising:
   at least one manual passage that bypasses the pressurization device and connects between each of at least one of the at least one manual hydraulic pressure source and a corresponding one of at least one of the plurality of brake cylinders; and
   a normally-closed manual cut-off valve provided in each of the at least one manual passage.

2. The hydraulic brake system according to claim 1, wherein the pressurization device comprises an intra-pressurization-device communication passage capable of connecting between the common passage and a pressurization-device-coupled manual hydraulic pressure source as the one manual hydraulic pressure source, and the hydraulic brake system further comprises an outflow preventing device configured to allow a flow of working fluid between the pressurization-device-coupled manual hydraulic pressure source and at least one of the plurality of brake cylinders through the intra-pressurization-device communication passage within at least a period in the braking operation and prevent an outflow of the working fluid from the pressurization-device-coupled manual hydraulic pressure source to the at least one brake cylinder through the intra-pressurization-device communication passage when the braking operation is not being performed.

3. The hydraulic brake system according to claim 2, wherein the outflow preventing device is provided in at least one of the intra-pressurization-device communication passage, the common passage, and a passage that connects between the pressurization device and the common passage.

4. The hydraulic brake system according to claim 2, wherein the outflow preventing device comprises a first check valve configured to: inhibit a flow of the working fluid from the at least one brake cylinder to the pressurization-devicecoupled manual hydraulic pressure source through the intra-pressurization-device communication passage; inhibit the flow of the working fluid from the pressurization-device-coupled manual hydraulic pressure source to the at least one brake cylinder through the intra-pressurization-device communication passage when a subtraction value obtained by subtracting a hydraulic pressure in the at least one brake cylinder from the hydraulic pressure produced by the pressurization-device-coupled manual hydraulic pressure source is equal to or less than a set value; and allow the flow of the working fluid from the pressurization-device-coupled manual hydraulic pressure source to the at least one brake cylinder through the intra-pressurization-device communication passage when the subtraction value is greater than the set value.

5. The hydraulic brake system according to claim 4, wherein the first check valve is a seating valve that comprises a valve element and a valve seat and is provided in an orientation in which a gravity acting on the valve element comprises a component that is opposed to a direction of the flow of the working fluid from the pressurization-device-coupled manual hydraulic pressure source to the at least one brake cylinder.

6. The hydraulic brake system according to claim 4, wherein the first check valve is a cup seal check valve and provided in an orientation in which a direction in which a seal member of the first check valve is easily bent coincides with a direction of the flow of the working fluid from the pressurization-device-coupled manual hydraulic pressure source to the at least one brake cylinder.

7. The hydraulic brake system according to claim 4 wherein the outflow preventing device comprises a second check valve provided parallel to the first check valve and configured to allow the flow of the working fluid from the at least one brake cylinder to the pressurization-device-coupled manual hydraulic pressure source and inhibit the flow of the working fluid from the pressurization-device-coupled manual hydraulic pressure source to the at least one brake cylinder.

8. The hydraulic brake system according to claim 4,
wherein the movable unit comprises a piston operable by the hydraulic pressure produced by the pressurization-device-coupled manual hydraulic pressure source,
wherein the pressurization device comprises (a) an input-side passage that bypasses the movable unit to connect between the pressurization-device-coupled manual hydraulic pressure source and the common passage, (b) an input-side check valve provided in the input-side passage and configured to: inhibit a flow of the working fluid from the common passage to the pressurization-device-coupled manual hydraulic pressure source; allow the flow of the working fluid from the pressurization-device-coupled manual hydraulic pressure source to the at least one brake cylinder when the subtraction value obtained by subtracting the hydraulic pressure in the at least one brake cylinder from the hydraulic pressure produced by the pressurization-device-coupled manual hydraulic pressure source is greater than the set value; and inhibit the flow of the working fluid from the pressurization-device-coupled manual hydraulic pressure source to the at least one brake cylinder when the subtraction value is equal to or less than the set value, and
wherein the input-side passage corresponds to the intra-pressurization-device communication passage, and the input-side check valve is a constituent element of the outflow preventing device.

9. The hydraulic brake system according to claim 8, further comprising a power hydraulic pressure source configured to produce a high hydraulic pressure by supply of electric power,
wherein the piston is a stepped piston comprising a large diameter portion and a small diameter portion, and the movable unit comprises (i) a housing in which the stepped piston is fluid-tightly and slidably fitted, (ii) a larger-diameter-side chamber provided in a vicinity of the large diameter portion of the stepped piston and coupled with the pressurization-device-coupled manual hydraulic pressure source, (iii) a smaller-diameter-side chamber provided in a vicinity of the small diameter portion of the stepped piston and connected to the common passage, (iv) a high pressure chamber coupled with the power hydraulic pressure source, (v) a high-pressure supply valve disposed between the high pressure chamber and the smaller-diameter-side chamber and switchable from a closed state to an open state by forward movement of the stepped piston, (vi) an intra-piston communication passage provided in the stepped piston and configured to couple the larger-diameter-side chamber and the smaller-diameter-side chamber with each other, and (vii) an intra-piston check valve provided in the intra-piston communication passage and configured to allow a flow of the working fluid from the smaller-diameter-side chamber to the larger-diameter-side chamber and inhibit a flow of the working fluid from the larger-diameter-side chamber to the smaller-diameter-side chamber, and
wherein the intra-piston communication passage corresponds to the intra-pressurization-device communication passage, and the intra-piston check valve is a constituent element of the outflow preventing device.

10. The hydraulic brake system according to claim 1, further comprising a normally-open output-side cut-off valve provided between the pressurization device and the common passage.

11. The hydraulic brake system according to claim 1,
wherein the plurality of hydraulic brakes are provided respectively for front left and right and rear left and right wheels of the vehicle, and
wherein brake cylinders provided respectively for the front left and right wheels among the plurality of brake cylinders provided respectively for the front left and right and rear left and right wheels are connected to the common passage respectively via a plurality of brake-side passages, and a plurality of normally-open electromagnetic open/close valves are respectively provided in the plurality of brake-side passages.

12. The hydraulic brake system according to claim 1, wherein the at least one manual passage is respectively connected to the at least one manual hydraulic pressure source except the pressurization-device-coupled manual hydraulic pressure source.

13. The hydraulic brake system according to claim 1, wherein the at least one manual passage is respectively connected to the at least one manual hydraulic pressure source.

14. The hydraulic brake system according to claim 1,
wherein the plurality of hydraulic brakes are provided respectively for front left and right and rear left and right wheels of the vehicle,
wherein the hydraulic brake system further comprises two manual hydraulic pressure sources which are respectively coupled with the brake cylinders provided respectively for the front left and right wheels, via at least one manual passage, and wherein the hydraulic brake system further comprises (a) a power hydraulic pressure source configured to produce a high hydraulic pressure by supply of electric power, (b) a power hydraulic-pressure control device capable of utilizing the hydraulic pressure produced by the power hydraulic pressure source to control a hydraulic pressure in the common passage, and (c) a hydraulic-pressure-supply-state control device comprising at least one of: (i) a power control pressure supplier configured to, when the power hydraulic-pressure control device works normally, supply a power control pressure that is a hydraulic pressure controlled by the power hydraulic-pressure control device, to brake cylinders provided respectively for the front left and right and rear left and right wheels; (ii) a servo pressure supplier configured to, when the power hydraulic-pressure control device cannot control the hydraulic pressure in the common passage, supply a servo pressure that is an output hydraulic pressure provided by the pressurization device, to brake cylinders provided respectively for at least two wheels comprising at least the front left and right wheels; and (iii) a manual-hydraulic-pressure and power-control-pressure supplier configured to, in case of possible fluid leakage in the hydraulic brake system, disconnect the brake cylinders provided respectively for the front left and right wheels from the common passage, couple the brake cylinders provided respectively for the front left and right wheels respectively with the two manual hydraulic pressure sources, and supply the power control pressure to brake cylinder provided respectively for the rear left and right wheels.

15. A hydraulic brake system comprising:

a plurality of hydraulic brakes provided respectively for a plurality of wheels of a vehicle and each configured to be operated by a hydraulic pressure in a corresponding one of a plurality of brake cylinders to restrain rotation of a corresponding one of the plurality of wheels;

at least one manual hydraulic pressure source configured to produce a hydraulic pressure by a braking operation of a driver; and a pressurization device configured to be operated by at least a hydraulic pressure produced by one manual hydraulic pressure source of the at least one manual hydraulic pressure source, the pressurization device being capable of outputting a hydraulic pressure that is greater than the hydraulic pressure produced by the one manual hydraulic pressure source, the pressurization device comprising an intra-pressurization-device communication passage capable of fluidically coupling a pressurization-device-coupled manual hydraulic pressure source as the one manual hydraulic pressure source and at least one of the plurality of brake cylinders with each other, the hydraulic brake system further comprising an outflow preventing device configured to allow a flow of working fluid between the pressurization-device-coupled manual hydraulic pressure source and the at least one brake cylinder through the intra-pressurization-device communication passage within at least a period in the braking operation and prevent an outflow of the working fluid from the pressurization-device-coupled manual hydraulic pressure source to the at least one brake cylinder through the intra-pressurization-device communication passage when the braking operation is not being performed.

* * * * *